United States Patent
Fukuda et al.

(10) Patent No.: US 11,767,658 B2
(45) Date of Patent: Sep. 26, 2023

(54) WORKING MACHINE

(71) Applicant: KUBOTA CORPORATION, Osaka (JP)

(72) Inventors: Yuji Fukuda, Osaka (JP); Jun Tomita, Osaka (JP); Ryota Hamamoto, Osaka (JP); Ryosuke Kinugawa, Osaka (JP); Yoshimitsu Tanaka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/839,019

(22) Filed: Jun. 13, 2022

(65) Prior Publication Data

US 2022/0307229 A1    Sep. 29, 2022

Related U.S. Application Data

(63) Continuation of application No. 16/838,266, filed on Apr. 2, 2020, now Pat. No. 11,391,018.

(30) Foreign Application Priority Data

| Apr. 5, 2019 | (JP) | 2019-072752 |
| Apr. 5, 2019 | (JP) | 2019-072753 |
| Aug. 2, 2019 | (JP) | 2019-143207 |

(51) Int. Cl.
*E02F 9/22* (2006.01)
*E02F 9/02* (2006.01)
(Continued)

(52) U.S. Cl.
CPC ............ *E02F 9/2253* (2013.01); *B62D 55/06* (2013.01); *E02F 9/02* (2013.01); *E02F 9/2275* (2013.01);
(Continued)

(58) Field of Classification Search
CPC ....... E02F 9/2225; E02F 9/2253; E02F 9/128; E02F 9/2296
See application file for complete search history.

(56) References Cited

U.S. PATENT DOCUMENTS

| 4,495,767 A | 1/1985 | Akiyama |
| 6,339,929 B1* | 1/2002 | Udagawa ............... E02F 9/123 60/468 |

(Continued)

FOREIGN PATENT DOCUMENTS

| JP | H0754809 A | 2/1995 |
| JP | 2008082130 A | 4/2008 |

(Continued)

OTHER PUBLICATIONS

Office Action issued in corresponding JP Patent Application No. 2022-182671, dated May 23, 2023, along with an English translation thereof.

*Primary Examiner* — Abiy Teka
(74) *Attorney, Agent, or Firm* — Greenblum & Bernstein, P.L.C.

(57) ABSTRACT

A working machine is provided, which includes a prime mover, a first traveling pump driven by power of the prime mover to supply operation fluid through a connector fluid tube, a traveling motor including first and second ports connected to the connector fluid tube, the traveling motor configured to be switched in a first speed and a second speed higher than the first speed, a first pressure detector to detect first traveling-pump pressure near the first port, a second pressure detector to detect second traveling-pump pressure near the second port, and a controller configured, with the traveling motor switched in the second speed, to automatically shift down the traveling motor from the second speed to the first speed, when a differential pressure between the (Continued)

first traveling-pump pressure and the second traveling-pump is equal to or more than a deceleration threshold.

19 Claims, 30 Drawing Sheets

(51) Int. Cl.
*E02F 9/24* (2006.01)
*F16H 61/456* (2010.01)
*B62D 55/06* (2006.01)
*B62D 11/04* (2006.01)

(52) U.S. Cl.
CPC .............. *E02F 9/2292* (2013.01); *E02F 9/24* (2013.01); *F16H 61/456* (2013.01); *B62D 11/04* (2013.01)

(56) References Cited

U.S. PATENT DOCUMENTS

| | | | |
|---|---|---|---|
| 9,316,310 B2 | 4/2016 | Kinugawa | |
| 2010/0236233 A1 | 9/2010 | Sumiyoshi | |
| 2016/0230370 A1* | 8/2016 | Fukuda | F16H 61/4008 |
| 2017/0284063 A1* | 10/2017 | Fukuda | E02F 9/22 |
| 2020/0048867 A1 | 2/2020 | Kimura et al. | |

FOREIGN PATENT DOCUMENTS

| | | |
|---|---|---|
| JP | 2017-179923 | 10/2017 |
| JP | 2018-204252 | 12/2018 |

* cited by examiner

FIG.4A

| Prime mover speed (rpm) | 1st decelerating judgment pressure PV1 (MPa) (Traveling pressure) |
|---|---|
| 1000rpm | 24MPa |
| 1250rpm | 25MPa |
| 1500rpm | 26MPa |
| 1750rpm | 27MPa |
| 2000rpm | 28MPa |
| 2250rpm | 29MPa |
| 2500rpm | 30MPa |

T1

| Prime mover speed (rpm) | 1st returning judgment pressure QV1 (MPa) (Traveling pressure) |
|---|---|
| 1000rpm | 14MPa |
| 1250rpm | 15MPa |
| 1500rpm | 16MPa |
| 1750rpm | 17MPa |
| 2000rpm | 18MPa |
| 2250rpm | 19MPa |
| 2500rpm | 20MPa |

FIG.6A

| Prime mover speed (rpm) | 2nd decelerating judgment pressure PV2 (MPa) (Traveling differential pressure) |
|---|---|
| 1000rpm | 20MPa |
| 1250rpm | 21MPa |
| 1500rpm | 22MPa |
| 1750rpm | 23MPa |
| 2000rpm | 24MPa |
| 2250rpm | 25MPa |
| 2500rpm | 26MPa |

| Prime mover speed (rpm) | 2nd returning judgment pressure QV2 (MPa) (Traveling differential pressure) |
|---|---|
| 1000rpm | 15MPa |
| 1250rpm | 16MPa |
| 1500rpm | 17MPa |
| 1750rpm | 18MPa |
| 2000rpm | 19MPa |
| 2250rpm | 20MPa |
| 2500rpm | 21MPa |

| Pilot pressure (MPa)<br>(Swash plate angle) | 3rd returning judgment pressure<br>QV3 (MPa)<br>(Traveling pressure) |
|---|---|
| 0MPa | 14MPa |
| 0.50MPa | 14MPa |
| 0.75MPa | 15MPa |
| 1.00MPa | 16MPa |
| 1.25MPa | 17MPa |
| 1.50MPa | 18MPa |
| 1.75MPa | 19MPa |
| 2.00MPa | 20MPa |

FIG.10A

| Pilot pressure (MPa)<br>(Swash plate angle) | 4th decelerating judgment pressure PV4 (MPa)<br>(Traveling differential pressure) |
|---|---|
| 0MPa | 20MPa |
| 0.50MPa | 20MPa |
| 0.75MPa | 21MPa |
| 1.00MPa | 22MPa |
| 1.25MPa | 23MPa |
| 1.50MPa | 24MPa |
| 1.75MPa | 25MPa |
| 2.00MPa | 26MPa |

| Pilot pressure (MPa)<br>(Swash plate angle) | 4th returning judgment pressure<br>QV4 (MPa)<br>(Traveling differential pressure) |
|---|---|
| 0MPa | 15MPa |
| 0.50MPa | 15MPa |
| 0.75MPa | 16MPa |
| 1.00MPa | 17MPa |
| 1.25MPa | 18MPa |
| 1.50MPa | 19MPa |
| 1.75MPa | 20MPa |
| 2.00MPa | 21MPa |

| Anti-stall proportional valve Secondary pressure | 5th returning judgment pressure QV5 (MPa) (Traveling pressure) |
|---|---|
| 1.00MPa | 14MPa |
| 1.25MPa | 15MPa |
| 1.50MPa | 16MPa |
| 1.75MPa | 17MPa |
| 2.00MPa | 18MPa |
| 2.25MPa | 19MPa |
| 2.50MPa | 20MPa |

| Anti-stall proportional valve Secondary pressure | 6th decelerating judgment pressure PV6 (MPa) (Traveling differential pressure) |
|---|---|
| 1.00MPa | 20MPa |
| 1.25MPa | 21MPa |
| 1.50MPa | 22MPa |
| 1.75MPa | 23MPa |
| 2.00MPa | 24MPa |
| 2.25MPa | 25MPa |
| 2.50MPa | 26MPa |

①Prime mover speed

| Prime mover speed | Q10,Q12 Decelerating threshold | Q11,Q13 Returning threshold |
|---|---|---|
| 1000rpm | 22MPa | 12MPa |
| 1250rpm | 23MPa | 13MPa |
| 1500rpm | 24MPa | 14MPa |
| 1750rpm | 25MPa | 15MPa |
| 2000rpm | 26MPa | 16MPa |
| 2250rpm | 27MPa | 17MPa |
| 2500rpm | 28MPa | 18MPa |

②Swash plate angle

| Traveling pilot pressure (Swash plate angle) | Q10,Q12 Decelerating threshold | Q11,Q13 Returning threshold |
|---|---|---|
| 0MPa | 22MPa | 12MPa |
| 0.50MPa | 22MPa | 12MPa |
| 0.75MPa | 23MPa | 13MPa |
| 1.00MPa | 24MPa | 14MPa |
| 1.25MPa | 25MPa | 15MPa |
| 1.50MPa | 26MPa | 16MPa |
| 1.75MPa | 27MPa | 17MPa |
| 2.00MPa | 28MPa | 18MPa |

③Anti-stall valve

| Anti-stall proportional valve Secondary pressure | Q10,Q12 Decelerating threshold | Q11,Q13 Returning threshold |
|---|---|---|
| 1.00MPa | 22MPa | 12MPa |
| 1.25MPa | 23MPa | 13MPa |
| 1.50MPa | 24MPa | 14MPa |
| 1.75MPa | 25MPa | 15MPa |
| 2.00MPa | 26MPa | 16MPa |
| 2.25MPa | 27MPa | 17MPa |
| 2.50MPa | 28MPa | 18MPa |

WORKING MACHINE

CROSS-REFERENCE TO RELATED APPLICATIONS

The present application is a continuation of U.S. patent application Ser. No. 16/838,266, filed Apr. 2, 2020, which claims priority under 35 U.S.C. § 119 to Japanese Patent Application No. P2019-072752, filed Apr. 5, 2019, to Japanese Patent Application No. P2019-072753, filed Apr. 5, 2019, and to Japanese Patent Application No. P2019-143207, filed Aug. 2, 2019. The contents of these applications are incorporated herein by reference in their entirety.

BACKGROUND OF THE INVENTION

Field of the Invention

The present invention relates to a working machine.

Description of Related Art

Japanese Patent Application Publication No. 2008-82130 discloses a technique for decelerating and accelerating a speed of a working machine. The working machine disclosed in Japanese Patent Application Publication No. 2008-82130 includes a traveling motor having a first speed and a second speed higher than the first speed, and includes a traveling switching valve configured to switch the speed of the traveling motor. When the traveling motor is at the second speed, when the pressure of the operation fluid supplied to the traveling device is equal to or higher than a predetermined pressure, the traveling motor at the second speed is automatically decelerated to the first speed.

SUMMARY OF THE INVENTION

In one aspect of the subject matter of the present application, a working machine includes a prime mover, a first traveling pump driven by power of the prime mover to supply operation fluid through a first connector fluid tube, a first traveling motor including first and second ports connected to the first connector fluid tube, the first traveling motor configured to provide the power to a first traveling device by the operation fluid supplied from the first traveling pump, and to be switched in a first speed and a second speed higher than the first speed, a first pressure detector to detect first traveling-pump pressure of the operation fluid in the first connector fluid tube near the first port, a second pressure detector to detect second traveling-pump pressure of the operation fluid in the first connector fluid tube near the second port, and a controller configured, with the first traveling motor switched in the second speed, to automatically shift down the first traveling motor from the second speed to the first speed, when a first differential pressure between the first traveling-pump pressure and the second traveling-pump and/or a second differential pressure between the second traveling-pump pressure and the first traveling-pump is equal to or more than a deceleration threshold.

The working machine may also include a second traveling pump driven by power of the prime mover to supply the operation fluid through a second connector fluid tube, a second traveling motor including third and fourth ports connected to the second connector fluid tube, the second traveling motor configured to provide the power to a second traveling device by the operation fluid supplied from the second traveling pump, and to be switched in the first speed and the second speed higher than the first speed, a third pressure detector to detect third traveling-pump pressure of the operation fluid in the second connector fluid tube near the third port, and a fourth pressure detector to detect fourth traveling-pump pressure of the operation fluid in the second connector fluid tube near the fourth port. The controller may be configured, with the second traveling motor switched in the second speed, to automatically shift down the second traveling motor from the second speed to the first speed, when a third differential pressure between the third traveling-pump pressure and the fourth traveling-pump and/or a fourth differential pressure between the fourth traveling-pump pressure and the third traveling-pump is equal to or more than a deceleration threshold.

The controller may be configured, after the first traveling motor is shifted down from the second speed to the first speed, to automatically shift up the first traveling motor from the first speed to the second speed, when the first differential pressure and the second differential pressure are equal to or less than a return threshold which is less than the deceleration threshold.

The controller may be configured, after the second traveling motor is shifted down from the second speed to the first speed, to automatically shift up the second traveling motor from the first speed to the second speed, when the third differential pressure and the fourth differential pressure are equal to or less than a return threshold which is less than the deceleration threshold.

In another aspect of the subject matter of the present application, a working machine includes a prime mover, a first traveling pump driven by power of the prime mover to supply operation fluid through a first connector fluid tube, a first traveling motor including first and second ports connected to the first connector fluid tube, the first traveling motor configured to provide the power to a first traveling device by the operation fluid supplied from the first traveling pump, and to be switched in a first speed and a second speed higher than the first speed, a first pressure detector to detect first traveling-pump pressure of the operation fluid in the first connector fluid tube near the first port, a second pressure detector to detect second traveling-pump pressure of the operation fluid in the first connector fluid tube near the second port; and a controller configured, with the first traveling motor switched in the second speed, to automatically shift down the first traveling motor from the second speed to the first speed, when a first absolute value of a first differential pressure between the first traveling-pump pressure and the second traveling-pump is equal to or more than a deceleration threshold.

The working machine may include a second traveling pump driven by power of the prime mover to supply the operation fluid through a second connector fluid tube, a second traveling motor including third and fourth ports connected to the second connector fluid tube, the second traveling motor configured to provide the power to a second traveling device by the operation fluid supplied from the second traveling pump, and to be switched in the first speed and the second speed higher than the first speed, a third pressure detector to detect third traveling-pump pressure of the operation fluid in the second connector fluid tube near the third port, and a fourth pressure detector to detect fourth traveling-pump pressure of the operation fluid in the second connector fluid tube near the fourth port. The controller may be configured, with the second traveling motor switched in the second speed, to automatically shift down the second traveling motor from the second speed to the first speed, when a second absolute value of a second differential pressure between the third traveling-pump pressure and the fourth traveling-pump is equal to or more than a deceleration threshold.

The controller may be configured, after the first traveling motor is shifted down from the second speed to the first speed, to automatically shift up the first traveling motor from the first speed to the second speed, when the first absolute value is equal to or less than a return threshold which is less than the deceleration threshold.

The controller may be configured, after the second traveling motor is shifted down from the second speed to the first speed, to automatically shift up the second traveling motor from the first speed to the second speed, when the second absolute value is equal to or less than a return threshold which is less than the deceleration threshold.

The controller may be configured to change the deceleration threshold depending on a state of the working machine.

The controller may be configured to change the return threshold depending on a state of the working machine.

The working machine may include a revolving speed detector connected to the controller and configured to detect revolving speed of the prime mover. The controller may be configured to increase the deceleration threshold as the revolving speed of the prime mover increases.

The working machine may include a swash-plate angle detector connected to the controller and configured to detect the swash-plate angle of the first traveling pump. The controller may be configured to increase the deceleration threshold as the swash-plate angle of the first traveling pump increases.

The working machine may include a thermal sensor connected to the controller and configured to detect temperature of the operation fluid. The controller may be configured to increase the deceleration threshold as the temperature of the operation fluid decreases.

The working machine may include a mode switch connected to the controller and configured for an operator to select an ON position allowing the controller to automatically shift down the first traveling motor from the second speed to the first speed and an OFF position preventing the controller to automatically shift down the first traveling motor from the second speed to the first speed.

The working machine may include a mode switch connected to the controller and configured for an operator to select an ON position allowing the controller to automatically shift down the first traveling motor from the second speed to the first speed and an OFF position preventing the controller to automatically shift down the first traveling motor from the second speed to the first speed.

The working machine may include a display connected to the controller and configured to display whether the first traveling motor is switched to the first speed or the second speed.

The display may have a lamp which lights on when the mode switch is in the ON position.

The working machine may include a display connected to the controller and configured to display that the first traveling motor is automatically shifted down from the second speed to the first speed.

The display may have a lamp which blinks when the first traveling motor is automatically shifted down from the second speed to the first speed.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4A is a view illustrating a first decelerating judgment table T1 according to the embodiment;

FIG. 6A is a view illustrating a second decelerating judgment table T2 according to the embodiment;

FIG. 6B is a view illustrating a second returning judgment table U2 according to the embodiment;

FIG. 8B is a view illustrating a third returning judgment table U2 according to the embodiment;

FIG. 10A is a view illustrating a fourth decelerating judgment table T4 according to the embodiment;

FIG. 10B is a view illustrating a fourth returning judgment table U4 according to the embodiment;

FIG. 14B is a view illustrating a fifth returning judgment table U5 according to the embodiment;

FIG. 16A is a view illustrating a sixth decelerating judgment table T6 according to the embodiment;

FIG. 19 is a view illustrating an example of decelerating thresholds Q10 and Q12 and returning thresholds Q11 and Q12 according to the embodiment;

DESCRIPTION OF THE EMBODIMENTS

Figure 1:
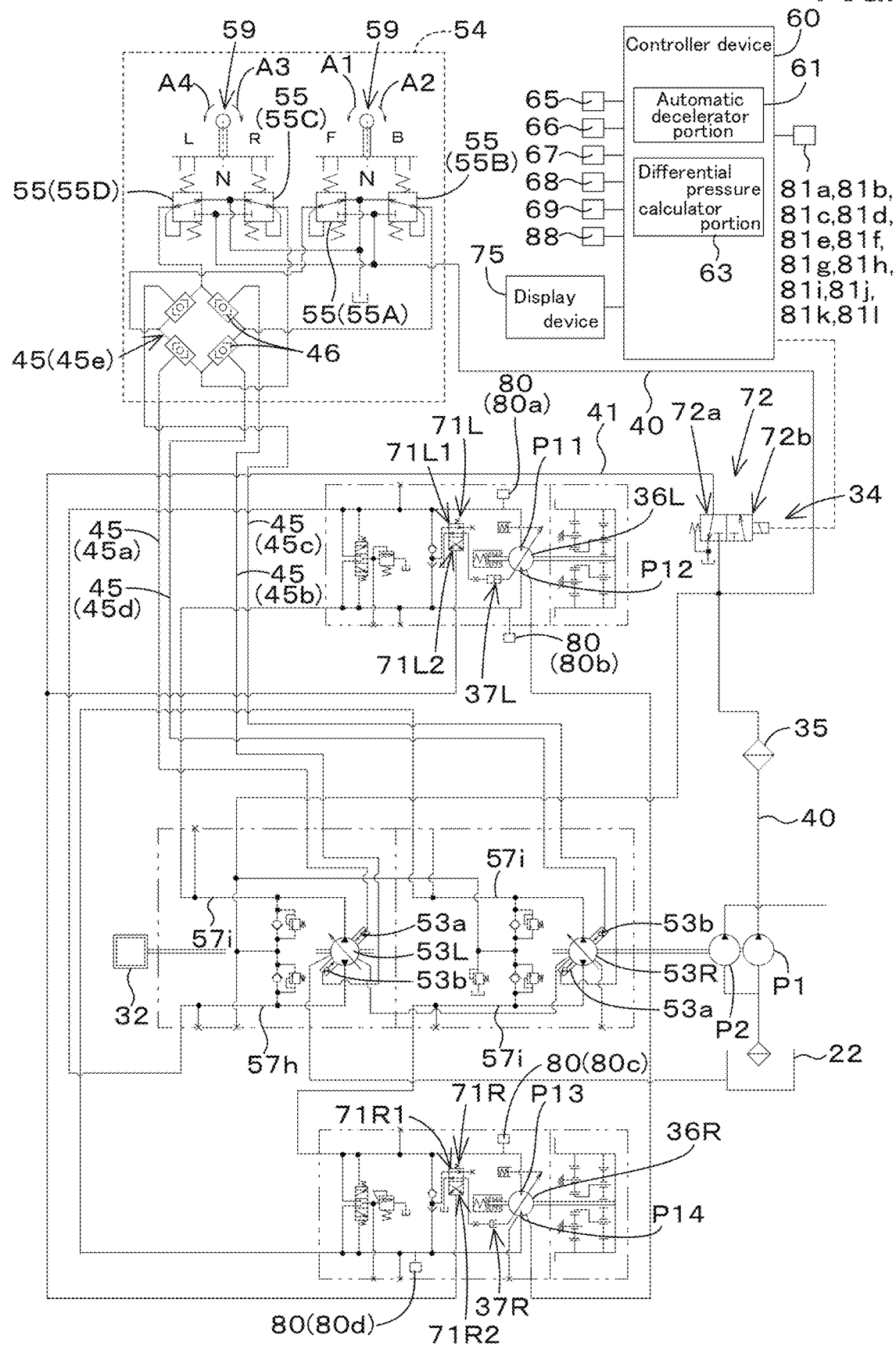
FIG. 1 is a view illustrating a hydraulic system (a hydraulic circuit) for a working machine according to an embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

First Embodiment

Hereinafter, a first embodiment of a hydraulic system of a working machine according to the present invention and a working machine including the hydraulic system will be described with reference to the drawings as appropriate.

Figure 18:
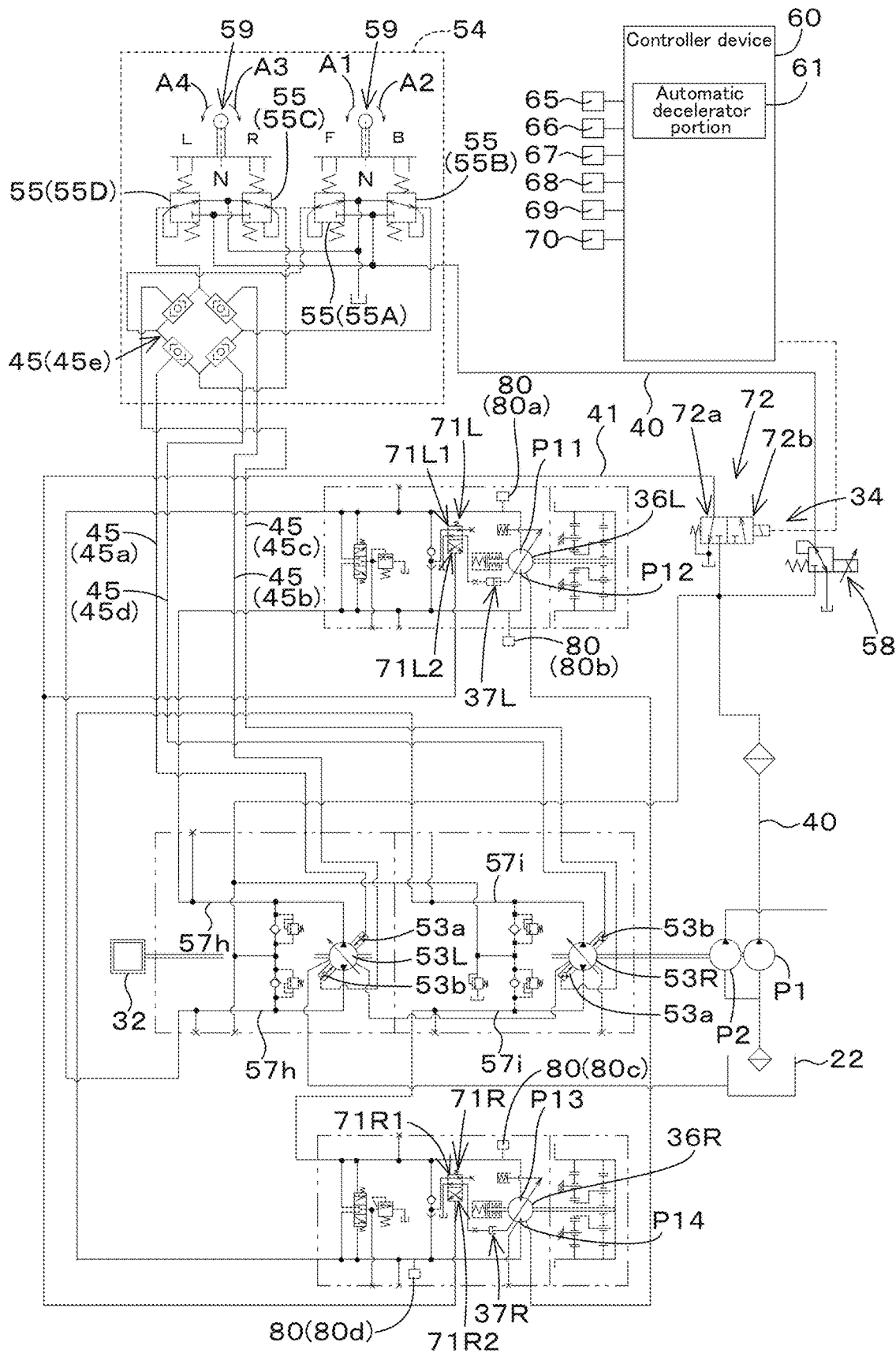
FIG. 18 is a view illustrating a hydraulic system (a hydraulic circuit) for a working machine according to an embodiment of the present invention.

FIG. 18 shows a side view of the working machine according to the present invention. FIG. 18 shows a compact track loader as an example of the working machine. However, the working machine according to the present invention is not limited to a compact track loader, but may be another type of loader working machine such as a skid steer loader. In addition, a working machine other than the loader working machine may be employed.

As shown in FIG. 18, a working machine 1 includes a machine body 2, a cabin 3, a working device 4, and a pair of traveling devices 5L and 5R.

In the description of the embodiment, the front side (the left side in FIG. 18) of the operator seating on the operator seat 8 of the working machine 1 is referred to as the front, the rear side (the right side in FIG. 18) of the operator is referred to as the rear, the left side (the front surface side of FIG. 18) of the operator is referred to as the left, and the right side (the back surface side of FIG. 18) of the operator is referred to as the right.

In addition, a horizontal direction that is a direction orthogonal to the front-rear direction will be described as a machine width direction. A direction extending from the center portion of the machine body 2 to the right or to the left will be described as a machine outward direction.

In other words, the machine outward direction corresponds to the machine width direction, and is a direction separating away from the machine body 2. A direction opposite to the machine outward direction will be referred to as a machine inward direction.

In other words, the machine inward direction corresponds to the machine width direction, and is a direction approaching the machine body 2.

The cabin 3 is mounted on the machine body 2. The cabin 3 is provided with an operator seat 8. The working device 4 is attached to the machine body 2. The pair of traveling devices 5L and 5R are provided on outer sides of the machine body 2. A prime mover 32 is mounted in a rear portion of the machine body 2.

The working device 4 includes a boom 10, a working tool 11, a lift link 12, a control link 13, a boom cylinder 14, and a bucket cylinder 15.

The boom 10 is provided on the right side of the cabin 3 so as to be vertically swingable, and another boom 10 is provided on the left side of the cabin 3 so as to be vertically swingable. The working tool 11 is, for example, a bucket, and the bucket 11 is provided at the tip end portion (the front end portion) of the boom 10 so as to be vertically swingable.

The lift link 12 and the control link 13 support a base portion (a rear portion) of the boom 10 so that the boom 10 can swing up and down.

The boom cylinder 14 is stretched and shortened to move the boom 10 up and down. The bucket cylinder 15 is stretched and shortened to swing the bucket 11.

The front portion of the boom 10 arranged to the right and the front portion of the boom 10 arranged to the left are connected to each other by a deformed connector pipe. The base portions (the rear portions) of the booms 10 are connected by a circular connector pipe.

A pair of the lift link 12, the control link 13, and the boom cylinder 14 is provided to the left corresponding to the boom arranged to the left, and another pair of the lift link 12, the control link 13, and the boom cylinder 14 is provided to the right corresponding to the boom arranged to the right, respectively.

The lift link 12 is provided extending in a vertical direction at the rear portion of the base portion of each of the booms 10. The upper portion (one end side) of the lift link 12 is pivotally supported rotatably around a lateral axis by a pivot shaft 16 (a first pivot shaft) near a rear portion of the base portion of each of the booms 10.

In addition, a lower portion (the other end side) of the lift link 12 is pivotally supported rotatably around a lateral axis by a pivot shaft 17 (a second pivot shaft) near a rear portion of the machine body 2. The second pivot shaft 17 is provided below the first pivot shaft 16.

The upper portion of the boom cylinder 14 is pivotally supported rotatably about a lateral axis by a pivot shaft 18 (a third pivot shaft). The third pivot shaft 18 is provided to the base portion of each of the booms 10, particularly provided at the front portion of the base portion.

The lower portion of the boom cylinder 14 is pivotally supported rotatably around a lateral axis by a pivot shaft 19 (a fourth pivot shaft). The fourth pivot shaft 19 is provided below the third pivot shaft 18 and near the lower rear portion of the machine body 2.

The control link 13 is provided in front of the lift link 12. One end of the control link 13 is pivotally supported rotatably around a lateral axis by a pivot shaft 20 (a fifth pivot shaft). The fifth pivot shaft 20 is provided in the machine body 2 and at a position corresponding to the front of the lift link 12.

The other end of the control link 13 is pivotally supported rotatably around a lateral axis by a pivot shaft 21 (a sixth pivot shaft). The sixth pivot shaft 21 is provided in the boom 10, in front of the second pivot shaft 17, and above the second pivot shaft 17.

By stretching and shortening the boom cylinder 14, each of the booms 10 swings up and down around the first pivot shaft 16 while the base portion of each of the booms 10 is supported by the lift link 12 and the control link 13, and thus the tip end portion of each of the booms 10 moves up and down.

The control link 13 swings up and down around the fifth pivot shaft 20 in synchronization with each of the booms 10 swinging up and down. The lift link 12 swings back and forth around the second pivot shaft 17 in synchronization with the control link 13 swinging vertically.

Another working tool can be attached to the front portion of each of the booms 10 instead of the bucket 11. Another working tool is, for example, an attachment (an auxiliary attachment) such as a hydraulic crusher, a hydraulic breaker, an angle broom, an earth auger, a pallet fork, a sweeper, a mower, and a snow blower.

A connector member 50 is provided at the front portion of the boom 10 arranged to the left. The connector member 50 is a device that connects a hydraulic device mounted on the auxiliary attachment to a first pipe member such as a pipe provided on the boom 10.

In particular, the first pipe member can be connected to one end of the connector member 50, and a second pipe member connected to a hydraulic device of the auxiliary attachment can be connected to the other end of the connector member 50. In this manner, operation fluid (hydraulic oil) flowing through the first pipe material is supplied to the hydraulic device through the second pipe material.

The bucket cylinders 15 are respectively arranged near the front portions of the booms 10. The bucket cylinder 15 is stretched and shortened to swing the bucket 11.

Of the pair of traveling devices 5L and 5R, the traveling device 5L is provided to the left side of the machine body 2, and the traveling device 5R is provided to the right side of the machine body 2. In the present embodiment, a crawler type traveling device (including semi-crawler type) is employed as the pair of traveling devices 5L and 5R.

Note that a wheel-type traveling device having a front wheel and a rear wheel may be employed. Hereinafter, for convenience of the explanation, the traveling device 5L may be referred to as a left traveling device 5L, and the traveling device 5R may be referred to as a right traveling device 5R.

The prime mover 32 is an internal combustion engine such as a diesel engine or a gasoline engine, an electric motor, or the like. In this embodiment, the prime mover 32 is the diesel engine, but is not limited thereto.

Next, the hydraulic system for the working machine will be described below.

As shown in FIG. 1, the hydraulic system for the working machine includes a first hydraulic pump P1 and a second hydraulic pump P2.

The first hydraulic pump P1 is a pump configured to be driven by the power of the prime mover 32, and is constituted of a fixed displacement gear pump. The first hydraulic pump P1 is configured to output the operation fluid stored in the tank 22. In particular, the first hydraulic pump P1 outputs the operation fluid to be mainly used for the controlling.

For convenience of the explanation, the tank 22 for storing the operation fluid may be referred to as a operation fluid tank.

Of the operation fluid outputted from the first hydraulic pump P1, the operation fluid to be used for the controlling may be referred to as pilot fluid (pilot fluid), and the pressure of pilot fluid may be referred to as a pilot pressure.

The second hydraulic pump P2 is a pump configured to be driven by the power of the prime mover 32, and is constituted of a fixed displacement gear pump. The second hydraulic pump P2 is configured to output the operation fluid stored in the tank 22, and supplies the operation fluid to a fluid tube (a fluid line) of a working system, for example.

For example, the second hydraulic pump P2 supplies the operation fluid to a boom cylinder 14 for moving the boom 10, a bucket cylinder 15 for moving the bucket, and a control valve (a flow rate control valve) that controls the auxiliary hydraulic actuator for moving the auxiliary hydraulic actuator.

In addition, the hydraulic system for the working machine includes a pair of traveling motors 36L and 36R and a pair of traveling pumps 53L and 53R. The pair of traveling motors 36L and 36R are motors that transmit power to the pair of traveling devices 5L and 5R.

Of the pair of traveling motors 36L and 36R, the traveling motor 36L transmits a rotational power to the traveling device (the left traveling device) 5L, and the traveling motor 36R transmits a rotational power to the traveling device (the right traveling device) 5R.

The pair of traveling pumps 53L and 53R are pumps to be driven by the power of the prime mover 32, and are variable displacement axial pumps of swash plate type, for example. The pair of travel pumps 53L and 53R are driven to supply an operation fluid to each of the pair of traveling motors 36L and 36R.

Of the pair of traveling pumps 53L and 53R, the traveling pump 53L supplies the operation fluid to the traveling pump 53L, and the traveling pump 53R supplies the operation fluid to the traveling pump 53R.

Hereinafter, for convenience of the explanation, the traveling pump 53L may be referred to as a left traveling pump 53L, the traveling pump 53R may be referred to as a right traveling pump 53R, the traveling motor 36L may be referred to as a left traveling motor 36L, and the traveling motor 36R may be referred to as a right traveling motor 36R.

Each of the left traveling pump 53L and the right traveling pump 53R has a forward-traveling pressure receiving portion 53a and a backward-traveling pressure receiving portion 53a to which the pressure (a pilot pressure) of the operation fluid (the pilot fluid) from the first hydraulic pump P1 is applied. The angles of the swash plates are changed by the pilot pressures applied to the pressure receiving portions 53a and 53b.

By changing the angles of the swash plates, it is possible for the left traveling pump 53L and the right traveling pump 53R to change the outputs (the output rates of operation fluid) and the output directions of the operation fluid.

The left traveling pump 53L and the left traveling motor 36L are connected by a connector fluid tube 57h (referred to as a first tube), and the operation fluid outputted by the left traveling pump 53L is supplied to the left traveling motor 36L.

The right traveling pump 53R and the right traveling motor 36R are connected by a connector fluid tube 57i (referred to as a second tube), and the operation fluid outputted by the right traveling pump 53R is supplied to the right traveling motor 36R.

The left traveling motor 36L is configured to be rotated by the operation fluid outputted from the left traveling pump 53L, and is configured to change the revolving speed (a revolving speed) in accordance with the flow rate of operation fluid.

A swash plate switching cylinder 37L is connected to the left traveling motor 36L, and the revolving speed (the revolving speed) of the left traveling motor 36L can be changed by stretching and shortening the swash plate switching cylinder 37L to one side or to the other side.

That is, when the swash plate switching cylinder 37L is shortened, the revolving speed of the left traveling motor 36L is set to be in a low speed (a first speed), and when the swash plate switching cylinder 37L is stretched, the revolving speed of the left traveling motor 36L is set to be in a high speed (a second speed). That is, the revolving speed of the left traveling motor 36L can be changed between the first speed on the low speed side and the second speed on the high speed side.

The right traveling motor 36R is configured to be rotated by the operation fluid outputted from the right traveling pump 53R, and is configured to change the revolving speed (the revolving speed) in accordance with the flow rate of operation fluid.

A swash plate switching cylinder 37R is connected to the right traveling motor 36R, and the revolving speed (the revolving speed) of the right traveling motor 36R can be changed by stretching or shortening the swash plate switching cylinder 37R to one side or to the other side.

That is, when the swash plate switching cylinder 37R is shortened, the revolving speed of the right traveling motor 36R is set to be in a low speed (a first speed), and when the swash plate switching cylinder 37R is stretched, the rotation of the right traveling motor 36R is set to be in a high speed (a second speed). That is, the revolving speed of the right traveling motor 36R can be changed between the first speed on the low speed side and the second speed on the high speed side.

As shown in FIG. 1, the hydraulic system for the working machine includes a traveling switching valve 34. The traveling switching valve 34 is capable of being switched between a first state in which the revolving speeds (the revolving speeds) of the traveling motors (the left traveling motor 36L and the right traveling motor 36R) are set to the first speed and a second state in which the revolving speeds are set to the second travel speed. The traveling switching valve 34 has first switching valves 71L and 71R and a second switching valve 72.

The first switching valve 71L is connected to the swash plate switching cylinder 37L of the left traveling motor 36L via a fluid tube, and is a two-position switching valve that is switched between a first position 71L1 and a second position 71L2. The first switching valve 71L shortens the swash plate switching cylinder 37L when at the first position 71L1, and stretches the swash plate switching cylinder 37L when at the second position 71L2.

The first switching valve 71R is connected to the swash plate switching cylinder 37R of the right traveling motor 36R via a fluid tube, and is a two-position switching valve that is switched between a first position 71R1 and a second position 71R2. The first switching valve 71R shortens the swash plate switching cylinder 37R when at the first position 71R1, and stretches the swash plate switching cylinder 37R when at the second position 71R2.

The second switching valve 72 is an electromagnetic valve configured to switch the first switching valve 71L and the first switching valve 71R, and is a two-position switching valve configured to be switched between a first position 72a and a second position 72b when magnetized. The second switching valve 72, the first switching valve 71L, and the first switching valve 71R are connected by the fluid tube 41.

The second switching valve 72 switches the first switching valve 71L and the first switching valve 71R to the first positions 71L1 and 71R1 when it is at the first position 72a, and switches the first switching valve 71L and the first switching valve 71R1 to the second positions 71L2 and 71R2 when it is at the second position 72b.

That is, when the second switching valve 72 is at the first position 72a, the first switching valve 71L is at the first position 71L1, and the first switching valve 71R is at the first position 71R1, the traveling switching valve 34 turns into the first state, and the revolving speeds of the traveling motors (the left traveling motor 36L and the right traveling motor 36R) are set to the first speed.

When the second switching valve 72 is at the second position 72b, the first switching valve 71L is at the second position 71L2, and the first switching valve 71R is at the second position 71R2, the traveling switching valve 34 is in the second state, and the revolving speeds of the traveling motors (the left traveling motor 36L and the right traveling motor 36R) are set to the second speed.

Thus, the traveling motors (the left traveling motor 36L and the right traveling motor 36R) are configured to be switched between the first speed on the low speed side and the second speed on the high speed side by the traveling switching valve 34.

The operation device 54 is a device for operating the traveling pumps (the left traveling pump 53L and the right traveling pump 53R), and is configured to change the angle of the swash plate (the swash plate angle) of the traveling pump. The operation device 54 includes an operation lever 59 and a plurality of operation valves 55.

The operation lever 59 is an operation lever that is supported by the operation valve 55 and is configured to swing in the left-right direction (a machine width direction) or in the front-back direction. That is, the operation lever 59 is configured to be operated rightward and leftward from the neutral position N with reference to the neutral position N, and is configured to be operated forward and backward from the neutral position N.

In other words, the operation lever 59 is configured to swing in at least four directions with reference to the neutral position N.

For convenience of the explanation, a bi-direction to the front and the rear, that is, the front-rear direction is referred to as a first direction. In addition, a bi-direction to the right and the left, that is, the right-left direction (the machine width direction) is referred to as a second direction.

In addition, the plurality of operation valves 55 are operated in common by a single of the operation lever 59. The plurality of operation valves 55 are activated in accordance with the swinging of the operation lever 59. The output fluid tube 40 is connected to the plurality of operation valves 55, and the operation fluid (the pilot fluid) from the first hydraulic pump P1 can be supplied through the output fluid tube 40. The plurality of operation valves 55 include an operation valve 55A, an operation valve 55B, an operation valve 55C, and an operation valve 55D.

When the operation lever 59 is swung to a forward direction (to one side) of the front-rear direction (the first direction) (when in a forward operation), the operation valve 55A changes the pressure of the operation fluid to be outputted in accordance with an operation extent (an operation) of the forward operation.

When the operation lever 59 is swung to a backward direction (to the other side) of the front-rear direction (the first direction) (when in a backward operation), the operation valve 55B changes the pressure of the operation fluid to be outputted in accordance with an operation extent (an operation) of the backward operation.

When the operation lever 59 is swung to a rightward direction (to one side) of the right-left direction (the second direction) (when in a rightward operation), the operation valve 55C changes the pressure of the operation fluid to be outputted in accordance with an operation extent (an operation) of the rightward operation.

When the operation lever 59 is swung to a leftward direction (to the other side) of the right-left direction (the second direction) (when in a leftward operation), the operation valve 55D changes the pressure of the operation fluid to be outputted in accordance with an operation extent (an operation) of the leftward operation.

The plurality of operation valves 55 and the traveling pumps (the left traveling pump 53L and the right traveling pump 53R) are connected by the traveling fluid tube 45.

In other words, the traveling pumps (the left traveling pump 53L and the right traveling pump 53R) are hydraulic devices configured to be operated by the operation fluid outputted from the operation valves 55 (the operation valve 55A, the operation valve 55B, the operation valve 55C, and the operation valve 55D).

The traveling fluid tube 45 has a first traveling fluid tube 45a, a second traveling fluid tube 45b, a third traveling fluid tube 45c, a fourth traveling fluid tube 45d, and a fifth traveling fluid tube 45e.

The first traveling fluid tube 45a is a fluid tube connected to the forward-traveling pressure receiving portion 53a of the traveling pump 53L. The second traveling fluid tube 45b is a fluid tube connected to the backward-traveling pressure receiving portion 53b of the traveling pump 53L. The third traveling fluid tube 45c is a fluid tube connected to the forward-traveling pressure receiving portion 53a of the traveling pump 53R.

The fourth traveling fluid tube 45d is a fluid tube connected to the backward-traveling pressure receiving portion 53b of the traveling pump 53R. The fifth traveling fluid tube 45e is a fluid tube connecting the operation valve 55, the first traveling fluid tube 45a, the second traveling fluid tube 45b, the third traveling fluid tube 45c, and the fourth traveling fluid tube 45d.

When the operation lever 59 is swung forward (in a direction indicated by an arrowed line A1 in FIG. 1), the operation valve 55A is operated, and the pilot pressure is outputted from the operation valve 55A. This pilot pressure is applied to the pressure receiving portion 53a of the left traveling pump 53L through the first traveling fluid tube 45a, and is applied to the pressure receiving portion 53a of the right traveling pump 53R through the third traveling fluid tube 45c.

In this manner, the swash plate angles of the left traveling pump 53L and the right traveling pump 53R are changed, the left traveling motor 36L and the right traveling motor 36R rotate normally (the forward rotation), and thus the working machine 1 travels straight forward.

In addition, when the operation lever 59 is swung backward (in a direction indicated by an arrowed line A2 in FIG. 1), the operation valve 55B is operated, and the pilot pressure is outputted from the operation valve 55B. This pilot pressure is applied to the pressure receiving portion 53b of the left traveling pump 53L through the second traveling fluid tube 45b, and is applied to the pressure receiving portion 53b of the right traveling pump 53R through the fourth traveling fluid tube 45d.

In this manner, the swash plate angles of the left traveling pump 53L and the right traveling pump 53R are changed, the left traveling motor 36L and the right traveling motor 36R rotate reversely (the backward rotation), and thus the working machine 1 travels straight backward.

In addition, when the operation lever 59 is swung rightward (in a direction indicated by an arrowed line A3 in FIG. 1), the operation valve 55C is operated, and the pilot pressure is outputted from the operation valve 55C. This pilot pressure is applied to the pressure receiving portion 53a of the left traveling pump 53L through the first traveling fluid tube 45a, and is applied to the pressure receiving portion 53b of the right traveling pump 53R through the fourth traveling fluid tube 45d.

In this manner, the swash plate angles of the left traveling pump 53L and the right traveling pump 53R are changed, the left traveling motor 36L rotates normally and the right traveling motor 36R rotates reversely, and thus the working machine 1 turns rightward.

In addition, when the operation lever 59 is swung leftward (in a direction indicated by an arrowed line A4 in FIG. 1), the operation valve 55D is operated, and the pilot pressure is outputted from the operation valve 55D. This pilot pressure is applied to the pressure receiving portion 53a of the right traveling pump 53R through the third traveling fluid tube 45c, and is applied to the pressure receiving portion 53b of the left traveling pump 53L through the second traveling fluid tube 45b.

In this manner, the swash plate angles of the left traveling pump 53L and the right traveling pump 53R are changed, the left traveling motor 36L rotates reversely and the right traveling motor 36R rotates normally, and thus the working machine 1 turns leftward.

When the operation lever 59 is swung in an oblique direction, the rotational directions and the revolving speeds of the left traveling motor 36L and the right traveling motor 36R are determined depending on the differential pressure between the pilot pressure applied to the pressure receiving portion 53a and the pilot pressure applied to the pressure receiving portion 53b. Thus, the working machine 1 turns right or left while traveling forward or backward.

That is, when the operation lever 59 is swung obliquely forward left, the working machine 1 turns left while traveling forward at a speed corresponding to the swing angle of the operation lever 59, and when the operation lever 59 is swung obliquely forward right, the working machine 1 turns right while traveling forward at a speed corresponding to the swing angle of the operation lever 59.

When the operation lever 59 is swung obliquely backward left, the working machine 1 turns left while traveling backward at a speed corresponding to the swing angle of the operation lever 59, and when the operation lever 59 is swung obliquely backward right, the working machine 1 turns right while traveling backward at a speed corresponding to the swing angle of the operation lever 59.

Figure 2A:
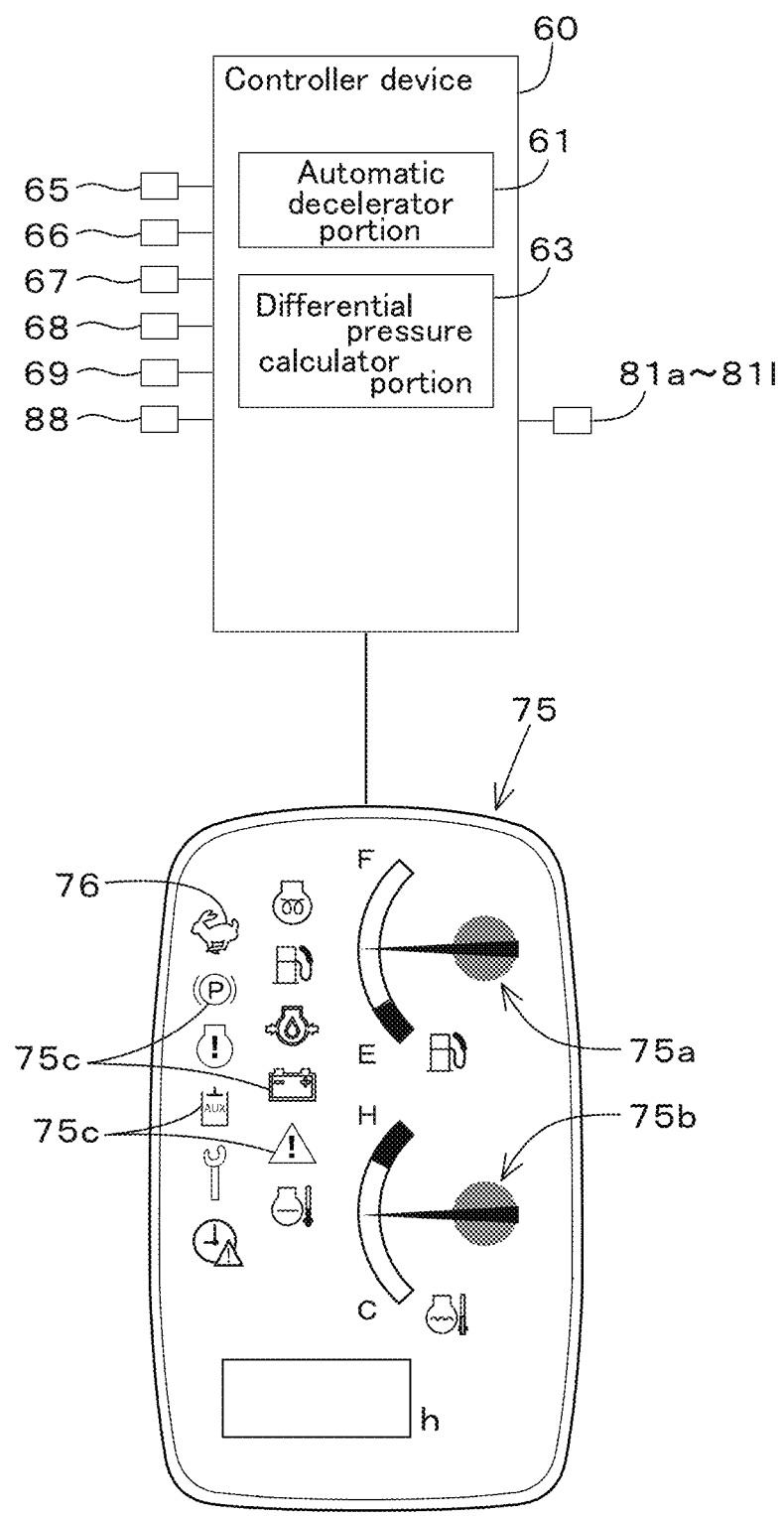
FIG. 2A is a view illustrating a display device according to the embodiment.

As shown in FIG. 2A, the working machine 1 includes a display device 75. The display device 75 is a device that displays various information relating to the working machine 1, and is arranged, for example, in front of or on the side of the operator seat 8.

The display device 75 is constituted of a panel or the like for displaying driving information, warning information, and the like. The display device 75 has, for example, a fuel gauge 75a for indicating the remaining amount of fuel as the driving information, a thermometer 75b for indicating the water temperature as the driving information, and a plurality of warning lights 75c for displaying the warning information as the driving information.

In addition, the display device 75 has a display portion 76 configured to display the speeds of the pair of traveling motors (the left traveling motor 36L and the right traveling motor 36R) (the speeds of traveling devices) as the driving information and configured to display that the speed of the traveling device (the revolving speed of the traveling motor) is the second speed (the high speed side).

The display portion 76 is a lamp such as an LED configured to light on and off, to blink, and the like. When the revolving speed of the traveling motor is the second speed, the display portion 76 is turned on. When the revolving speed of the traveling motor is not the second speed but the first speed, the display portion 76 is turned off.

As shown in FIG. 2A, the working machine 1 includes a controller device 60. The controller device 60 performs various controls of the working machine 1, and is constituted of a semiconductor such as a CPU and an MPU, an electric circuit, an electronic circuit, or the like.

An accelerator 65, a mode switch 66, a speed-changing switch 67, and a revolving speed detector device 68 are connected to the controller device 60. The accelerator 65 is a member used for setting the prime mover revolving speed 32 (the prime mover revolving speed), and is provided in the vicinity of the operator seat 8.

The accelerator 65 is an accelerator lever swingably supported, an accelerator pedal swingably supported, an accelerator volume swingably supported, an accelerator slider slidably supported, or the like. The accelerator 65 is not limited to the example described above.

The mode switch 66 is a switch configured to switch the automatic deceleration (the auto shift down) between valid and invalid. For example, the mode switch 66 is a switch configured to be switched between ON and OFF. When the mode switch 66 is ON, the automatic deceleration is switched to be valid. When the mode switch 66 is OFF, the automatic deceleration is switched to be invalid.

The speed-changing switch 67 is provided in the vicinity of the operator seat 8, and is configured to be operated by a driver (an operator). The speed-changing switch 67 is a switch configured to manually switch the traveling motors (the left traveling motor 36L and the right traveling motor 36R) to any one of the first speed and the second speed.

For example, the speed-changing switch 67 is a seesaw switch configured to switch between the first speed side and the second speed side, and is configured to perform an accelerating operation that switches from the first speed side to the second speed side, and to perform a decelerating operation that switches from the second speed to the first speed.

The revolving speed detector device 68 is constituted of a sensor or the like configured to detect the revolving speed, and detects the current revolving speed of the prime mover (the prime mover revolving speed). The revolving speed detector device 68 may be a device configured to detect the prime mover revolving speed based on the operation amount of the accelerator 65.

As shown in FIG. 1 and FIG. 2, the controller device 60 includes an automatic decelerator portion 61. The automatic decelerator portion 61 is constituted of an electric circuit or an electronic circuit provided in the controller device 60 or of a computer program or the like stored in the controller device 60.

The automatic decelerator portion 61 performs the automatic deceleration control when the automatic deceleration is valid, and does not perform the automatic deceleration control when the automatic deceleration is invalid.

Under the automatic deceleration control, when a predetermined condition (an automatic deceleration condition) is satisfied under a state where the traveling motors (the left traveling motor 36L and the right traveling motor 36R) are at the second speed, the traveling motors (the left traveling motor 36L and the right traveling motor 36R) are automatically switched from the second speed to the first speed.

Under the automatic deceleration control, when the automatic deceleration condition is satisfied at least under the state where the traveling motors (the left traveling motor 36L and the right traveling motor 36R) are at the second speed, the controller device 60 demagnetizes the solenoid of the second switching valve 72 to switch the second switching valve 72 from the second position 72b to the first position 72a. Thus, the traveling motors (the left traveling motor 36L and the right traveling motor 36R) are decelerated from the second speed to the first speed.

That is, when performing the automatic deceleration (the auto shift down) in the automatic deceleration control, the controller device 60 decelerates both of the left traveling motor 36L and the right traveling motor 36R from the second speed to the first speed.

When a return condition is satisfied after the automatic deceleration is performed, the automatic decelerator portion 61 magnetizes the solenoid of the second switching valve 72 to switch the second switching valve 72 from the first position 72a to the second position 72b. In this manner, the speeds of the traveling motors (the left traveling motor 36L and the right traveling motor 36R) are increased from the first speed to the second speed, that is, the speeds of the traveling motors are recovered.

That is, when returning from the first speed to the second speed, the controller device 60 accelerates both of the left traveling motor 36L and the right traveling motor 36R from the first speed to the second speed.

When the automatic deceleration is invalid, the controller device 60 performs a manual switching control to switch the traveling motors (the left traveling motor 36L and the right traveling motor 36R) to either one of the first speed and the second speed in response to operation of the speed switching switch 67.

In the manual switching control, when the speed-changing switch 67 is switched to the first speed side, the controller device 60 demagnetizes the solenoid of the second switching valve 72 so that the traveling motors (the left traveling motor 36L and the right traveling motor 36R) are switched to the first speed.

In addition, in the manual switching control, when the speed-changing switch 67 is switched to the second speed side, the controller device 60 demagnetizes the solenoid of the second switching valve 72 so that the traveling motors (the left traveling motor 36L and the right traveling motor 36R) are switched to the second speed.

When the automatic deceleration (the automatic deceleration control) is being performed, the display device 75 displays that the automatic deceleration is being performed. When the automatic deceleration is performed, the display device 75 (the display portion 76) displays the automatic deceleration in a display mode different from that of the second speed.

Figure 3:
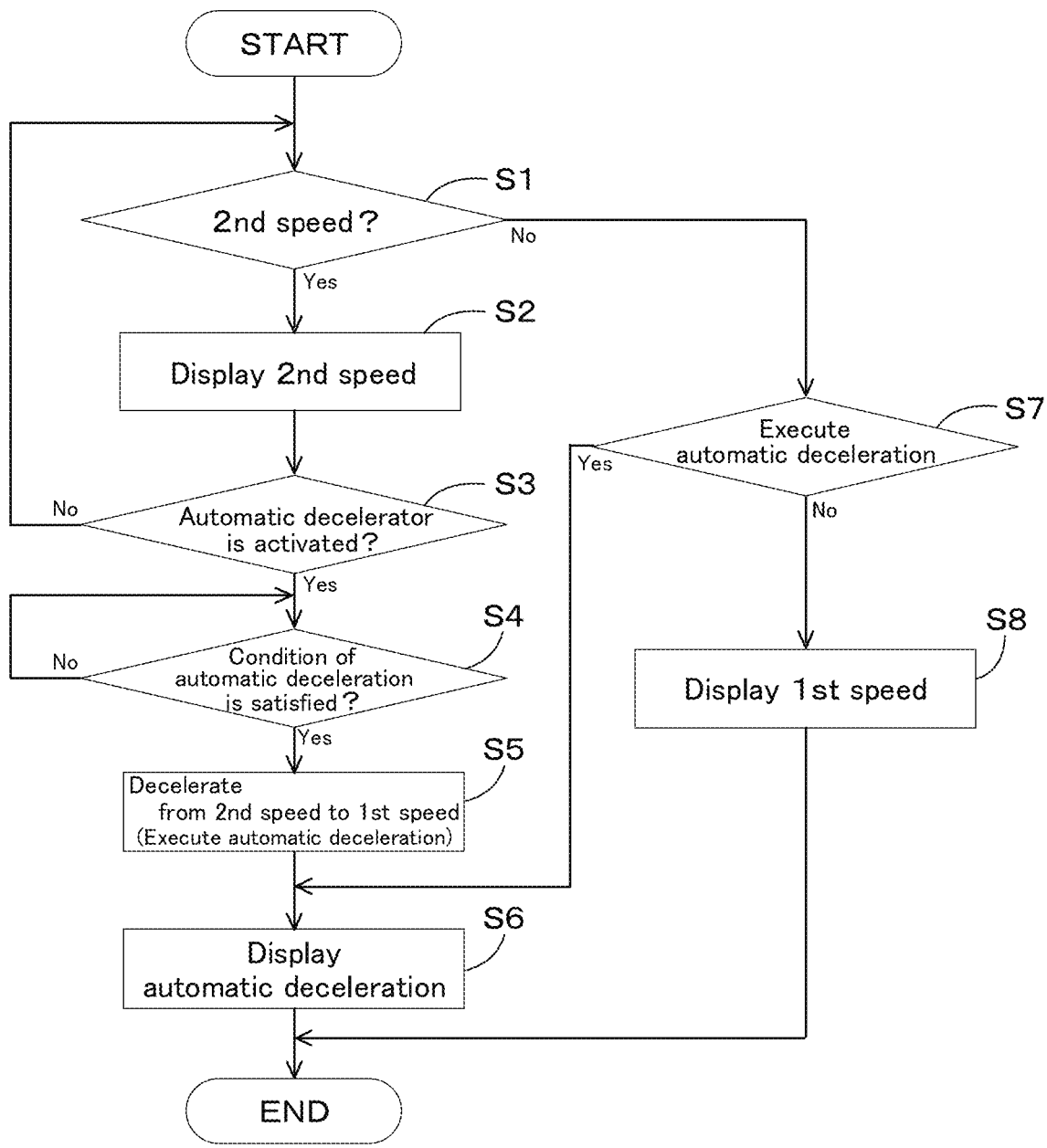
FIG. 3 is a view illustrating a flowchart of operations of a controller device and the display device according to the embodiment.

FIG. 3 is a flowchart showing the operation of the controller device 60 and the operation of the display device 75.

As shown in FIG. 3, the controller device 60 judges whether the traveling motors (the left traveling motor 36L and the right traveling motor 36R) are at the second speed (step S1).

When the traveling motor is at the second speed (step S1, Yes), the display device 75 turns on the display portion 76 to display the second speed (step S2).

The controller device 60 (the automatic decelerator portion 61) judges whether or not the automatic deceleration is valid (step S3).

When the automatic deceleration is valid (step S3, Yes), the controller device 60 (the automatic decelerator portion 61) judges whether the automatic deceleration condition is satisfied (step S4).

When the automatic deceleration condition is satisfied (step S4, Yes), the automatic decelerator portion 61 executes the automatic deceleration control to decelerate the traveling motor from the second speed to the first speed (step S5).

The display device 75 flashes the display portion 76 to display that the automatic deceleration is being performed (step S6).

For example, the display portion 76 of the display device 75 blinks when the second switching valve 72 switches from the second position 72b to the first position 72a to perform the automatic deceleration control. The display portion 76 of the display device 75 is turned off when the first speed is set through the operation of the driver (the operator).

On the other hand, when the traveling motors (the left traveling motor 36L and the right traveling motor 36R) are not at the second speed (step S1, No), the display portion 76 of the display device 75 blinks when the automatic deceleration is performed, and the controller device 60 judges whether the automatic deceleration has been performed (step S7).

When the automatic deceleration has not been performed (step S7, No), the display device 75 turns off the display portion 76 to represent that the current speed is the first speed (step S8).

As described above, the display device 75 (the display portion 76) is turned on when the current speed is the second speed regardless of whether the automatic deceleration is valid or invalid (turned on when the current speed is the second speed and the automatic deceleration is not performed), and blinks when the automatic deceleration is performed.

That is, the display device 75 (the display portion 76) blinks when the automatic deceleration is performed under the state where the automatic deceleration is enabled by the mode switch 66, and is turned on when the automatic deceleration is not performed under the state where the current speed is the second speed.

Thus, the display mode of the display portion 76 indicating that the traveling motor is at the second speed is changed between a display mode indicating the second speed (lighting) and a display mode indicating the automatic deceleration (flashing). In this manner, it is possible for one display section 76 to display that the automatic deceleration is being performed.

Figure 2B:
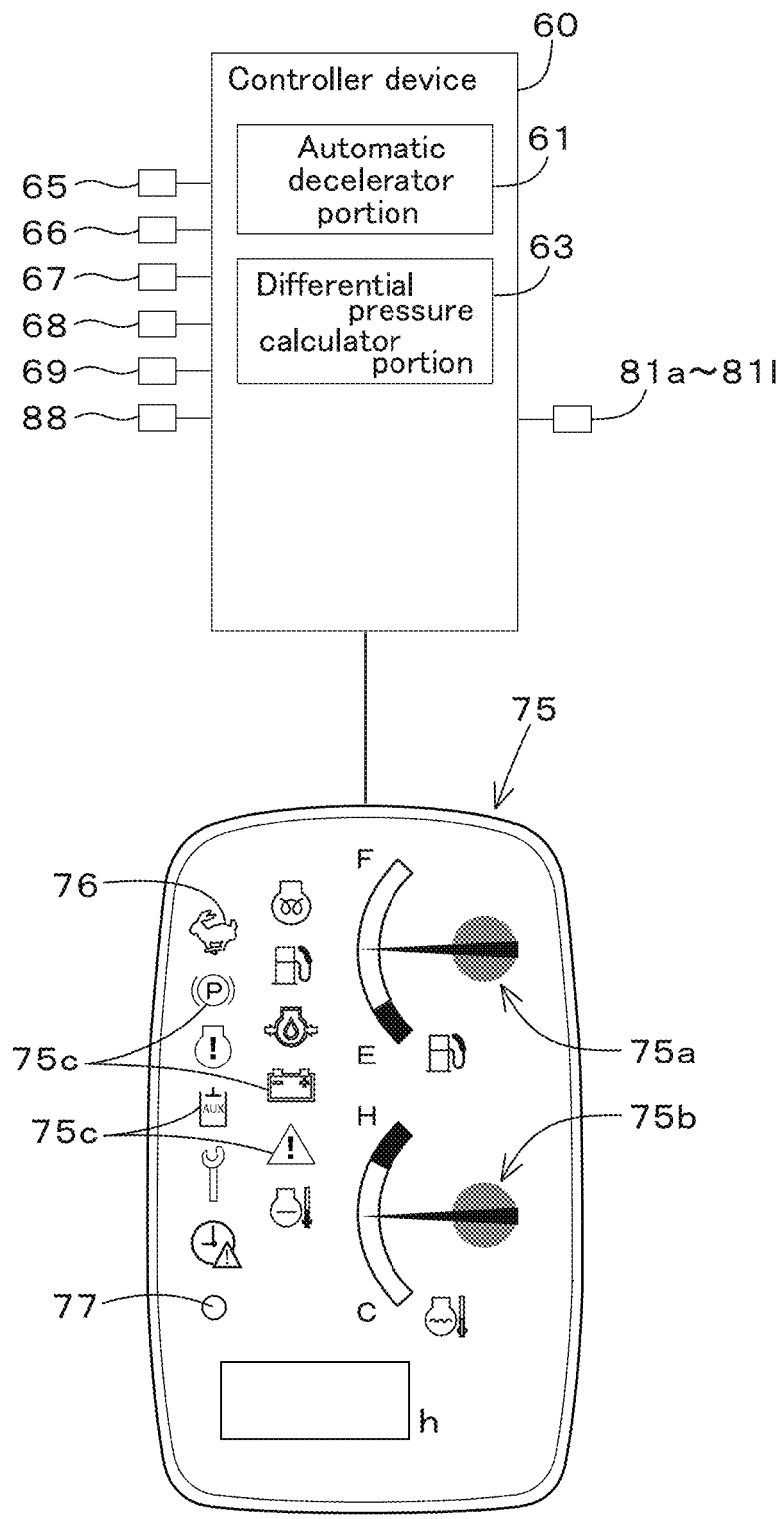
FIG. 2B is a view illustrating another display device according to the embodiment.

In the embodiment described above, the display portion 76 configured to indicate the second speed blinks to indicate that the automatic deceleration is being performed. Alternatively, as shown in FIG. 2B, a display portion 77 may be provided separately from the display portion 77 to indicate on the display portion 77 that the automatic deceleration is being performed.

The display portion 77 is, for example, a lamp such as an LED that can be turned on and off. The display portion 77 is turned on when the automatic deceleration is performed, and is turned off when the automatic deceleration is not performed. The display mode of the display portion 77 is not limited thereto, and may blink to indicate that the automatic deceleration is being performed.

Next, an automatic deceleration condition, which is a condition under which the automatic deceleration control is executed, will be described.

The controller device 60 (the automatic decelerator portion 61) employs the pressures of the connector fluid tubes 57h and 57i as one of the automatic deceleration conditions. The traveling pump pressure detector device 80 that detects the pressures of the connector fluid tubes 57h and 57i as the traveling pump pressure V is connected to the controller device 60. That is, the traveling pump pressure detector device 80 detects the pressure of the operation fluid outputted to the connector fluid tubes 57h and 57i by the left traveling pump 53L and the right traveling pump 53R (the pressures in the connector fluid tubes 57h and 57i) as the traveling pump pressure V.

The traveling pump pressure detector device 80 is configured to detect a plurality of traveling pump pressures of the traveling motor. In particular, the left traveling motor 36L has a first port P11 and a second port P12, and the right traveling motor 36R has a third port P13 and a fourth port P14. The traveling pump pressure detector device 80 detects the traveling pump pressures on the first port P11 side, on the second port P12 side, on the third port P13 side, and on the fourth port P14 side in the connector fluid tubes 57h and 57i.

The first port P11 is a port on the output side under the state where the left traveling motor 36L rotates normally, and the second port P12 is a port on the suction side under the state where the left traveling motor 36L rotates normally. The third port P13 is a port on the output side under the state where the right traveling motor 36R rotates normally, and the fourth port P14 is a port on the suction side under the state where the right traveling motor 36R rotates normally.

As shown in FIG. 1 and FIG. 2, the traveling pump pressure detector device 80 includes a first pressure detector device 80a, a second pressure detector device 80b, a third pressure detector device 80c, and a fourth pressure detector device 80d.

The first pressure detector device 80a is provided on the first port P11 side of the left traveling motor 36L in the connector fluid tube 57h, and detects the traveling pump pressure V on the first port P11 side as the first traveling pump pressure V1.

The second pressure detector device 80b is provided on the second port P12 side of the left traveling motor 36L in the connector fluid tube 57h, and detects the traveling pump pressure V on the second port P12 side as the second traveling pump pressure V2.

The third pressure detector device 80c is provided on the third port P13 side of the right traveling motor 36R in the connector fluid tube 57i, and detects the traveling pump pressure V on the third port P13 side as the third traveling pump pressure V3.

The fourth pressure detector device 80d is provided on the fourth port P14 side of the right traveling motor 36R in the connector fluid tube 57i, and detects the traveling pump pressure V on the fourth port P14 side as the fourth traveling pump pressure V4.

The controller device 60 performs the automatic deceleration when the traveling pump pressure V (V1 to V4) detected by the traveling pump pressure detector device 80 is equal to or higher than the first decelerating judgment pressure PV1 under the state where any one of the pair of traveling motors is at the second speed.

Hereinafter, judgment of the automatic deceleration using the traveling pump pressures V (V1 to V4) and the first decelerating judgment pressure PV1 will be described in detail.

The controller device 60 is connected to a first storage device 81a constituted of a non-volatile memory or the like. Note that the controller device 60 may incorporate the first storage device 81a.

As shown in FIG. 4A, the first storage device 81a stores the first decelerating judgment pressure PV1 in association with a prime mover revolving speed. That is, the first storage device 81a stores a first decelerating judgment table T1 indicating the relation between the prime mover revolving speed and the first decelerating judgment pressure PV1.

In the first decelerating judgment table T1, the first decelerating judgment pressure PV1 increases as the prime mover revolving speed increases. When the prime mover revolving speed is high, the first decelerating judgment pressure PV1 also has a high value, and when the prime mover revolving speed is low, the first decelerating judgment pressure PV1 also has a low value.

In the first decelerating judgment table T1, when the prime mover revolving speed is 1000 rpm or more and less than 1250 rpm, the first decelerating judgment pressure PV1 is 24 MPa, for example. When the prime mover revolving speed is 1250 rpm or more and less than 1500 rpm, the first decelerating judgment pressure PV1 is 25 MPa. When the prime mover revolving speed is 1500 rpm or more and less than 1750 rpm, the first decelerating judgment pressure PV1 is 26 MPa. When the prime mover revolving speed is 1750 rpm or more and less than 2000 rpm, the first decelerating judgment pressure PV1 is 27 MPa. When the prime mover revolving speed is 2000 rpm or more and less than 2250 rpm, the first decelerating judgment pressure PV1 is 28 MPa. When the prime mover speed is 2250 rpm or more and less than 2500 rpm, the first decelerating judgment pressure PV1 is 29 MPa. When the prime mover revolving speed is 2500 rpm or more, the first decelerating judgment pressure PV1 is 30 MPa.

That is, in the first decelerating judgment table T1, the numerical value of the prime mover revolving speed indicates a boundary value for setting the first decelerating judgment pressure PV1.

Under the state where the traveling motors (the left traveling motor 36L and the right traveling motor 36R) are at the second speed, the automatic decelerator portion 61 extracts the first decelerating judgment pressure PV1 from the first decelerating judgment table T1 and the prime mover revolving speed detected by the revolving speed detector device 68.

For example, when the prime mover revolving speed is 1300 rpm, the automatic decelerator portion 61 extracts, from the first decelerating judgment table T1, the first decelerating judgment pressure PV1 of 25 MPa. And, the automatic decelerator portion 61 extracts, from the first decelerating judgment table T1, the first decelerating judgment pressure PV1 of 28 MPa.

The automatic decelerator portion 61 performs the automatic deceleration when the traveling pump pressures V1 to V4 detected by the traveling pump pressure detector device 80 are equal to or higher than the first decelerating judgment pressure PV1 extracted from the first decelerating judgment table T1.

In particular, the automatic decelerator portion 61 performs the automatic deceleration to decelerate the traveling motors (the left traveling motor 36L and the right traveling motor 36R) from the second speed to the first speed when any one of the first traveling pump pressure V1, the second traveling pump pressure V2, the third traveling pump pressure V3, and the fourth traveling pump pressure V4 is equal to or higher than the first decelerating judgment pressure PV1.

Then, after performing the automatic deceleration, the automatic decelerator portion 61 performs the control (a return control) to return the traveling motors (the left traveling motor 36L and the right traveling motor 36R) from the first speed to the second speed when the automatic deceleration is valid.

The controller device 60 is connected to a second storage device 81b constituted of a nonvolatile memory and the like. Note that the controller device 60 may incorporate the second storage device 81b.

Figure 4B:
FIG. 4B is a view illustrating a first returning judgment table U1 according to the embodiment.

As shown in FIG. 4B, the second storage device 81b stores the first returning judgment pressure QV1 in association with the prime mover revolving speed. That is, the second storage device 81b stores the first returning judgment table U1 representing the relation between the prime mover revolving speed and the first returning judgment pressure QV1.

In the first returning judgment table U1, the first returning judgment pressure QV1 increases as the prime mover revolving speed increases, and when the prime mover revolving speed is high, the first returning judgment pressure QV1 also has a high value. And, when the prime mover revolving speed is low, the first returning judgment pressure QV1 also has a low value.

In the first returning judgment table U1, similarly to the first decelerating judgment table T1 described above, the numerical value of the prime mover revolving speed indicates a boundary value for setting the first returning judgment pressure QV1. For example, when the prime mover revolving speed is 1600 rpm, the first returning judgment pressure QV1 is 16 MPa.

The automatic decelerator portion 61 extracts the first returning judgment pressure QV1 from the first returning judgment table U1 and the prime mover revolving speed detected by the revolving speed detector device 68 after the automatic deceleration, and returns the traveling motors (the left traveling motor 36L and the right traveling motor 36R) from the first speed to the first traveling speed when the traveling pump pressures V1 to V4 detected by the traveling pump pressure detector device 80 are equal to or lower than the first returning judgment pressure QV1 extracted from the first returning judgment table U1.

More specifically, the automatic decelerator portion 61 accelerates the traveling motors (the left traveling motor 36L and the right traveling motor 36R) from the first speed to the second speed when the first traveling pump pressure V1, the second traveling pump pressure V2, the third traveling pump pressure V3, and the fourth traveling pump pressure V4 have fallen to be equal to or less than the first returning judgment pressure QV1.

Figure 5:
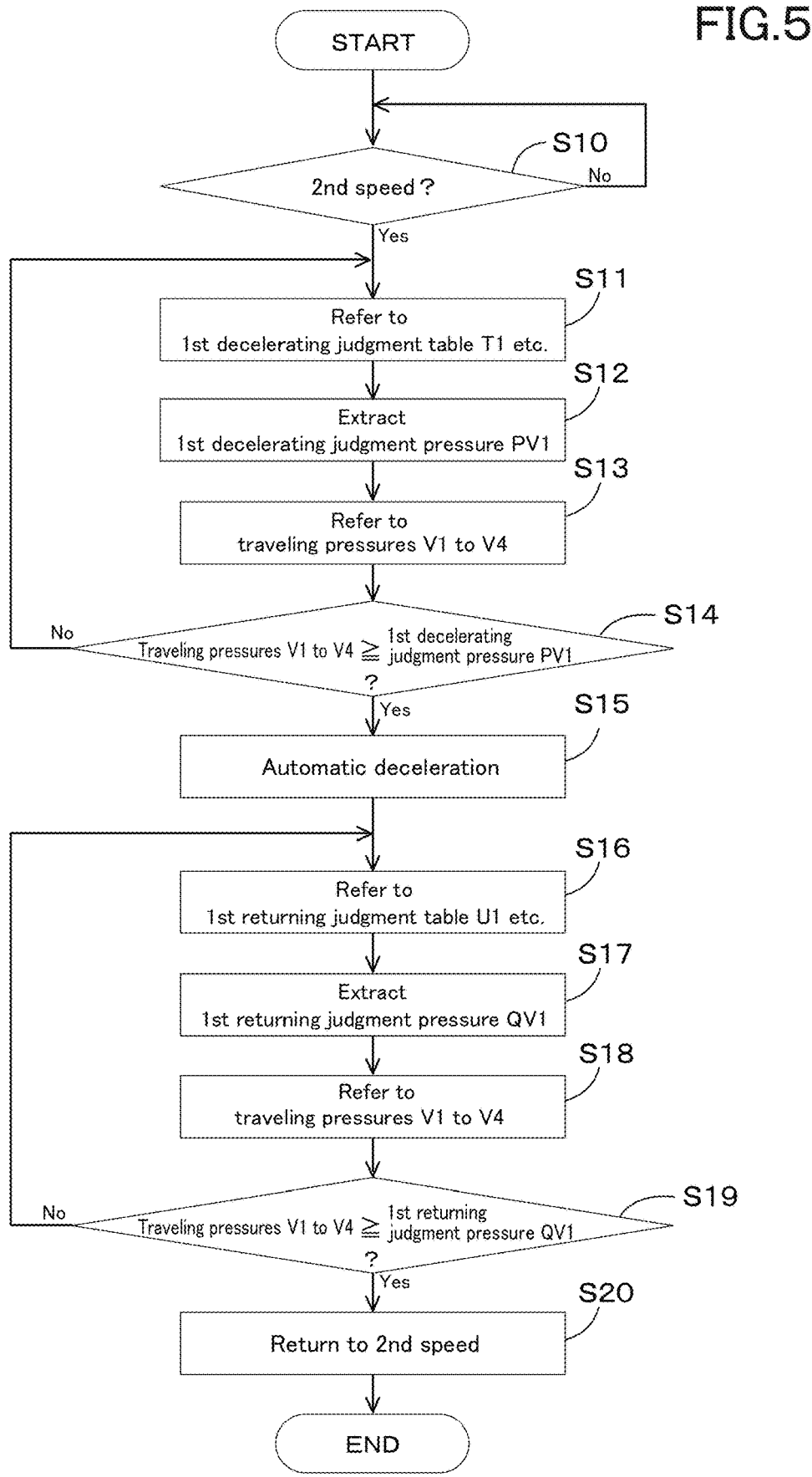
FIG. 5 is a view illustrating a first process in an automatic decelerator portion according to the embodiment.

FIG. 5 is a view summarizing the processing in the automatic decelerator portion 61.

As shown in FIG. 5, under the state where the automatic deceleration is valid and the traveling motor is at the second speed (step S10, Yes), the automatic decelerator portion 61 refers to the first decelerating judgment table T1 and the prime mover revolving speed detected by the revolving speed detector device 68 (step S11).

The automatic decelerator portion 61 extracts the first decelerating judgment pressure PV1 from the first decelerating judgment table T1 based on the prime mover revolving speed (step S12).

The automatic decelerator portion 61 refers to the traveling pump pressures V1 to V4 detected by the traveling pump pressure detector device 80 (step S13).

The automatic decelerator portion 61 judges whether any one of the traveling pump pressures V1 to V4 is equal to or higher than the first decelerating judgment pressure PV1 (step S14).

When any one of the traveling pump pressures V1 to V4 is equal to or higher than the first decelerating judgment pressure PV1 (step S14, Yes), the automatic decelerator portion 61 performs the automatic deceleration (step S15).

After performing the automatic deceleration, the automatic decelerator portion 61 refers to the first returning judgment table U1 and the prime mover revolving speed detected by the revolving speed detector device 68 (step S16).

The automatic decelerator portion 61 extracts the first returning judgment pressure QV1 from the first returning judgment table U1 based on the prime mover revolving speed (step S17).

The automatic decelerator portion 61 refers to the traveling pump pressures V1 to V4 (step S18).

The automatic decelerator portion 61 performs the return control when all of the traveling pump pressures V1 to V4 are equal to or lower than the first returning judgment pressure QV1 (step S19).

When all of the traveling pump pressures V1 to V4 are equal to or lower than the first returning judgment pressure QV1 (step S19, Yes), the automatic decelerator portion 61 performs the return control (step S20).

The working machine 1 includes the first storage device 81*a* and the controller device 60 having the automatic decelerator portion 61. The automatic decelerator portion 61 extracts the first decelerating judgment pressure PV1 from the first decelerating judgment table T1 and the prime mover revolving speed detected by the revolving speed detector device 68 when the traveling motor is at the second speed, and the automatic decelerator portion 61 performs the automatic deceleration when the traveling pump pressures V1 to V4 detected by the traveling pump pressure detector device 80 are equal to or higher than the first decelerating judgment pressure PV1.

According to that configuration, the automatic deceleration is performed based on the first decelerating judgment pressure PV1 corresponding to the prime mover revolving speed, and thus the automatic deceleration can be performed at an optimal timing under the state where the working machine 1 is operated. That is, the automatic deceleration can be appropriately performed according to the revolving speed of prime mover, and thereby the working efficiency can be improved.

The working machine 1 includes the second storage device 81*b*. The automatic decelerator portion 61 extracts the first returning judgment pressure QV1 based on the first returning judgment table U1 and the prime mover revolving speed detected by the revolving speed detector device 68 after the automatic deceleration, and returns the traveling motors from the first speed to the second speed when the traveling pump pressures V1 to V4 detected by the traveling pump pressure detector device 80 after the automatic deceleration are equal to or lower than the first returning judgment pressure QV1.

According to that configuration, the return is performed based on the first returning judgment pressure QV1 corresponding to the revolving speed of prime mover, and thus the working machine 1 can be switched to the high speed side at an optimal timing under the state where the working machine 1 is operated.

The automatic decelerator portion 61 is configured to perform the automatic deceleration when any one of the first traveling pump pressure V1, the second traveling pump pressure V2, the third traveling pump pressure V3, and the fourth traveling pump pressure V4 is equal to or higher than the first decelerating judgment pressure PV1.

According to that configuration, for example, even under either one of the state where the left traveling device 5L operates on the forward traveling side, the state where the left traveling device 5L operates on the reverse traveling side, the state where the right traveling device 5R operates on the forward traveling side, and the state where the right traveling device 5R operates on the reverse traveling side, it is possible to appropriately perform the deceleration when a load is applied to the left traveling device 5L or to the right traveling device 5R.

When the first traveling pump pressure V1, the second traveling pump pressure V2, the third traveling pump pressure V3, and the fourth traveling pump pressure V4 are equal to or less than the first returning judgment pressure QV1, the automatic decelerator portion 61 returns the traveling motor from the first speed to the second speed.

According to that configuration, even under either one of the state where the left traveling device 5L operates on the forward traveling side, the state where the left traveling device 5L operates on the reverse traveling side, the state where the right traveling device 5R operates on the forward traveling side, and the state where the right traveling device 5R operates on the reverse traveling side, the speed can be appropriately increased when the load applied to the left traveling device 5L or the right traveling device 5R is eliminated.

The first storage device 81*a* stores the first decelerating judgment table T1 in which the first decelerating judgment pressure PV1 increases as the prime mover revolving speed increases. According to that configuration, the working machine 1 efficiently performs the working with a large working load.

The second storage device 81*b* stores the first returning judgment table U1 in which the first returning judgment pressure QV1 increases as the prime mover revolving speed increases. According to that configuration, the working machine 1 efficiently performs the working with a large working load.

In the embodiment described above, the plurality of traveling pump pressures V1 to V4 are employed as a condition for the automatic deceleration. Instead, the automatic deceleration may be performed based on a differential pressure (a traveling differential pressure) between the traveling pump pressures V1 and V3 of left traveling motor 36L for driving the left traveling device 5L and the traveling pump pressures V2 and V4 of the right traveling motor 36R for driving the right traveling device 5R. That is, the traveling differential pressure may be employed as a condition for the automatic deceleration.

The controller device 60 includes a differential pressure calculator portion 63. The differential pressure calculator portion 63 is constituted of an electric circuit, an electronic circuit or the like provided in the controller device 60 or a computer program or the like stored in the controller device 60.

Of the left traveling motor 36L and the right traveling motor 36R, the differential pressure calculator portion 63 is configured to calculate the traveling differential pressures V5 and V6 between the traveling pump pressures V1 and V2 (the traveling pump pressures on one side) generated when the left traveling motor 36L is driven and the traveling pump pressures V3 and V4 (the traveling pump pressures on the other side) generated when the right traveling motor 36R is driven.

The controller device 60 is connected to a third storage device 81*c* constituted of a nonvolatile memory or the like. Note that the controller device 60 may incorporate the third storage device 81*c*.

As shown in FIG. 6A, the third storage device 81*c* stores the second decelerating judgment pressure PV2 in association with the prime mover revolving speed. That is, the third storage device 81*c* stores the second decelerating judgment table T2 representing the relation between the prime mover revolving speed and the second decelerating judgment pressure PV2.

In the second decelerating judgment table T2, the second decelerating judgment pressure PV2 increases as the prime mover revolving speed increases. When the prime mover revolving speed is high, the second decelerating judgment pressure PV2 also has a high value, and when the prime mover revolving speed is low, the second decelerating judgment pressure PV2 also has a low value.

In the second decelerating judgment table T2, similarly to the first decelerating judgment table T1 described above, the numerical value of the prime mover revolving speed indicates a boundary value for setting the second decelerating judgment pressure PV2. For example, when the prime mover revolving speed is 1600 rpm, the second decelerating judgment pressure PV2 is 16 MPa.

The differential pressure calculator portion 63 calculates, as the traveling differential pressure V5, a first differential pressure which is a difference between the first traveling pump pressure V1 and the third traveling pump pressure V3, and calculates, as the traveling differential pressure V6, a second differential pressure which is a difference between the second traveling pump pressure V2 and the fourth traveling pump pressure V4.

Under the state where the traveling motors (the left traveling motor 36L and the right traveling motor 36R) are at the second speed, the automatic decelerator portion 61 extracts the second decelerating judgment pressure PV2 from the second decelerating judgment table T2 and the prime mover revolving speed detected by the revolving speed detector device 68.

The automatic decelerator portion 61 performs the automatic deceleration when the traveling differential pressures V5 and V6 calculated by the differential pressure calculator portion 63 are equal to or higher than the second decelerating judgment pressure PV2 extracted from the second decelerating judgment table T2. In particular, the automatic decelerator portion 61 performs the automatic deceleration when any one of the first differential pressure (V5) and the second differential pressure (V6) is equal to or higher than the second decelerating judgment pressure PV2.

After the automatic deceleration is performed, the automatic decelerator portion 61 performs the return control if the automatic deceleration is valid.

The controller device 60 is connected to a fourth storage device 81d constituted of a nonvolatile memory or the like. The controller device 60 may incorporate the fourth storage device 81d.

As shown in FIG. 6B, the fourth storage device 81d stores the second returning judgment pressure QV2 in association with the prime mover revolving speed. That is, the fourth storage device 81d stores a second returning judgment table U2 representing the relation between the prime mover revolving speed and the second returning judgment pressure QV2.

In the second returning judgment table U2, the second returning judgment pressure QV2 increases as the revolving speed of the motor increases. When the prime mover revolving speed is high, the second returning judgment pressure QV2 also has a high value, and when the prime mover revolving speed is low, the second returning judgment pressure QV2 also has a low value.

In the second returning judgment table U2, similarly to the second decelerating judgment table T2 described above, the numerical value of the prime mover revolving speed indicates a boundary value for setting the second returning judgment pressure QV2. For example, when the prime mover revolving speed is 1600 rpm, the second returning judgment pressure QV2 is 17 MPa.

The automatic decelerator portion 61 extracts the second returning judgment pressure QV2 from the second returning judgment table U2 and the prime mover revolving speed detected by the revolving speed detector device 68 after the automatic deceleration, and performs the return control when the traveling differential pressures V5 and V6 calculated by the differential pressure calculator portion 63 are equal to or lower than the second returning judgment pressure QV2 extracted from the second returning judgment table U2. In particular, the automatic decelerator portion 61 accelerates the traveling motor from the first speed to the second speed when the traveling differential pressures V5 and V6 become equal to or lower than the second returning judgment pressure QV2.

Figure 7:
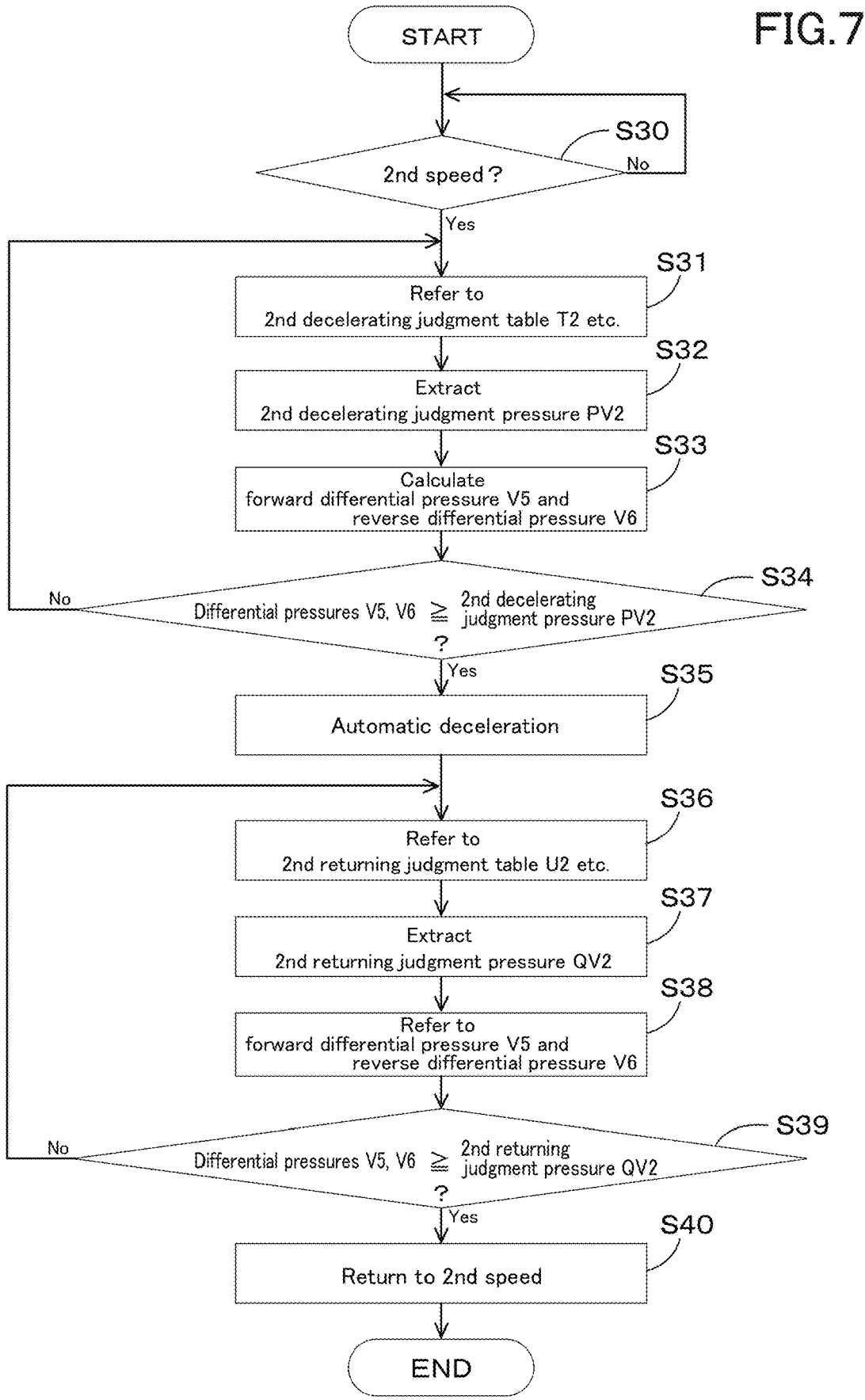
FIG. 7 is a view illustrating a second process in the automatic decelerator portion according to the embodiment.

FIG. 7 is a view summarizing the processing in the automatic decelerator portion 61.

As shown in FIG. 7, under the state where the automatic deceleration is valid and the traveling motor is at the second speed (step S30, Yes), the automatic decelerator portion 61 refers to the second decelerating judgment table T2 and the prime mover revolving speed detected by the revolving speed detector device 68 (step S31).

The automatic decelerator portion 61 extracts the second decelerating judgment pressure PV2 from the second decelerating judgment table T2 based on the prime mover revolving speed (step S32).

The differential pressure calculator portion 63 calculates a first differential pressure (V5) and a second differential pressure (V6) based on the traveling pump pressures V1 to V4 (step S33).

The automatic decelerator portion 61 judges whether any one of the first differential pressure (V5) and the second differential pressure (V6) is equal to or higher than the second decelerating judgment pressure PV2 (step S34).

When any one of the first differential pressure (V5) and the second differential pressure (V6) is equal to or higher than the second decelerating judgment pressure PV2 (step S34, Yes), the automatic decelerator portion 61 performs the automatic deceleration (step S35).

After performing the automatic deceleration, the automatic decelerator portion 61 refers to the second returning judgment table U2 and the prime mover revolving speed detected by the revolving speed detector device 68 (step S36).

The automatic decelerator portion 61 extracts the second returning judgment pressure QV2 from the second returning judgment table U2 based on the prime mover revolving speed (step S37).

The automatic decelerator portion 61 refers to the first differential pressure (V5) and the second differential pressure (V6) after the automatic deceleration (step S38).

The automatic decelerator portion 61 judges whether the first differential pressure (V5) and the second differential pressure (V6) are equal to or lower than the second returning judgment pressure QV2 (step S39).

When the first differential pressure (V5) and the second differential pressure (V6) are equal to or lower than the second returning judgment pressure QV2 (step S39, Yes), the automatic decelerator portion 61 performs the return control (step S40).

The working machine 1 includes the third storage device 81c and the controller device 60 having the automatic decelerator portion 61 and the differential pressure calculator portion 63. The automatic decelerator portion 61 extracts the second decelerating judgment pressure PV2 from the second decelerating judgment table T2 and the prime mover revolving speed detected by the revolving speed detector device 68 when the traveling motor is at the second speed. And, the automatic decelerator portion 61 performs the automatic deceleration when any one of the traveling differential pressures V5 and V6 calculated by the differential pressure calculator portion 63 is equal to or higher than the second decelerating judgment pressure PV2.

According to that configuration, the automatic deceleration is performed based on the second decelerating judgment pressure PV2 based on the prime mover revolving speed, so that the working machine 1 can be switched to the high speed side at the optimal timing in the operating state. In particular, the automatic deceleration can be efficiently performed when the loads applied to the left traveling device 5L and to the right traveling device 5R are significantly different from each other.

The working machine 1 includes the fourth storage device 81d. And, the automatic decelerator portion 61 extracts the second returning judgment pressure QV2 based on the second returning judgment table U2 and the prime mover revolving speed detected by the revolving speed detector device 68 after the automatic deceleration, and returns the traveling motor from the first speed to the second speed when both of the traveling differential pressures V5 and V6 calculated by the differential pressure calculator portion 63 after the automatic deceleration are equal to or lower than the second returning judgment pressure QV2.

According to that configuration, since the returning is performed based on the second returning judgment pressure QV2 corresponding to the prime mover revolving speed, the working machine 1 can be switched to the high speed side at an optimal timing in the operating state. In particular, the returning can be efficiently performed when the loads applied to the left traveling device 5L and to the right traveling device 5R are significantly different from each other after the automatic deceleration.

The differential pressure calculator portion 63 calculates, as the traveling differential pressure, the first differential pressure (V5) that is a difference between the first traveling pump pressure V1 and the third traveling pump pressure V3, and calculates the second differential pressure (V6) that is a difference between the second traveling pump pressure V1 and the fourth traveling pump pressure V4. And, the automatic decelerator portion 61 performs the automatic deceleration when either one of the first differential pressure (V5) and the second differential pressure (V6) is equal to or higher than the second decelerating judgment pressure PV2.

According to that configuration, the automatic deceleration can be efficiently performed in any situation where the working machine 1 is moving forward or backward.

When both the first differential pressure (V5) and the second differential pressure (V6) are equal to or lower than the second returning judgment pressure QV2, the automatic decelerator portion 61 returns at least one of the traveling motors from the first speed to the second speed.

According to that configuration, the returning can be efficiently performed in any situation where the working machine 1 is moving forward or backward.

The third storage device 81c stores the second decelerating judgment table T2 in which the second decelerating judgment pressure PV2 increases as the prime mover revolving speed increases. According to that configuration, in the working machine 1, the working with a large working load can be efficiently performed.

The fourth storage device 81d stores the second returning judgment table U2 in which the second returning judgment pressure QV2 increases as the prime mover revolving speed increases. According to that configuration, in the working machine 1, the working with a large working load can be efficiently performed.

In the above-described embodiment, the automatic deceleration is performed based on the plurality of traveling pump pressures V1 to V4 corresponding to the prime mover revolving speed. However, the automatic deceleration may be performed based on the plurality of traveling pump pressures V1 to V4 corresponding to the swash plate angles of the traveling pumps (the left traveling pump 53L and the right traveling pump 53R).

The swash plate angle detector device 69 and the fifth storage device 81e are connected to the controller device 60. The swash plate angle detector device 69 is a device configured to detect the swash plate angles of the traveling pumps (the left traveling pump 53L and the right traveling pump 53R).

The swash plate angle detector device 69 may be, for example, a sensor configured to detect the pressure (the pilot pressure) of the operation fluid in the traveling fluid tube 45 and to convert the pilot pressure into the swash plate angle, a sensor configured to detect the operation extents of the regulators of the traveling pumps (the left traveling pump 53L and the right traveling pump 53R) to detect the swash plate angle, a variable resistor or a potentiometer for obtaining the swash plate angle based on the operation extent of the operation lever 59, or other sensors, and the swash plate angle detector device 69 is not limited thereto.

In this embodiment, the swash plate angle detector device 69 detects the pressure (the pilot pressure) of the operation fluid in the traveling fluid tube 45 to determine the swash plate angle of the traveling pump. Thus, in FIG. 8A and FIG. 8B, the swash plate angle is represented by a pilot pressure corresponding to the swash plate angle.

The fifth storage device 81e is a nonvolatile memory or the like.

Figure 8A:
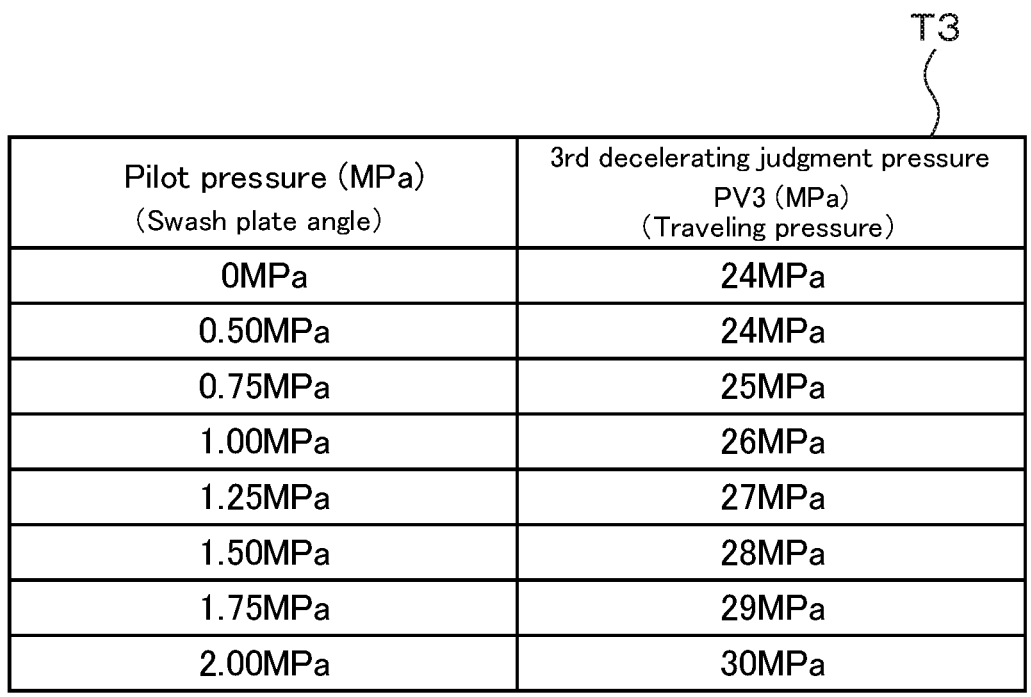
FIG. 8A is a view illustrating a third decelerating judgment table T3 according to the embodiment.

As shown in FIG. 8A, the third decelerating judgment pressure PV3 is stored in the fifth storage device 81e in association with the swash plate angle. That is, the fifth storage device 81e stores the third decelerating judgment table T3 indicating the relation between the swash plate angle (the pilot pressure corresponding to the swash plate angle) and the third decelerating judgment pressure PV3.

In the third decelerating judgment table T3, the third decelerating judgment pressure PV3 increases as the swash plate angle increases. When the swash plate angle is high, the third decelerating judgment pressure PV3 also has a high value, and when the swash plate angle is low, the third decelerating judgment pressure PV3 has also a low value.

In the third decelerating judgment table T3, similarly to the first decelerating judgment table T1 described above and the like, the numerical value of the swash plate angle indicates a boundary value for setting the third decelerating judgment pressure PV3. For example, when the pilot pressure corresponding to the swash plate angle is 0.8 MPa, the third decelerating judgment pressure PV3 is 26 MPa.

When the traveling motors (the left traveling motor 36L and the right traveling motor 36R) are at the second speed, the automatic decelerator portion 61 extracts the third decelerating judgment pressure PV3 from the third decelerating judgment table T3 and the swash plate angle detected by the swash plate angle detector device 69.

For example, when the pilot pressure corresponding to the swash plate angle is 1.60 MPa, the automatic decelerator portion 61 extracts the third decelerating judgment pressure PV3 of 28 MPa from the third decelerating judgment table T3, and when the pilot pressure corresponding to the swash plate angle is 1.10 MPa, the automatic decelerator portion 61 extracts the third decelerating judgment pressure PV3 of 26 MPa from the third decelerating judgment table T3.

The automatic decelerator portion 61 performs the automatic deceleration when either one of the traveling pump pressures V1 to V4 detected by the traveling pump pressure detector device 80 is equal to or higher than the third decelerating judgment pressure PV3 extracted from the third decelerating judgment table T3.

In particular, the automatic decelerator portion 61 performs the automatic deceleration for decelerating the traveling motors (the left traveling motor 36L and the right traveling motor 36R) from the second speed to the first speed when either one of the first traveling pump pressure V1, the second traveling pump pressure V2, the third traveling pump pressure V3, and the fourth traveling pump pressure V4 is equal to or higher than the third decelerating judgment pressure PV3.

Now, after the automatic deceleration, the automatic decelerator portion 61 performs the control (the return control) to return the traveling motors (the left traveling motor 36L and the right traveling motor 36R) from the first speed to the second speed when the automatic deceleration is valid.

The controller device 60 is connected to the sixth storage device 81f constituted of a nonvolatile memory or the like. Note that the controller device 60 may incorporate the sixth storage device 81f.

As shown in FIG. 8B, the third storage judgment pressure QV3 is stored in the sixth storage device 81f in association with the swash plate angle. That is, the sixth storage device 81f stores the third returning judgment table U3 representing the relation between the swash plate angle and the third returning judgment pressure QV3.

In the third returning judgment table U3, the third returning judgment pressure QV3 increases as the swash plate angle increases. When the swash plate angle is high, the third returning judgment pressure QV3 also has a high value, and when the swash plate angle is low, the third returning judgment pressure QV3 also has a low value.

In the third returning judgment table U3, similarly to the third decelerating judgment table T3 described above, the numerical value of the swash plate angle represents a boundary value for setting the third returning judgment pressure QV3. For example, when the pilot pressure corresponding to the swash plate angle is 0.8 MPa, the third returning judgment pressure QV3 is 16 MPa.

The automatic decelerator portion 61 extracts the third returning judgment pressure QV3 from the third returning judgment table U3 and the swash plate angle detected by the swash plate angle detector device 69 after the automatic deceleration, and returns the traveling motors (the left traveling motor 36L and the right traveling motor 36R) from the first speed to the second speed when the traveling pump pressures V1 to V4 detected by the traveling pump pressure detector device 80 are equal to or lower than the third returning judgment pressure QV3 extracted from the third returning judgment table U3.

In particular, the automatic decelerator portion 61 accelerates the traveling motors (the left traveling motor 36L and the right traveling motor 36R) from the first speed to the second speed at the timing when the first traveling pump pressure V1, the second traveling pump pressure V2, the third traveling pump pressure V3, and the fourth traveling pump pressure V4 become equal to or lower than the third returning judgment pressure QV3.

Figure 9:
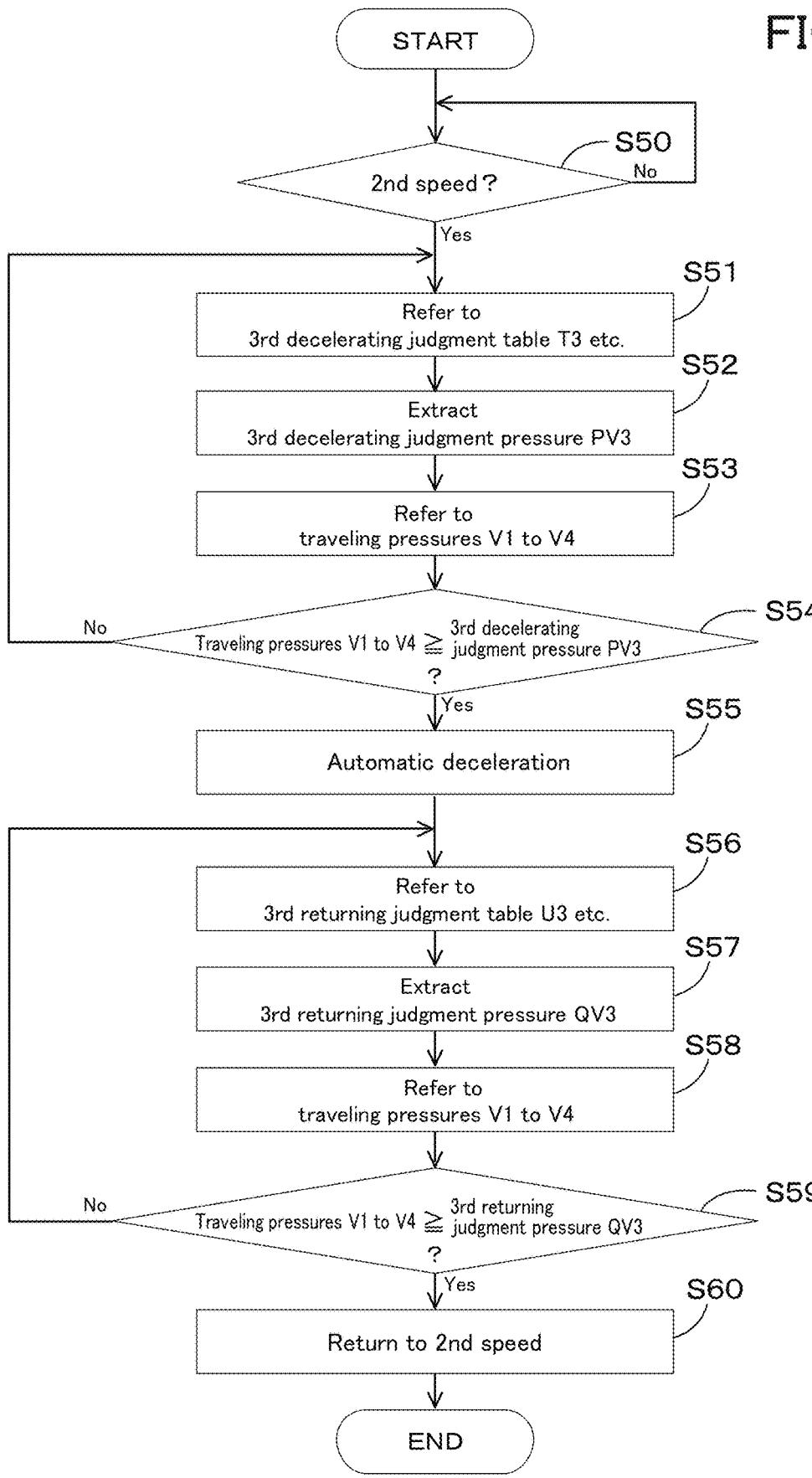
FIG. 9 is a view illustrating a third process in the automatic decelerator portion according to the embodiment.

FIG. 9 is a view summarizing the processing in the automatic decelerator portion 61.

As shown in FIG. 9, under the state where the automatic deceleration is valid and the traveling motor is at the second speed (step S50, Yes), the automatic decelerator portion 61 refers to the third decelerating judgment table T3 and the swash plate angle detected by the swash plate angle detector device 69 (step S51).

In the judgment for the automatic decelerator, the automatic decelerator portion 61 employs the swash plate angles of the traveling pumps (the left traveling pump 53L and the right traveling pump 53R) driven to the forward traveling side in the case of revolving normally, and employs the swash plate angles of the traveling pumps (the left traveling pump 53L and the right traveling pump 53R) driven to the backward traveling side in the case of revolving reversely.

In addition, the swash plate angles of the left traveling pump 53L and of the right traveling pump 53R can be detected in both cases where the traveling pumps (the left traveling pump 53L and the right traveling pump 53R) are driven to the forward traveling side and where the traveling pumps (the left traveling pump 53L and the right traveling pump 53R) are driven to the backward traveling side.

In this case, the automatic decelerator portion 61 uses, as a judgment value for the automatic deceleration or the like, a value obtained by averaging the swash plate angle of the left traveling pump 53L and the swash plate angle of the right traveling pump 53R, for example.

The automatic decelerator portion 61 extracts the third decelerating judgment pressure PV3 from the third decelerating judgment table T3 based on the swash plate angle (step S52).

The automatic decelerator portion 61 refers to the traveling pump pressures V1 to V4 detected by the traveling pump pressure detector device 80 (step S53).

The automatic decelerator portion 61 judges whether any one of the traveling pump pressures V1 to V4 is equal to or higher than the third decelerating judgment pressure PV3 (step S54).

When any one of the traveling pump pressures V1 to V4 is equal to or higher than the third decelerating judgment pressure PV3 (step S54, Yes), the automatic decelerator portion 61 performs the automatic deceleration (step S55).

After performing the automatic deceleration, the automatic decelerator portion 61 refers to the swash plate angle detected by the swash plate angle detector device 69 and the third returning judgment table U3 (step S56).

The automatic decelerator portion 61 extracts the third returning judgment pressure QV3 from the third returning judgment table U3 based on the swash plate angle (step S57).

The automatic decelerator portion 61 refers to the traveling pump pressures V1 to V4 (step S58).

The automatic decelerator portion 61 judges whether or not the traveling pump pressures V1 to V4 are equal to or lower than the third returning judgment pressure QV3 (step S59).

When all of the traveling pump pressures V1 to V4 are equal to or lower than the third returning judgment pressure QV3 (step S59, Yes), the automatic decelerator portion 61 performs the return control (step S60).

The working machine 1 includes the swash plate angle detector device 69, the fifth storage device 81e, and the controller device 60 having the automatic decelerator portion 61. The automatic decelerator portion 61 extracts the third decelerating judgment pressure PV3 from the third decelerating judgment table T3 and the swash plate angle detected by the swash plate angle detector device 69 when the traveling motor is at the second speed. And, the automatic decelerator portion 61 performs the automatic deceleration when any one of the traveling pump pressures V1 to V4 detected by the traveling pump pressure detector device 80 is equal to or higher than the third decelerating judgment pressure PV3.

According to that configuration, the automatic deceleration is performed based on the third decelerating judgment pressure PV3 depending on the swash plate angles of the traveling pumps (the left traveling pump 53L and the right traveling pump 53R). Thus, the automatic deceleration can be performed at the optimum timing. That is, the automatic deceleration can be appropriately performed corresponding to the revolving speed of prime mover, and thereby the working efficiency can be improved.

The working machine 1 includes the sixth storage device 81f configured to store the third returning judgment table U3 representing the relation between the swash plate angle and the third returning judgment pressure QV3. The automatic decelerator portion 61 extracts the third returning judgment pressure QV3 from the third returning judgment table U3 and the swash plate angle detected by the swash plate angle detector device 69 after the automatic deceleration, and returns the traveling motors from the first speed to the second speed when the traveling pump pressures V1 to V4 after the automatic deceleration are equal to or lower than the third returning judgment pressure QV3.

According to that configuration, since the returning is performed based on the third returning judgment pressure QV3 corresponding to the swash plate angle of the traveling pump, it is possible to switch the traveling motor to the high-speed side at the optimal timing under the operating state of the working machine 1.

The automatic decelerator portion 61 performs the automatic deceleration when any one of the first traveling pump pressure V1, the second traveling pump pressure V2, the third traveling pump pressure V3, and the fourth traveling pump pressure V4 is equal to or higher than the third decelerating judgment pressure PV3.

According to that configuration, even under either one of the state where the left traveling device 5L operates on the forward traveling side, the state where the left traveling device 5L operates on the reverse traveling side, the state where the right traveling device 5R operates on the forward traveling side, and the state where the right traveling device 5R operates on the reverse traveling side, it is possible to appropriately perform the deceleration when a load is applied to the left traveling device 5L or to the right traveling device 5R.

When the first traveling pump pressure V1, the second traveling pump pressure V2, the third traveling pump pressure V3, and the fourth traveling pump pressure V4 are equal to or less than the third returning judgment pressure QV3, the automatic decelerator portion 61 returns the traveling motor from the first speed to the second speed.

According to that configuration, even under either one of the state where the left traveling device 5L operates on the forward traveling side, the state where the left traveling device 5L operates on the reverse traveling side, the state where the right traveling device 5R operates on the forward traveling side, and the state where the right traveling device 5R operates on the reverse traveling side, the speed can be appropriately increased when the load applied to the left traveling device 5L or to the right traveling device 5R is eliminated.

The fifth storage device 81e stores the third decelerating judgment table T3 in which the third decelerating judgment pressure PV3 increases as the swash plate angle increases.

According to that configuration, the working machine 1 efficiently performs the working with a large working load.

The sixth storage device 81f stores the third returning judgment table U3 in which the third returning judgment pressure QV3 increases as the swash plate angle increases.

According to that configuration, in the working machine 1, the working with a large working load can be efficiently performed.

In the embodiment described above, the plurality of traveling pump pressures V1 to V4 corresponding to the swash plate angles are employed as the automatic deceleration conditions. Instead, the automatic deceleration may be performed based on the traveling differential pressures V5 and V6 corresponding to the swash plate angles.

The controller device 60 is connected to the seventh storage device 81g constituted of a nonvolatile memory or the like. Note that the controller device 60 may incorporate the seventh storage device 81g.

As shown in FIG. 10A, the fourth decelerating judgment pressure PV4 is stored in the seventh storage device 81g in association with the swash plate angles. That is, the seventh storage device 81g stores the fourth decelerating judgment table T4 representing the relation between the swash plate angle and the fourth decelerating judgment pressure PV4.

In the fourth decelerating judgment table T4, the fourth decelerating judgment pressure PV4 increases as the swash plate angle increases. When the swash plate angle is large, the fourth decelerating judgment pressure PV4 also has a large value. And, when the swash plate angle is small, the fourth decelerating judgment pressure PV4 also has a small value.

In the fourth decelerating judgment table T4, similarly to the first decelerating judgment table T1 described above, the numerical value of the swash plate angle indicates a boundary value for setting the fourth decelerating judgment pressure PV4. For example, when the pilot pressure corresponding to the swash plate angle is 0.8 MPa, the fourth decelerating judgment pressure PV4 is 21 MPa.

Under the state where the working machine 1 is traveling forward, the differential pressure calculator portion 63 calculates the first differential pressure (V5) that is a difference between the first traveling pump pressure V1 and the third traveling pump pressure V3. Under the state where the working machine 1 is traveling backward, the differential pressure calculator portion 63 calculates the second differential pressure (V6).

When the traveling motors (the left traveling motor 36L and the right traveling motor 36R) are at the second speed, the automatic decelerator portion 61 extracts the fourth decelerating judgment pressure PV4 from the fourth decelerating judgment table T4 and the swash plate angle detected by the swash plate angle detector device 69.

The automatic decelerator portion 61 performs the automatic deceleration when the traveling differential pressures V5 and V6 calculated by the differential pressure calculator portion 63 are equal to or higher than the fourth decelerating judgment pressure PV4 extracted from the fourth decelerating judgment table T4. In particular, the automatic decelerator portion 61 performs the automatic deceleration when any one of the first differential pressure (V5) and the second differential pressure (V6) is equal to or higher than the fourth decelerating judgment pressure PV4.

After the automatic deceleration is performed, the automatic decelerator portion 61 performs the return control when the automatic deceleration is valid.

The controller device 60 is connected to the eighth storage device 81h constituted of a nonvolatile memory or the like. Note that the controller device 60 may incorporate the eighth storage device 81h.

As shown in FIG. 10B, the fourth returning judgment pressure QV4 is stored in the eighth storage device 81h in association with the swash plate angles. That is, the eighth storage device 81h stores the fourth returning judgment table U4 representing the relation between the swash plate angle and the fourth returning judgment pressure QV4.

In the fourth returning judgment table U4, the fourth returning judgment pressure QV4 increases as the swash plate angle increases. When the swash plate angle is large, the fourth returning judgment pressure QV4 also has a large value, and when the angle is small, the fourth returning judgment pressure QV4 also has a small value.

In the fourth returning judgment table U4, similarly to the fourth decelerating judgment table T4 described above, the numerical value of the swash plate angle indicates a boundary value for setting the fourth returning judgment pressure QV4. For example, when the pilot pressure corresponding to the swash plate angle is 0.8 MPa, the fourth returning judgment pressure QV4 is 16 MPa.

The automatic decelerator portion 61 extracts the fourth returning judgment pressure QV4 from the fourth returning judgment table U4 and the swash plate angle detected by the swash plate angle detector device 69 after the automatic deceleration. And, the return control is performed when the traveling pressures V5 and V6 calculated by the differential pressure calculator portion 63 are equal to or lower than the fourth returning judgment pressure QV4 extracted from the fourth returning judgment table U4.

In particular, the automatic decelerator portion 61 accelerates the traveling motor from the first speed to the second speed when the traveling differential pressures V5 and V6 become equal to or less than the fourth returning judgment pressure QV4.

Figure 11:
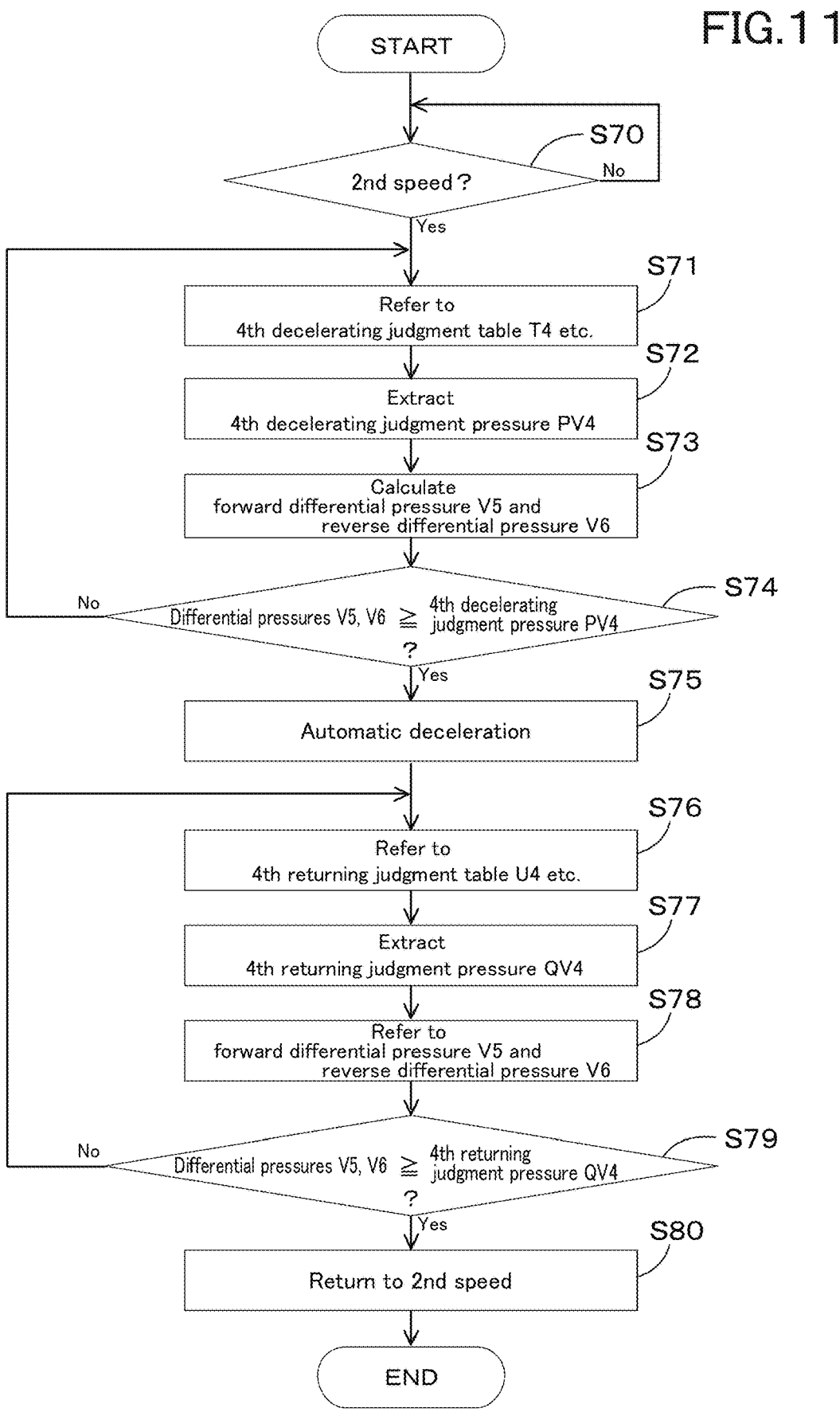
FIG. 11 is a view illustrating a fourth process in the automatic decelerator portion according to the embodiment.

FIG. 11 is a view summarizing the processing in the automatic decelerator portion 61.

As shown in FIG. 11, under the state where the automatic deceleration is valid and the traveling motor is at the second speed (step S70, Yes), the automatic decelerator portion 61 refers to the fourth decelerating judgment table T4 and the swash plate angle detected by the swash plate angle detector device 69 (step S71).

The automatic decelerator portion 61 extracts the fourth decelerating judgment pressure PV4 from the fourth decelerating judgment table T4 based on the swash plate angle (step S72).

The differential pressure calculator portion 63 calculates the first differential pressure (V5) and the second differential pressure (V6) on the basis of the traveling pump pressures V1 to V4 (step S73).

The automatic decelerator portion 61 judges whether the first differential pressure (V5) and the second differential pressure (V6) are equal to or higher than the fourth decelerating judgment pressure PV4 (step S74).

When the first differential pressure (V5) and the second differential pressure (V6) are equal to or higher than the fourth decelerating judgment pressure PV4 (step S74, Yes), the automatic decelerator portion 61 performs the automatic deceleration (step S75).

After performing the automatic deceleration, the automatic decelerator portion 61 refers to the fourth returning judgment table U4 and the swash plate angle detected by the swash plate angle detector device 69 (step S76).

The automatic decelerator portion 61 extracts the fourth returning judgment pressure QV4 from the fourth returning judgment table U4 based on the swash plate angle (step S77).

The automatic decelerator portion 61 refers to the first differential pressure (V5) and the second differential pressure (V6) after the automatic deceleration (step S78).

The automatic decelerator portion 61 judges whether the first differential pressure (V5) and the second differential pressure (V6) are equal to or lower than the fourth returning judgment pressure QV4 (step S79).

When the first differential pressure (V5) and the second differential pressure (V6) are equal to or lower than the fourth returning judgment pressure QV4 (step S79, Yes), the automatic decelerator portion 61 performs the return control (step S80).

The working machine 1 includes the swash plate angle detector device 69, the seventh storage device 81g, and the controller device 60 having the automatic decelerator portion 61 and the differential pressure calculator portion 63. Under the state where the traveling motors are at the second speed, the automatic decelerator portion 61 extracts the fourth decelerating judgment pressure PV4 from the fourth decelerating judgment table T4 and the swash plate angle detected by the swash plate angle detector device 69, and the automatic decelerator portion 61 performs the automatic deceleration when any one of the pressures V5 and V6 calculated by the differential pressure calculator portion 63 is equal to or higher than the fourth decelerating judgment pressure PV4.

According to that configuration, since the automatic deceleration is performed based on the fourth decelerating judgment pressure PV4 according to the swash plate angle of the traveling pump, it is possible to switch the traveling motor to the high speed side at the optimal timing in the operating state of the working machine 1. In particular, the automatic deceleration can be efficiently performed when the loads applied to the left traveling device 5L and to the right traveling device 5R are significantly different from each other.

The working machine 1 includes the eighth storage device 81h. And, the automatic decelerator portion 61 extracts the fourth returning judgment pressure QV4 from the fourth returning judgment table U4 and the swash plate angle detected by the swash plate angle detector device 69 after the automatic deceleration, and returns the traveling motor from the first speed to the second speed when both of the traveling differential pressures V5 and V6 after the automatic deceleration are equal to or lower than the fourth returning judgment pressure QV4.

According to that configuration, since the returning is performed based on the fourth returning judgment pressure QV4 corresponding to the swash plate angle of the traveling pump, it is possible to switch the traveling motor to the high speed side at the optimal timing in the operating state of the working machine 1. In particular, the automatic deceleration can be efficiently performed when the loads applied to the left traveling device 5L and to the right traveling device 5R are significantly different from each other.

The automatic decelerator portion 61 performs the automatic deceleration when any one of the first differential pressure (V5) and the second differential pressure (V6) is equal to or higher than the fourth decelerating judgment pressure PV4.

According to that configuration, the automatic deceleration can be efficiently performed under both of the state where the working machine 1 is moving forward and the state where the working machine 1 is moving backward.

When both of the first differential pressure (V5) and the second differential pressure (V6) are equal to or lower than the fourth returning judgment pressure QV4, the automatic decelerator portion 61 returns the traveling motor from the first speed to the second speed.

According to that configuration, the traveling motor can be efficiently returned under both of the state where the working machine 1 travels forward and the state where the working machine 1 travels backward.

The seventh storage device 81g stores the fourth decelerating judgment table T4 in which the fourth decelerating judgment pressure PV4 increases as the swash plate angle increases. In the working machine 1, the working with a large working load can be performed efficiently.

The eighth storage device 81h stores the fourth returning judgment table U4 in which the fourth returning judgment pressure QV4 increases as the swash plate angle increases. In the working machine 1, the working with a large working load can be performed efficiently.

In the above-described embodiment, the automatic deceleration is performed based on the plurality of traveling pump pressures V1 to V4 corresponding to the prime mover revolving speeds or on the plurality of traveling pump pressures V1 to V4 corresponding to the swash plate angles. However, the automatic deceleration may be performed by the plurality of traveling pump pressures V1 to V4 corresponding to the pressure of the anti-stall valve 58.

Figure 12:
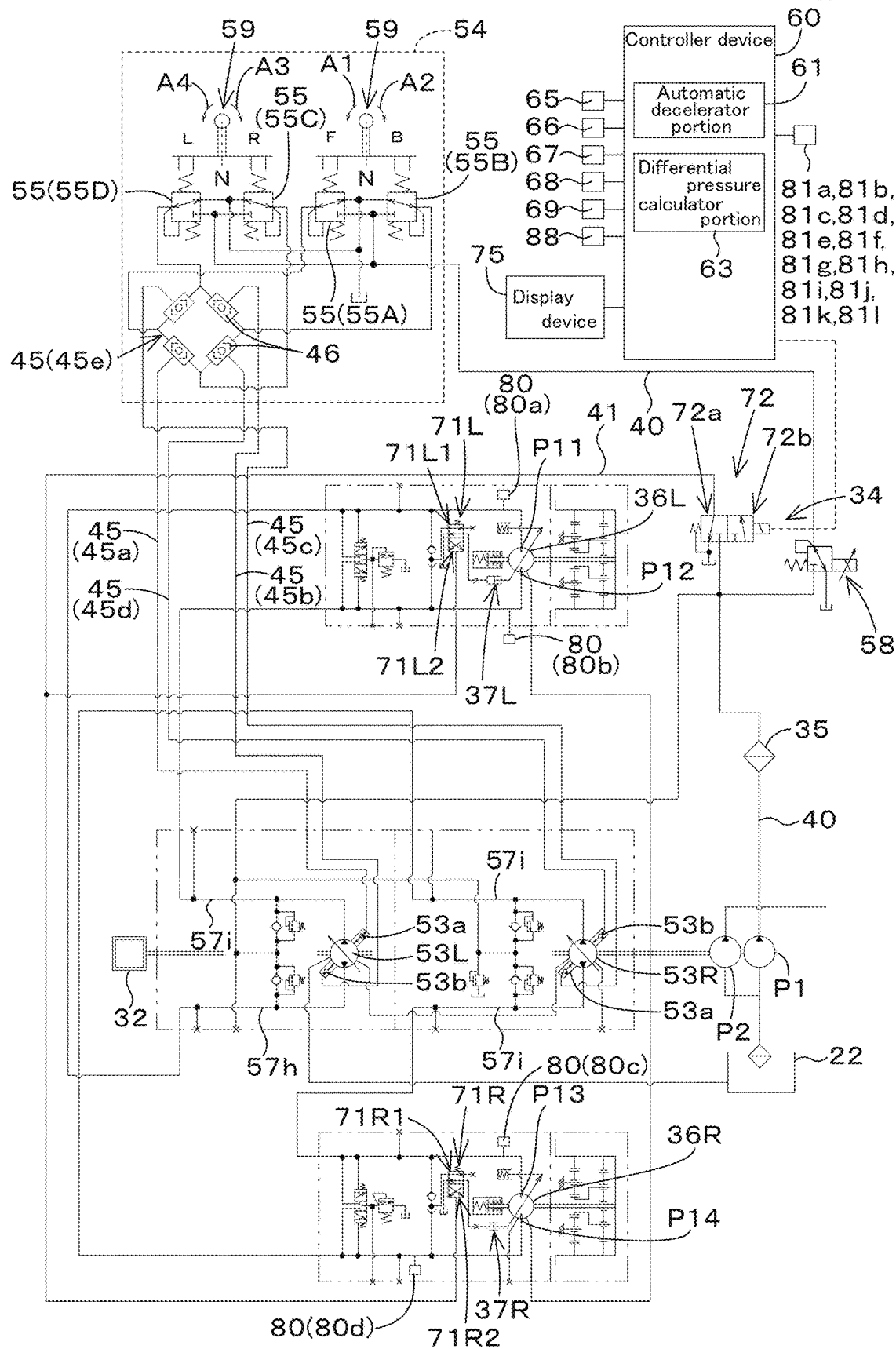
FIG. 12 is a view illustrating a hydraulic system having an anti-stall valve according to the embodiment.

As shown in FIG. 12, the anti-stall valve 58 is provided in the middle of the output fluid tube 40. The anti-stall valve 58 is a valve provided on the primary side of the operation valve 55 (the operation valve 55A, the operation valve 55B, the operation valve 55C, and the operation valve 55D), and configured to control the operation fluid to be supplied to the operation valve 55.

Figure 13:
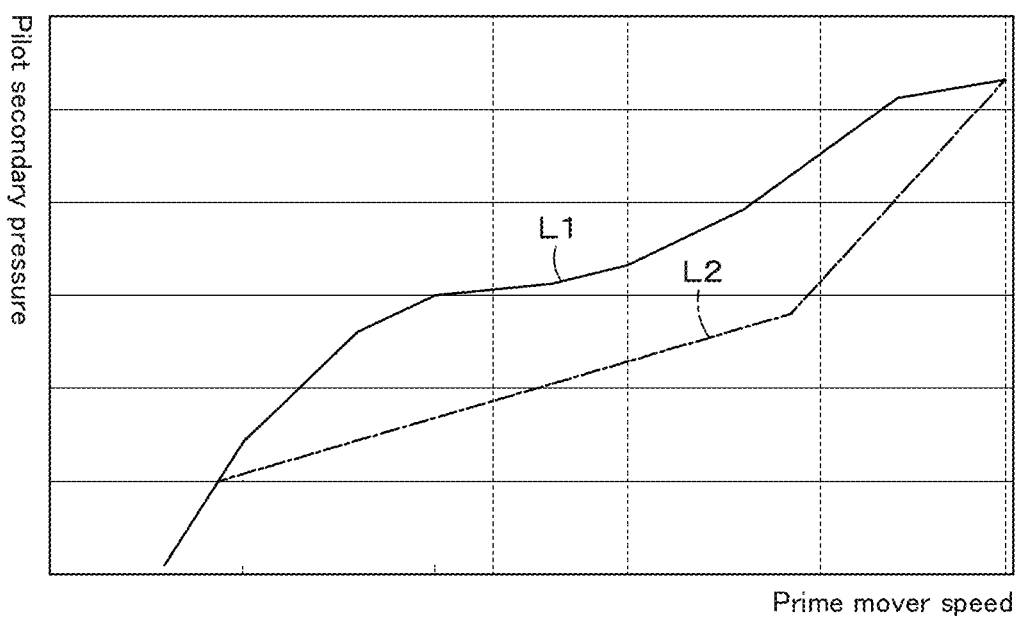
FIG. 13 is a view illustrating a relation between a prime-mover revolving speed, a secondary pilot pressure, and control lines L1 and L2 according to the embodiment.

The anti-stall valve 58 performs the control for preventing the engine stall (the anti-stall control). FIG. 13 shows the relation between the prime mover revolving speed, the secondary pilot pressure of the anti-stall valve 58, and the control lines L1 and L2. The secondary pilot pressure is the pressure of the operation fluid to be applied by the anti-stall valve 58 (a secondary pressure), and is the pressure of operation fluid in a section of the output fluid tube 40 from the anti-stall valve 58 to the operation valve 55 (the operation valve 55a, the operation valve 55b, the operation valve 55c, and the operation valve 55d).

That is, it is the primary pressure of the operation fluid to enter the operation valve 55 provided to the operation lever 59. The control line L1 indicates the relation between the prime mover revolving speed and the secondary pilot pressure under the state where the dropping amount is less than the predetermined value. The control line L2 indicates the relation between the prime mover revolving speed and the secondary pilot pressure when the dropping amount is equal to or larger than a predetermined value.

When the dropping amount is less than the predetermined amount, the controller device 60 adjusts the opening aperture of anti-stall valve 58 such that the relation between the actual revolving speed of the prime mover and the secondary pilot pressure matches the control line L1. In addition, when the dropping amount is equal to or larger than the predetermined value, the controller device 60 adjusts the opening aperture of the anti-stall valve 58 such that the relation between the actual revolving speed of the prime mover and the secondary pilot pressure matches the control line L2.

On the control line L2, the secondary pilot pressure for a predetermined prime mover revolving speed is lower than the secondary pilot pressure on the control line L1. That is, when paying attention to the identical one of the prime mover revolving speeds, the secondary pilot pressure of the control line L2 is lower than the secondary pilot pressure on the control line L1.

Thus, through the control based on the control line L2, the pressure of the operation fluid entering the operation valve 55 (the pilot pressure) is suppressed low. As the result, the swash plate angles of the traveling pumps (the left traveling pump 53L and the right traveling pump 53R) are adjusted, the load applied to the prime mover is reduced, and thus the stall of the prime mover can be prevented.

Although FIG. 13 shows one control line L2, a plurality of the control lines L2 may be employed. For example, the control line L2 may be set for each of the prime mover revolving speeds. In addition, the controller device 60 preferably has the data representing the control lines L1 and L2 or the control parameters such as the functions.

The controller device 60 is connected to the first storage device 81a constituted of a non-volatile memory or the like. Note that the controller device 60 may incorporate the ninth storage device 81i.

Figure 14A:
FIG. 14A is a view illustrating a fifth decelerating judgment table T5 according to the embodiment.

As shown in FIG. 14A, the ninth storage device 81i stores the fifth decelerating judgment pressure PV5 in association with the secondary pilot pressure. That is, the ninth storage device 81i stores the fifth decelerating judgment table T5 representing the relation between the secondary pilot pressure and the fifth decelerating judgment pressure PV5.

In the fifth decelerating judgment table T5, the fifth decelerating judgment pressure PV5 increases as the secondary pilot pressure increases. When the secondary pilot pressure is high, the fifth decelerating judgment pressure PV5 also has a high value, and when the secondary pilot pressure is low, the fifth decelerating judgment pressure PV5 also has a low value.

In the fifth decelerating judgment table T5, similarly to the embodiment described above, the numerical value of the secondary pilot pressure indicates a boundary value for setting the fifth decelerating judgment pressure PV5. For example, when the secondary pilot pressure is 1.3 MPa, the fifth decelerating judgment pressure PV5 is 25 MPa.

The secondary pilot pressure of the anti-stall valve 58 can be determined based on a control value (for example, an electric current) obtained when the controller device 60 controls the anti-stall valve 58, on the flow rate of the operation fluid outputted from the first hydraulic pump P1, and the like.

In addition, a pressure detector device for detecting a pressure may be provided to a downstream side of the anti-stall valve 58 to detect the secondary pilot pressure, and the method of detecting the secondary pilot pressure is not limited thereto. Hereinafter, the description will be made on the assumption that the secondary pilot pressure is detected by the controller device 60 or by the pressure detector device.

When the traveling motors (the left traveling motor 36L and the right traveling motor 36R) are at the second speed, the automatic decelerator portion 61 extracts the fifth decelerating judgment pressure PV5 from the secondary pilot pressure and the fifth decelerating judgment table T5.

For example, when the secondary pilot pressure is 2.1 MPa, the automatic decelerator portion 61 extracts the fifth decelerating judgment pressure PV5 of 28 MPa from the fifth decelerating judgment table T5, and when the secondary pilot pressure is 1.6 MPa, the automatic decelerator portion 61 extracts the fifth decelerating judgment pressure PV5 of 26 MPa from the fifth decelerating judgment table T5.

The automatic decelerator portion 61 performs the automatic deceleration when any one of the traveling pump pressures V1 to V4 detected by the traveling pump pressure detector device 80 is equal to or higher than the fifth decelerating judgment pressure PV5 extracted from the fifth decelerating judgment table T5.

In particular, the automatic decelerator portion 61 performs the automatic deceleration to decelerate the traveling motors (the left traveling motor 36L and the right traveling motor 36R) from the second speed to the first speed when any one of the first traveling pump pressure V1, the second traveling pump pressure V2, the third traveling pump pressure V3, and the fourth traveling pump pressure V4 is equal to or higher than the fifth decelerating judgment pressure PV5.

Then, after performing the automatic deceleration, the automatic decelerator portion 61 performs the control (the return control) to return the traveling motors (the left traveling motor 36L and the right traveling motor 36R) from the first speed to the second speed when the automatic deceleration is valid.

The controller device 60 is connected to the tenth storage device 81j constituted of a nonvolatile memory or the like. Note that the controller device 60 may incorporate the tenth storage device 81j.

As shown in FIG. 14B, the fifth returning judgment pressure QV5 is stored in the tenth storage device 81j in association with the secondary pilot pressure. That is, the tenth storage device 81j stores the fifth returning judgment table U5 representing the relation between the secondary pilot pressure and the fifth returning judgment pressure QV5.

In the fifth returning judgment table U5, the fifth returning judgment pressure QV5 increases as the secondary pilot pressure increases. When the secondary pilot pressure is high, the fifth returning judgment pressure QV5 also has a high value, and when the secondary pilot pressure is low, the fifth returning judgment pressure QV5 also has a low value.

In the fifth returning judgment table U5, similarly to the fifth decelerating judgment table T5 described above, the numerical value of the secondary pilot pressure indicates a boundary value for setting the fifth returning judgment pressure QV5. For example, when the secondary pilot pressure is 1.6 MPa, the fifth returning judgment pressure QV5 is 16 MPa.

The automatic decelerator portion 61 extracts the fifth returning judgment pressure QV5 from the secondary pilot pressure and the fifth returning judgment table U5 after the automatic deceleration, and returns the traveling motors (the left traveling motor 36L and the right traveling motor 36R) from the first speed to the second speed when the traveling pump pressures V1 to V4 detected by the traveling pump pressure detector device 80 are equal to or lower than the fifth returning judgment pressure QV5 extracted from the fifth returning judgment table U5.

More specifically, the automatic decelerator portion 61 accelerates the traveling motors (the left traveling motor 36L and the right traveling motor 36R) from the first speed to the second speed at the timing when the first traveling pump pressure V1, the second traveling pump pressure V2, the third traveling pump pressure V3, and the fourth traveling pump pressure V4 become equal to or less than the fifth returning judgment pressure QV5.

Figure 15:
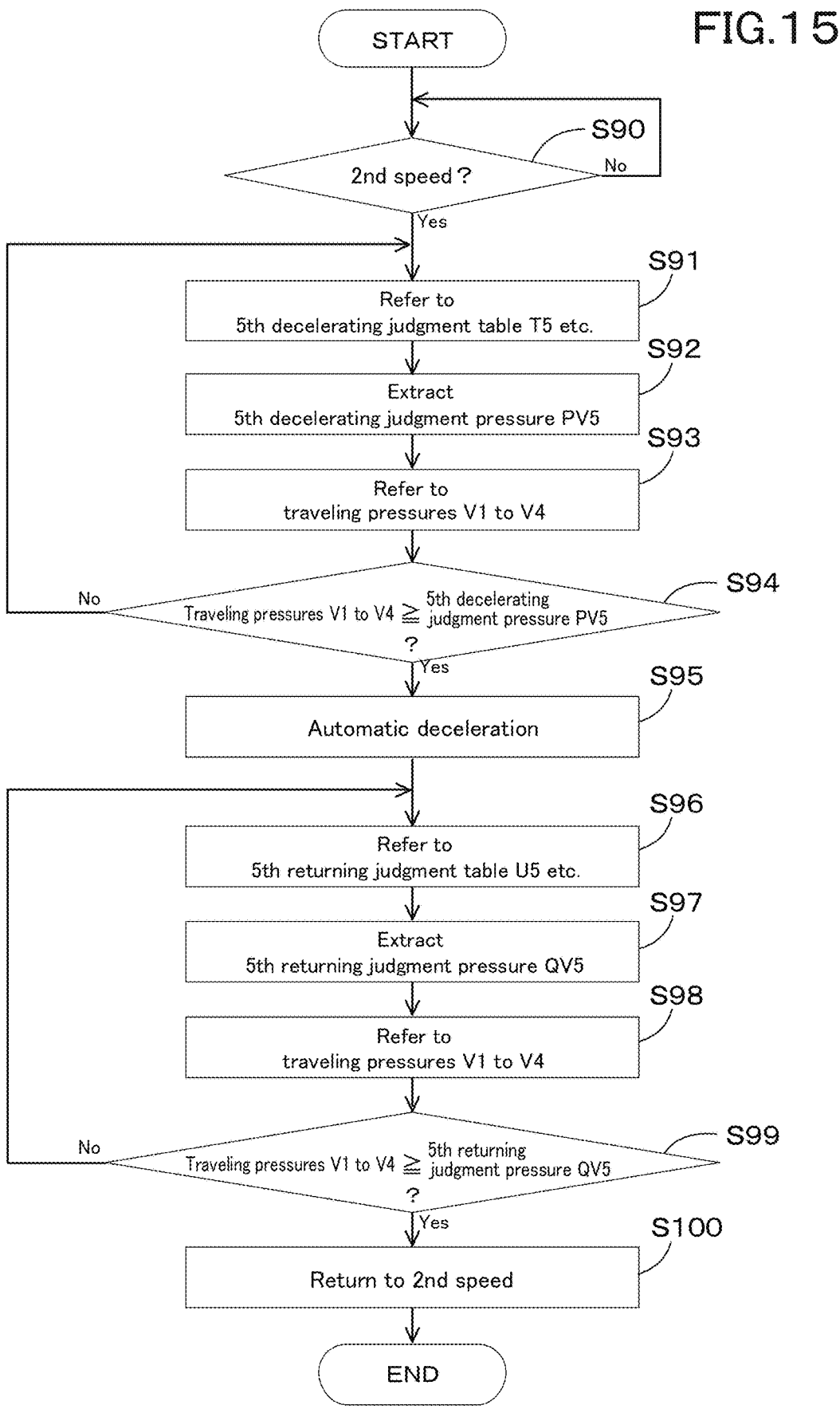
FIG. 15 is a view illustrating a fifth process in the automatic decelerator portion according to the embodiment.

FIG. 15 is a view summarizing the processing in the automatic decelerator portion 61.

As shown in FIG. 15, under the state where the automatic deceleration is valid and the traveling motor is at the second speed (step S90, Yes), the automatic decelerator portion 61 refers to the secondary pilot pressure and the fifth decelerating judgment table T5 (step S91).

The automatic decelerator portion 61 extracts the fifth decelerating judgment pressure PV5 from the fifth decelerating judgment table T5 based on the secondary pilot pressure (step S92).

The automatic decelerator portion 61 refers to the traveling pump pressures V1 to V4 detected by the traveling pump pressure detector device 80 (step S93). The automatic decelerator portion 61 determines whether any one of the traveling pump pressures V1 to V4 is equal to or higher than the fifth decelerating judgment pressure PV5 (step S94).

When any one of the traveling pump pressures V1 to V4 is equal to or higher than the fifth decelerating judgment pressure PV5 (step S94, Yes), the automatic decelerator portion 61 performs the automatic deceleration (step S95).

After performing the automatic deceleration, the automatic decelerator portion 61 refers to the secondary pilot pressure and the fifth returning judgment table U5 (step S96).

The automatic decelerator portion 61 extracts the fifth returning judgment pressure QV5 from the fifth returning judgment table U5 based on the secondary pilot pressure (step S97).

The automatic decelerator portion 61 refers to the traveling pump pressures V1 to V4 (step S98).

The automatic decelerator portion 61 judges whether all of the traveling pump pressures V1 to V4 are equal to or lower than the fifth returning judgment pressure QV5 (step S99).

When all of the traveling pump pressures V1 to V4 are equal to or lower than the fifth returning judgment pressure QV5 (step S99, Yes), the automatic decelerator portion 61 performs the return control (step S100).

The working machine 1 includes the anti-stall valve 58, the ninth storage device 81i, and the controller device 60 having the automatic decelerator portion 61. The automatic decelerator portion 61 extracts the fifth decelerating judgment pressure PV5 from the secondary pilot pressure and the fifth decelerating judgment table T5 under the state where the traveling motor is at the second speed, and the automatic decelerator portion 61 performs the automatic deceleration when any one of the traveling pump pressures V1 to V4 detected by the traveling pump pressure detector device 80 is equal to or higher than the fifth decelerating judgment pressure PV5.

According to that configuration, since the automatic deceleration is performed based on the fifth decelerating judgment pressure PV5 corresponding to the secondary pilot pressure of the anti-stall valve 58, the automatic deceleration is performed at the optimal timing in the operating state of the working machine 1. That is, the automatic deceleration can be appropriately performed according to the revolving speed of the prime mover, and the working efficiency can be improved.

The working machine 1 includes the tenth storage device 81j. The automatic decelerator portion 61 extracts the fifth returning judgment pressure QV5 from the secondary pilot pressure and the fifth returning judgment table U5 after the automatic deceleration, and returns the traveling motor from the first speed to the second speed when the traveling pump pressures V1 to V4 detected by the traveling-pump pressure detector device 80 after the automatic deceleration are equal to or lower than the fifth returning judgment pressure QV5.

According to that configuration, since the returning is performed based on the fifth returning judgment pressure QV5 according to the secondary pilot pressure, it is possible to switch the traveling motor to the high-speed side at the optimal timing in the operating state of the working machine 1.

The automatic decelerator portion 61 is configured to perform the automatic deceleration when any one of the first traveling pump pressure V1, the second traveling pump pressure V2, the third traveling pump pressure V3, and the fourth traveling pump pressure V4 is equal to or higher than the fifth decelerating judgment pressure PV5.

According to that configuration, under either one of the state where the left traveling device 5L operates in the forward direction, the state where the left traveling device 5L operates in the backward direction, the state where the right traveling device 5R operates in the forward direction, and the state where the right traveling device 5R operates in the backward direction, the traveling motor can be appropriately accelerated when the load applied to the left traveling device 5L or the right traveling device 5R is eliminated.

When the first traveling pump pressure V1, the second traveling pump pressure V2, the third traveling pump pressure V3, and the fourth traveling pump pressure V4 are equal to or less than the fifth returning judgment pressure QV5, the automatic decelerator portion 61 returns the traveling motor from the first speed to the second speed.

According to that configuration, under either one of the state where the left traveling device 5L operates in the forward direction, the state where the left traveling device 5L operates in the backward direction, the state where the right traveling device 5R operates in the forward direction, and the state where the right traveling device 5R operates in the backward direction, the traveling motor can be appropriately accelerated when the load applied to the left traveling device 5L or the right traveling device 5R is eliminated.

The first storage device 81a stores the fifth decelerating judgment table T5 in which the fifth decelerating judgment pressure PV5 increases as the secondary pilot pressure increases.

According to that configuration, in the working machine 1, the working with a large working load can be efficiently performed.

The second storage device 81b stores the fifth returning judgment table U5 in which the fifth returning judgment pressure QV5 increases as the secondary pilot pressure increases.

According to that configuration, in the working machine 1, the working with a large working load can be efficiently performed.

In the embodiment described above, the plurality of traveling pump pressures V1 to V4 corresponding to the secondary pilot pressure are employed. Alternatively, the automatic deceleration may be performed based on the traveling differential pressures V5 and V6 corresponding to the secondary pilot pressure.

The controller device 60 is connected to an eleventh storage device 81k constituted of a nonvolatile memory or the like. Note that the controller device 60 may incorporate the eleventh storage device 81k.

As shown in FIG. 16A, the sixth decelerating judgment pressure PV6 is stored in the eleventh storage device 81k in association with the secondary pilot pressure. That is, the eleventh storage device 81k stores the sixth decelerating judgment table T6 representing the relation between the secondary pilot pressure and the sixth decelerating judgment pressure PV6.

In the sixth decelerating judgment table T6, the sixth decelerating judgment pressure PV6 increases as the secondary pilot pressure increases. When the secondary pilot pressure is high, the sixth decelerating judgment pressure PV6 also has a high value, and when the secondary pilot pressure is low, the sixth decelerating judgment pressure PV6 also has a low value.

In the sixth decelerating judgment table T6, similarly to the fifth decelerating judgment table T5 described above, the numerical value of the secondary pilot pressure indicates a boundary value for setting the sixth decelerating judgment pressure PV6. For example, when the secondary pilot pressure is 1.6 MPa, the sixth decelerating judgment pressure PV6 is 21 MPa.

When the traveling motors (the left traveling motor 36L and the right traveling motor 36R) are at the second speed, the automatic decelerator portion 61 extracts the sixth decelerating judgment pressure PV6 from the secondary pilot pressure and the sixth decelerating judgment table T6.

The automatic decelerator portion 61 performs the automatic deceleration when the traveling differential pressures V5 and V6 calculated by the differential pressure calculator portion 63 are equal to or higher than the sixth decelerating judgment pressure PV6 extracted from the sixth decelerating judgment table T6. In particular, the automatic decelerator portion 61 performs the automatic deceleration when any one of the first differential pressure (V5) and the second differential pressure (V6) is equal to or higher than the sixth decelerating judgment pressure PV6.

After the automatic deceleration is performed, the automatic decelerator portion 61 performs the return control when the automatic deceleration is valid.

The controller device 60 is connected to a twelfth storage device 81l constituted of a nonvolatile memory or the like. Note that the controller device 60 may incorporate the twelfth storage device 81l.

Figure 16B:
FIG. 16B is a view illustrating a sixth returning judgment table U6 according to the embodiment.

As shown in FIG. 16B, the sixth returning judgment pressure QV6 is stored in the twelfth storage device 81l in association with the secondary pilot pressure. That is, the twelfth storage device 81l stores the sixth returning judgment table U6 representing the relation between the secondary pilot pressure and the sixth returning judgment pressure QV6.

In the sixth returning judgment table U6, the sixth returning judgment pressure QV6 increases as the secondary pilot pressure increases. When the secondary pilot pressure is high, the sixth returning judgment pressure QV6 also has a high value, and when the secondary pilot pressure is low, the sixth returning judgment pressure QV6 also has a low value.

In the sixth returning judgment table U6, similarly to the sixth decelerating judgment table T6 described above, the numerical value of the secondary pilot pressure indicates a boundary value for setting the sixth returning judgment pressure QV6. For example, when the secondary pilot pressure is 1.6 MPa, the sixth returning judgment pressure QV6 is 16 MPa.

The automatic decelerator portion 61 extracts the sixth returning judgment pressure QV6 from the secondary pilot pressure and the sixth returning judgment table U6 after the automatic deceleration, and performs the return control when the traveling differential pressures V5 and V6 calculated by the differential pressure calculator portion 63 are equal to or lower than the sixth returning judgment pressure QV6 extracted from the sixth returning judgment table U6.

In particular, the automatic decelerator portion 61 accelerates the traveling motor from the first speed to the second speed when the traveling differential pressures V5 and V6 become equal to or less than the sixth returning judgment pressure QV6.

Figure 17:
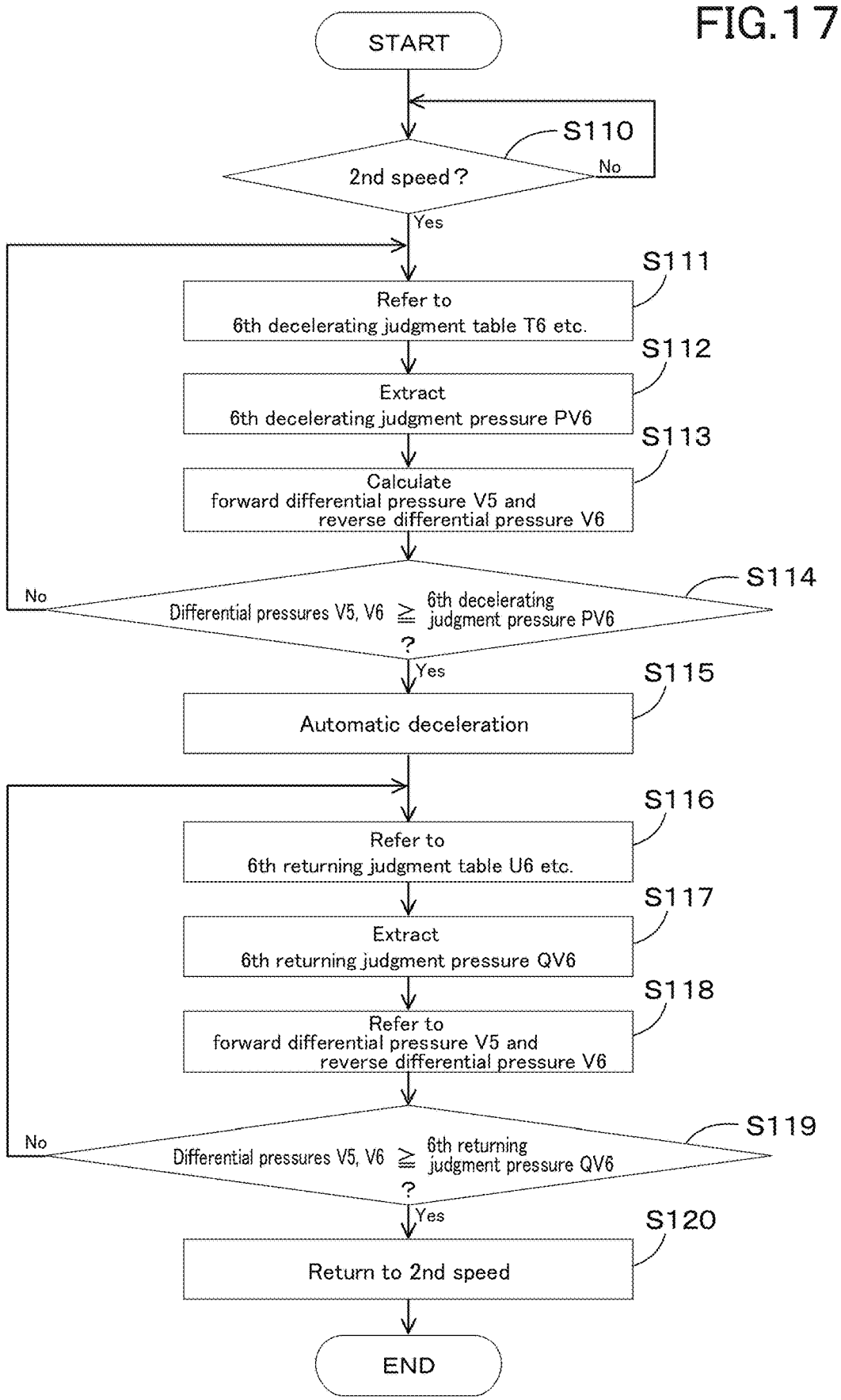
FIG. 17 is a view illustrating a sixth process in the automatic decelerator portion according to the embodiment.

FIG. 17 is a view summarizing the processing in the automatic decelerator portion 61.

As shown in FIG. 17, under the state where the automatic deceleration is valid and the traveling motor is at the second speed (step S110, Yes), the automatic decelerator portion 61 refers to the secondary pilot pressure and the sixth decelerating judgment table T6 (step S111).

The automatic decelerator portion 61 extracts the sixth decelerating judgment pressure PV6 from the sixth decelerating judgment table T6 based on the secondary pilot pressure (step S112).

The differential pressure calculator portion 63 calculates the first differential pressure (V5) and the second differential pressure (V6) from the traveling pump pressures V1 to V4 (step S113).

The automatic decelerator portion 61 judges whether the first differential pressure (V5) and the second differential pressure (V6) are equal to or higher than the sixth decelerating judgment pressure PV6 (step S114).

When the first differential pressure (V5) and the second differential pressure (V6) are equal to or larger than the sixth decelerating judgment pressure PV6 (step S114, Yes), the automatic decelerator portion 61 performs the automatic deceleration (step S115).

After performing the automatic deceleration, the automatic decelerator portion 61 refers to the secondary pilot pressure and the sixth returning judgment table U6 (step S116).

The automatic decelerator portion 61 extracts the sixth returning judgment pressure QV6 from the sixth returning judgment table U6 based on the secondary pilot pressure (step S117).

The automatic decelerator portion 61 refers to the first differential pressure (V5) and the second differential pressure (V6) after the automatic deceleration (step S118).

The automatic decelerator portion 61 judges whether the first differential pressure (V5) and the second differential pressure (V6) are equal to or lower than the sixth returning judgment pressure QV6 (step S119).

When the first differential pressure (V5) and the second differential pressure (V6) are equal to or lower than the sixth returning judgment pressure QV6 (step S119, Yes), the automatic decelerator portion 61 performs the return control (step S120).

The working machine 1 includes the anti-stall valve 58, the eleventh storage device 81k, and the controller device 60 having the automatic decelerator portion 61 and the differential pressure calculator portion 63. The automatic decelerator portion 61 extracts the sixth decelerating judgment pressure PV6 from the secondary pilot pressure and the sixth decelerating judgment table T6 under the state where the traveling motor is at the second speed, and performs the automatic deceleration when any one of the traveling differential pressures V5 and V6 calculated by the differential pressure calculator portion 63 is equal to or higher than the sixth decelerating judgment pressure PV6.

According to that configuration, the automatic deceleration is performed based on the sixth decelerating judgment pressure PV6 according to the secondary pilot pressure of the anti-stall valve 58, and thus it is possible to switch the traveling motor to the high speed side at the optimal timing in the operating state of the working machine 1. In particular, the automatic deceleration can be efficiently performed when the loads applied to the left traveling device 5L and the right traveling device 5R are significantly different from each other.

The working machine 1 includes the twelfth storage device 81l. The automatic decelerator portion 61 extracts the sixth returning judgment pressure QV6 from the secondary pilot pressure and the sixth returning judgment table U6 after the automatic deceleration, and returns the traveling motor from the first speed to the second speed when both of the traveling differential pressures V5 and V6 after the automatic deceleration calculated by the differential pressure calculator portion 63 are equal to or less than the sixth returning judgment pressure QV6.

According to that configuration, since the returning is performed based on the sixth returning judgment pressure QV6 according to the secondary pilot pressure of the anti-stall valve 58, it is possible to switch the traveling motor to the high speed side at the optimal timing in the operating state of the working machine 1. In particular, it is possible to efficiently return the traveling motor after the automatic deceleration is performed when the loads applied to the left traveling device 5L and to the right traveling device 5R are significantly different from each other.

The differential pressure calculating section 63 calculates, as the traveling differential pressure, either one of the first differential pressure (V5) that is a difference between the first traveling pump pressure V1 and the third traveling pump pressure V3 and the second differential pressure (V6) that is a difference between the second traveling pump pressure V2 and the fourth traveling pressure V4. And, the automatic decelerator portion 61 performs the automatic deceleration when any one of the first differential pressure (V5) or the second differential pressure (V6) is equal to or higher than the sixth decelerating judgment pressure PV6.

According to that configuration, the automatic deceleration can be efficiently performed in any one of the state where the working machine 1 is traveling forward and the state where the working machine 1 is traveling backward.

When both of the first differential pressure (V5) and second differential pressure (V6) are equal to or lower than the sixth returning judgment pressure QV6, the automatic decelerator portion 61 returns at least one of the traveling motors from the first speed to the second speed.

According to that configuration, the returning can be efficiently performed in any one of the state where the working machine 1 is traveling forward and the state where the working machine 1 is traveling backward.

The eleventh storage device 81k stores the sixth decelerating judgment table T6 in which the sixth decelerating judgment pressure PV6 increases as the secondary pilot pressure increases.

According to that configuration, in the working machine 1, the working with a large working load can be efficiently performed.

The twelfth storage device 81l stores the sixth returning judgment table U6 in which the sixth returning judgment pressure QV6 increases as the secondary pilot pressure increases.

According to that configuration, in the working machine 1, the working with a large working load can be efficiently performed.

Note that the controller device 60 may perform the automatic deceleration when the actual speed of any one of the traveling motors does not exceed the set revolving speed under the state where the set revolving speed of the traveling motor set by the operation member such as the operation lever 59 is already set.

As shown in FIG. 2, the working machine 1 is provided with a revolving detector device 88 for detecting an actual speed (an actual revolving speed) ST1 of the traveling motors (the left traveling motor 36L and the right traveling motor 36R).

For example, when the set speed (the set revolving speed) of the traveling motor (the left traveling motor 36L and the right traveling motor 36R) set by the operation lever 59 through the operation of the operation lever 59 is "ST2", the controller device 60 performs the automatic deceleration under the condition where ST2 is smaller than ST1.

In addition, after the automatic deceleration, the controller device 60 may return the traveling motor from the first speed to the second speed when the actual revolving speed ST1 of the traveling motor exceeds the set speed ST2.

For example, when ST1 is larger than ST2 after the automatic deceleration, the controller device 60 returns the traveling motor from the first speed to the second speed.

As described above, the second speed is only required to be higher than the first speed, so that the working machine 1 is not limited to the two-speed shifting, and may employ the multiple-speed shifting (the multiple-step shifting).

In the embodiment described above, each of the left traveling motor 36L and the left traveling motor 36R has a configuration to be simultaneously switched to the first speed and to the second speed, and the automatic deceleration is simultaneously performed on the left traveling motor 36L and the left traveling motor 36R. However, the automatic deceleration may be performed under the state where at least one of the left traveling motor 36L and the left traveling motor 36R is switched to the first speed and at least one of the left traveling motor 36L and the left traveling motor 36R is switched to the second speed.

In addition, the traveling motors (left traveling motor 36L and right traveling motor 36R) may be constituted of the axial piston motors or the radial piston motors. Regardless of whether the traveling motor is constituted of the radial piston motor or the radial piston motor, it is possible to switch the traveling motor to the first speed by increasing the motor displacement and to switch the traveling motor to the second speed by decreasing the motor displacement.

Second Embodiment

Hereinafter, a second embodiment of the hydraulic system for the working machine according to the present invention and the working machine will be described with reference to the drawings as appropriate. The configurations similar to those of the first embodiment are given the same reference numerals.

Next, the hydraulic system for the working machine will be described below.

As shown in FIG. 18, the hydraulic system for the working machine includes a first hydraulic pump P1 and a second hydraulic pump P2. The first hydraulic pump P1 is a pump to be driven by the power of the prime mover 32, and is constituted of a fixed displacement gear pump. The first hydraulic pump P1 is configured to output the operation fluid stored in the tank 22.

In particular, the first hydraulic pump P1 outputs the operation fluid mainly used for the controlling. For convenience of the explanation, the tank 22 to store the operation fluid may be referred to as an operation fluid tank. In addition, of the operation fluid outputted from the first hydraulic pump P1, the operation fluid used for the controlling may be referred to as pilot fluid, and a pressure of the pilot fluid may be referred to as a pilot pressure.

The second hydraulic pump P2 is a pump to be driven by the power of the prime mover 32, and is constituted of a fixed displacement gear pump. The second hydraulic pump P2 is configured to output the operation fluid stored in the tank 22, and to supply the operation fluid to a fluid tube (a fluid line) of a working system, for example.

For example, the second hydraulic pump P2 supplies the operation fluid to a boom cylinder 14 for operating the boom 10, a bucket cylinder 15 for operating the bucket, and a control valve (a flow-rate control valve) for controlling an auxiliary hydraulic actuator.

In addition, the hydraulic system for the working machine includes a pair of traveling motors 36L and 36R and a pair of traveling pumps 53L and 53R. The pair of traveling motors 36L and 36R are motors configured to transmit power to the pair of traveling devices 5L and 5R.

Of the pair of traveling motors 36L and 36R, the traveling motor 36L transmits a rotational power to the traveling device (the left traveling device) 5L, and the traveling motor 36R transmits a rotational power to the traveling device (the right traveling device) 5R.

The pair of traveling pumps 53L and 53R are pumps to be driven by the power of the prime mover 32, and are variable displacement axial pumps of swash plate type, for example. The pair of travel pumps 53L and 53R are driven to supply an operation fluid to each of the pair of traveling motors 36L and 36R. Of the pair of traveling pumps 53L and 53R, the traveling pump 53L supplies the operation fluid to the traveling pump 53L, and the traveling pump 53R supplies the operation fluid to the traveling pump 53R.

Hereinafter, for convenience of the explanation, the traveling pump 53L may be referred to as a left traveling pump 53L, the traveling pump 53R may be referred to as a right traveling pump 53R, the traveling motor 36L may be referred to as a left traveling motor 36L, and the traveling motor 36R may be referred to as a right traveling motor 36R.

Each of the left traveling pump 53L and the right traveling pump 53R has a forward-traveling pressure receiving portion 53a and a backward-traveling pressure receiving portion 53a to which the pressure (a pilot pressure) of the operation fluid (the pilot fluid) from the first hydraulic pump P1 is applied. The angles of the swash plates are changed by the pilot pressures applied to the pressure receiving portions 53a and 53b. By changing the angles of the swash plates, it is possible for the left traveling pump 53L and the right traveling pump 53R to change the outputs (the output rates of operation fluid) and the output directions of the operation fluid.

The left traveling pump 53L and the left traveling motor 36L are connected by a connector fluid tube 57h, and the operation fluid outputted by the left traveling pump 53L is supplied to the left traveling motor 36L. The right traveling pump 53R and the right traveling motor 36R are connected by a connector fluid tube 57i, and the operation fluid outputted by the right traveling pump 53R is supplied to the right traveling motor 36R.

The left traveling motor 36L is configured to be rotated by the operation fluid outputted from the left traveling pump 53L, and is configured to change the revolving speed (a revolving speed) in accordance with the flow rate of operation fluid. A swash plate switching cylinder 37L is connected to the left traveling motor 36L, and the revolving speed (the revolving speed) of the left traveling motor 36L can be changed by stretching and shortening the swash plate switching cylinder 37L to one side or to the other side.

That is, when the swash plate switching cylinder 37L is shortened, the revolving speed of the left traveling motor 36L is set to be in a low speed (a first speed), and when the swash plate switching cylinder 37L is stretched, the revolving speed of the left traveling motor 36L is set to be in a high speed (a second speed). That is, the revolving speed of the left traveling motor 36L can be changed between the first speed on the low speed side and the second speed on the high speed side.

The right traveling motor 36R is configured to be rotated by the operation fluid outputted from the right traveling pump 53R, and is configured to change the revolving speed (the revolving speed) in accordance with the flow rate of operation fluid. A swash plate switching cylinder 37R is connected to the right traveling motor 36R, and the revolving speed (the revolving speed) of the right traveling motor 36R can be changed by stretching or shortening the swash plate switching cylinder 37R to one side or to the other side.

That is, when the swash plate switching cylinder 37R is shortened, the revolving speed of the right traveling motor 36R is set to be in a low speed (a first speed), and when the swash plate switching cylinder 37R is stretched, the rotation of the right traveling motor 36R is set to be in a high speed (a second speed). That is, the revolving speed of the right traveling motor 36R can be changed between the first speed on the low speed side and the second speed on the high speed side.

As shown in FIG. 1, the hydraulic system for the working machine includes a traveling switching valve 34. The traveling switching valve 34 is capable of being switched between a first state in which the revolving speeds (the revolving speeds) of the traveling motors (the left traveling motor 36L and the right traveling motor 36R) are set to the first speed and a second state in which the revolving speeds are set to the second travel speed. The traveling switching valve 34 has first switching valves 71L and 71R and a second switching valve 72.

The first switching valve 71L is connected to the swash plate switching cylinder 37L of the left traveling motor 36L via a fluid tube, and is a two-position switching valve that is switched between a first position 71L1 and a second position 71L2. The first switching valve 71L shortens the swash plate switching cylinder 37L when at the first position 71L1, and stretches the swash plate switching cylinder 37L when at the second position 71L2.

The first switching valve 71R is connected to the swash plate switching cylinder 37R of the right traveling motor 36R via a fluid tube, and is a two-position switching valve that is switched between a first position 71R1 and a second position 71R2. The first switching valve 71R shortens the swash plate switching cylinder 37R when at the first position 71R1, and stretches the swash plate switching cylinder 37R when at the second position 71R2.

The second switching valve 72 is an electromagnetic valve configured to switch the first switching valve 71L and the first switching valve 71R, and is a two-position switching valve configured to be switched between a first position 72a and a second position 72b when magnetized. The second switching valve 72, the first switching valve 71L, and the first switching valve 71R are connected by the fluid tube 41.

The second switching valve 72 switches the first switching valve 71L and the first switching valve 71R to the first positions 71L1 and 71R1 when it is at the first position 72a, and switches the first switching valve 71L and the first switching valve 71R1 to the second positions 71L2 and 71R2 when it is at the second position 72b.

That is, when the second switching valve 72 is at the first position 72a, the first switching valve 71L is at the first position 71L1, and the first switching valve 71R is at the first position 71R1, the traveling switching valve 34 turns into the first state, and the revolving speeds of the traveling motors (the left traveling motor 36L and the right traveling motor 36R) are set to the first speed.

When the second switching valve 72 is at the second position 72b, the first switching valve 71L is at the second position 71L2, and the first switching valve 71R is at the second position 71R2, the traveling switching valve 34 is in the second state, and the revolving speeds of the traveling motors (the left traveling motor 36L and the right traveling motor 36R) are set to the second speed.

Thus, the traveling motors (the left traveling motor 36L and the right traveling motor 36R) are configured to be switched between the first speed on the low speed side and the second speed on the high speed side by the traveling switching valve 34.

The operation device 54 is a device for operating the traveling pumps (the left traveling pump 53L and the right traveling pump 53R), and is configured to change the angle of the swash plate (the swash plate angle) of the traveling pump. The operation device 54 includes an operation lever 59 and a plurality of operation valves 55.

The operation lever 59 is an operation lever that is supported by the operation valve 55 and is configured to swing in the left-right direction (a machine width direction) or in the front-back direction. That is, the operation lever 59 is configured to be operated rightward and leftward from the neutral position N with reference to the neutral position N, and is configured to be operated forward and backward from the neutral position N.

In other words, the operation lever 59 is configured to swing in at least four directions with reference to the neutral position N. For convenience of the explanation, a bi-direction to the front and the rear, that is, the front-rear direction is referred to as a first direction. In addition, a bi-direction to the right and the left, that is, the right-left direction (the machine width direction) is referred to as a second direction.

In addition, the plurality of operation valves 55 are operated in common by a single of the operation lever 59. The plurality of operation valves 55 are activated in accordance with the swinging of the operation lever 59. The output fluid tube 40 is connected to the plurality of operation valves 55, and the operation fluid (the pilot fluid) from the first hydraulic pump P1 can be supplied through the output fluid tube 40. The plurality of operation valves 55 include an operation valve 55A, an operation valve 55B, an operation valve 55C, and an operation valve 55D.

When the operation lever 59 is swung to a forward direction (to one side) of the front-rear direction (the first direction) (when in a forward operation), the operation valve 55A changes the pressure of the operation fluid to be outputted in accordance with an operation extent (an operation) of the forward operation.

When the operation lever 59 is swung to a backward direction (to the other side) of the front-rear direction (the first direction) (when in a backward operation), the operation valve 55B changes the pressure of the operation fluid to be outputted in accordance with an operation extent (an operation) of the backward operation.

When the operation lever 59 is swung to a rightward direction (to one side) of the right-left direction (the second direction) (when in a rightward operation), the operation valve 55C changes the pressure of the operation fluid to be outputted in accordance with an operation extent (an operation) of the rightward operation.

When the operation lever 59 is swung to a leftward direction (to the other side) of the right-left direction (the second direction) (when in a leftward operation), the operation valve 55D changes the pressure of the operation fluid to be outputted in accordance with an operation extent (an operation) of the leftward operation.

The plurality of operation valves 55 and the traveling pumps (the left traveling pump 53L and the right traveling pump 53R) are connected by the traveling fluid tube 45.

In other words, the traveling pumps (the left traveling pump 53L and the right traveling pump 53R) are hydraulic devices configured to be operated by the operation fluid outputted from the operation valves 55 (the operation valve 55A, the operation valve 55B, the operation valve 55C, and the operation valve 55D).

The traveling fluid tube 45 has a first traveling fluid tube 45*a*, a second traveling fluid tube 45*b*, a third traveling fluid tube 45*c*, a fourth traveling fluid tube 45*d*, and a fifth traveling fluid tube 45*e*. The first traveling fluid tube 45*a* is a fluid tube connected to the forward-traveling pressure receiving portion 53*a* of the traveling pump 53L. The second traveling fluid tube 45*b* is a fluid tube connected to the backward-traveling pressure receiving portion 53*b* of the traveling pump 53L.

The third traveling fluid tube 45*c* is a fluid tube connected to the forward-traveling pressure receiving portion 53*a* of the traveling pump 53R. The fourth traveling fluid tube 45*d* is a fluid tube connected to the backward-traveling pressure receiving portion 53*b* of the traveling pump 53R. The fifth traveling fluid tube 45*e* is a fluid tube connecting the operation valve 55, the first traveling fluid tube 45*a*, the second traveling fluid tube 45*b*, the third traveling fluid tube 45*c*, and the fourth traveling fluid tube 45*d*.

When the operation lever 59 is swung forward (in a direction indicated by an arrowed line A1 in FIG. 1), the operation valve 55A is operated, and the pilot pressure is outputted from the operation valve 55A. This pilot pressure is applied to the pressure receiving portion 53*a* of the left traveling pump 53L through the first traveling fluid tube 45*a*, and is applied to the pressure receiving portion 53*a* of the right traveling pump 53R through the third traveling fluid tube 45*c*.

In this manner, the swash plate angles of the left traveling pump 53L and the right traveling pump 53R are changed, the left traveling motor 36L and the right traveling motor 36R rotate normally (the forward rotation), and thus the working machine 1 travels straight forward.

In addition, when the operation lever 59 is swung backward (in a direction indicated by an arrowed line A2 in FIG. 1), the operation valve 55B is operated, and the pilot pressure is outputted from the operation valve 55B. This pilot pressure is applied to the pressure receiving portion 53*b* of the left traveling pump 53L through the second traveling fluid tube 45*b*, and is applied to the pressure receiving portion 53*b* of the right traveling pump 53R through the fourth traveling fluid tube 45*d*.

In this manner, the swash plate angles of the left traveling pump 53L and the right traveling pump 53R are changed, the left traveling motor 36L and the right traveling motor 36R rotate reversely (the backward rotation), and thus the working machine 1 travels straight backward.

In addition, when the operation lever 59 is swung rightward (in a direction indicated by an arrowed line A3 in FIG. 1), the operation valve 55C is operated, and the pilot pressure is outputted from the operation valve 55C. This pilot pressure is applied to the pressure receiving portion 53*a* of the left traveling pump 53L through the first traveling fluid tube 45*a*, and is applied to the pressure receiving portion 53*b* of the right traveling pump 53R through the fourth traveling fluid tube 45*d*.

In this manner, the swash plate angles of the left traveling pump 53L and the right traveling pump 53R are changed, the left traveling motor 36L rotates normally and the right traveling motor 36R rotates reversely, and thus the working machine 1 turns rightward.

In addition, when the operation lever 59 is swung leftward (in a direction indicated by an arrowed line A4 in FIG. 1), the operation valve 55D is operated, and the pilot pressure is outputted from the operation valve 55D. This pilot pressure is applied to the pressure receiving portion 53*a* of the right traveling pump 53R through the third traveling fluid tube 45*c*, and is applied to the pressure receiving portion 53*b* of the left traveling pump 53L through the second traveling fluid tube 45*b*.

In this manner, the swash plate angles of the left traveling pump 53L and the right traveling pump 53R are changed, the left traveling motor 36L rotates reversely and the right traveling motor 36R rotates normally, and thus the working machine 1 turns leftward.

When the operation lever 59 is swung in an oblique direction, the rotational directions and the revolving speeds of the left traveling motor 36L and the right traveling motor 36R are determined depending on the differential pressure between the pilot pressure applied to the pressure receiving portion 53*a* and the pilot pressure applied to the pressure receiving portion 53*b*. Thus, the working machine 1 turns right or left while traveling forward or backward.

That is, when the operation lever 59 is swung obliquely forward left, the working machine 1 turns left while traveling forward at a speed corresponding to the swing angle of the operation lever 59, and when the operation lever 59 is swung obliquely forward right, the working machine 1 turns right while traveling forward at a speed corresponding to the swing angle of the operation lever 59. When the operation lever 59 is swung obliquely backward left, the working machine 1 turns left while traveling backward at a speed corresponding to the swing angle of the operation lever 59, and when the operation lever 59 is swung obliquely backward right, the working machine 1 turns right while traveling backward at a speed corresponding to the swing angle of the operation lever 59.

As shown in FIG. 18, the working machine 1 includes a controller device 60. The controller device 60 performs various controls of the working machine 1, and is constituted of a semiconductor such as a CPU and an MPU, an electric circuit, and an electronic circuit, or the like. An accelerator 65, a mode switch 66, and a speed-changing switch 67 are connected to the controller device 60. The accelerator 65 is a member used for setting the prime mover revolving speed 32 (the prime mover revolving speed), and is provided in the vicinity of the operator seat 8.

The accelerator 65 is an accelerator lever swingably supported, an accelerator pedal swingably supported, an accelerator volume swingably supported, an accelerator slider slidably supported, or the like. The accelerator 65 is not limited to the example described above.

The mode switch 66 is a switch configured to switch the automatic deceleration between valid and invalid. For example, the mode switch 66 is a switch configured to be switched between ON and OFF. When the mode switch 66 is ON, the automatic deceleration is switched to be valid. When the mode switch 66 is OFF, the automatic deceleration is switched to be invalid.

The speed-changing switch 67 is provided in the vicinity of the operator seat 8, and is configured to be operated by a driver (an operator). The speed-changing switch 67 is a switch configured to manually switch the traveling motors (the left traveling motor 36L and the right traveling motor 36R) to any one of the first speed and the second speed.

For example, the speed-changing switch 67 is a seesaw switch configured to switch between the first speed side and the second speed side, and is configured to perform an accelerating operation that switches from the first speed side to the second speed side, and to perform a decelerating operation that switches from the second speed to the first speed.

As shown in FIG. 18, the controller device 60 includes an automatic decelerator portion 61. The automatic decelerator portion 61 is constituted of an electric circuit or an electronic circuit provided in the controller device 60 or of a computer program or the like stored in the controller device 60.

The automatic decelerator portion 61 performs the automatic deceleration control when the automatic deceleration is valid, and does not perform the automatic deceleration control when the automatic deceleration is invalid.

Under the automatic deceleration control, when a predetermined condition (an automatic deceleration condition) is satisfied under a state where the traveling motors (the left traveling motor 36L and the right traveling motor 36R) are at the second speed, the traveling motors (the left traveling motor 36L and the right traveling motor 36R) are automatically switched from the second speed to the first speed.

Under the automatic deceleration control, when the automatic deceleration condition is satisfied at least under the state where the traveling motors (the left traveling motor 36L and the right traveling motor 36R) are at the second speed, the controller device 60 demagnetizes the solenoid of the second switching valve 72 to switch the second switching valve 72 from the second position 72*b* to the first position 72*a*. Thus, the traveling motors (the left traveling motor 36L and the right traveling motor 36R) are decelerated from the second speed to the first speed.

That is, when performing the automatic deceleration in the automatic deceleration control, the controller device 60 decelerates both of the left traveling motor 36L and the right traveling motor 36R from the second speed to the first speed.

When a return condition is satisfied after the automatic deceleration is performed, the automatic decelerator portion 61 magnetizes the solenoid of the second switching valve 72 to switch the second switching valve 72 from the first position 72*a* to the second position 72*b*. In this manner, the speeds of the traveling motors (the left traveling motor 36L and the right traveling motor 36R) are increased from the first speed to the second speed, that is, the speeds of the traveling motors are recovered.

That is, when returning from the first speed to the second speed, the controller device 60 accelerates both of the left traveling motor 36L and the right traveling motor 36R from the first speed to the second speed.

When the automatic deceleration is invalid, the controller device 60 performs a manual switching control to switch the traveling motors (the left traveling motor 36L and the right traveling motor 36R) to either one of the first speed and the second speed in response to operation of the speed switching switch 67.

In the manual switching control, when the speed-changing switch 67 is switched to the first speed side, the controller device 60 demagnetizes the solenoid of the second switching valve 72 so that the traveling motors (the left traveling motor 36L and the right traveling motor 36R) are switched to the first speed.

In addition, in the manual switching control, when the speed-changing switch 67 is switched to the second speed side, the controller device 60 demagnetizes the solenoid of the second switching valve 72 so that the traveling motors (the left traveling motor 36L and the right traveling motor 36R) are switched to the second speed.

Next, an automatic deceleration condition that is a condition under which the automatic deceleration control is carried out, will be described below.

The controller device 60 (the automatic decelerator portion 61) sets the pressures of the connector fluid tubes 57*h* and 57*i* as one of the automatic deceleration conditions.

The traveling pump pressure detector device 80 configured to detects the pressures of the connector fluid tubes 57*h* and 57*i* as the traveling pump pressure V is connected to the controller device 60. That is, the traveling pump pressure detector device 80 detects the pressures of the operation fluid outputted by the left traveling pump 53L and the right traveling pump 53R to the connector fluid tubes 57*h* and 57*i* (the pressures of the connector fluid tubes 57*h* and 57*i*) as the traveling pump pressure V.

The traveling pump pressure detector device 80 is configured to detect a plurality of traveling pump pressures of the traveling motors. In particular, the left traveling motor 36L has a first port P11 and a second port P12, and the right traveling motor 36R has a third port P13 and a fourth port P14. The traveling pump pressure detector device 80 detects respectively, in the connector fluid tubes 57*h* and 57*i*, the traveling pump pressures on the first port P11 side, the second port P12 side, the third port P13 side, and the fourth port P14 side.

In addition, the first port P11 serves as an output-side port when the left traveling motor 36L rotates normally, and the second port P12 serves as a suction-side port when the left traveling motor 36L rotates normally. The third port P13 serves as an output-side port when the right traveling motor 36R rotates normally, and the fourth port P14 serves as a suction-side port when the right traveling motor 36R rotates normally.

As shown in FIG. 18, the traveling pump pressure detector device 80 includes a first pressure detector device 80*a*, a second pressure detector device 80*b*, a third pressure detector device 80*c*, and a fourth pressure detector device 80*d*.

The first pressure detector device 80*a* is provided on the first port P11 side of the left traveling motor 36L in the connector fluid tube 57*h*, and detects the traveling pump pressure V on the first port P11 side as the first traveling pump pressure V1.

The second pressure detector device 80*b* is provided on the second port P12 side of the left traveling motor 36L in the connector fluid tube 57*h*, and detects the traveling pump pressure V on the second port P12 side as the second traveling pump pressure V2.

The third pressure detector device 80*c* is provided on the third port P13 side of the right traveling motor 36R in the connector fluid tube 57i, and detects the traveling pump pressure V on the third port P13 side as the third traveling pump pressure V3.

The fourth pressure detector device 80d is provided on the fourth port P14 side of the right traveling motor 36R in the connector fluid tube 57i, and detects the traveling pump pressure V on the fourth port P14 side as the fourth traveling pump pressure V4.

When the pair of traveling motors (the left traveling motor 36L and the right traveling motor 36R) are at the second speed, the automatic decelerator portion 61 performs the automatic deceleration when any one of a first differential pressure $\Delta V1$ that is a difference (V1−V2) between the first traveling pump pressure V1 and the second traveling pump pressure V2, a second differential pressure $\Delta V2$ that is a difference (V2−V1) between the second traveling pump pressure V2 and the first traveling pump pressure V1, a third differential pressure $\Delta V3$ that is a difference (V3−V4) between the third traveling pump pressure V3 and the fourth traveling pump pressure V4, and a fourth differential pressure $\Delta V4$ that is a difference (V4−V3) between the fourth traveling pump pressure V4 and the third traveling pump pressure V3 is equal to or more than a deceleration threshold value Q10.

After the automatic deceleration, when all of the first differential pressure $\Delta V1$, the second differential pressure $\Delta V2$, the third differential pressure $\Delta V3$, and the fourth differential pressure $\Delta V4$ are equal to or less than a return threshold value Q11, the automatic decelerator portion 61 returns from the first speed to the second speed. As shown in FIG. 19, the return threshold value Q11 is a value smaller than the deceleration threshold value Q10.

Figure 20:
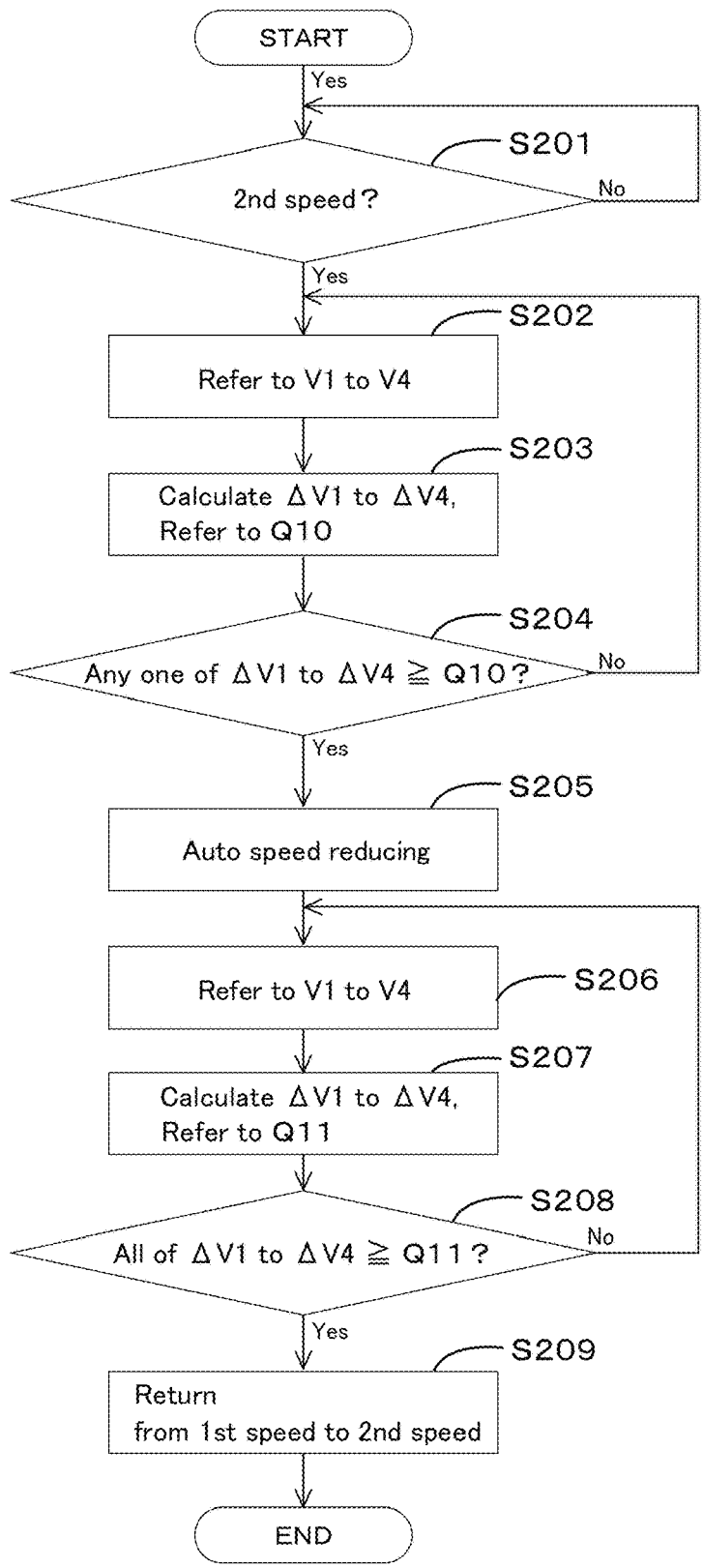
FIG. 20 is a view illustrating a first process in an automatic decelerator portion according to the embodiment.

FIG. 20 is a diagram summarizing the processing in the automatic decelerator portion 61.

As shown in FIG. 20, under the state where the automatic deceleration is valid and the traveling motor is at the second speed (step S201, Yes), the automatic decelerator portion 61 refers to the detected values (V1 to V4) of the traveling pump pressure detector device 80 (step S202).

The automatic decelerator portion 61 calculates the first differential pressure $\Delta V1$, the second differential pressure $\Delta V2$, the third differential pressure $\Delta V3$, and the fourth differential pressure $\Delta V4$ (step S203).

The automatic decelerator portion 61 judges whether any one of the first differential pressure $\Delta V1$, the second differential pressure $\Delta V2$, the third differential pressure $\Delta V3$, and the fourth differential pressure $\Delta V4$ is equal to or more than the deceleration threshold value Q10 (step S204).

When any one of the first differential pressure $\Delta V1$, the second differential pressure $\Delta V2$, the third differential pressure $\Delta V3$, and the fourth differential pressure $\Delta V4$ is equal to or more than the deceleration threshold value Q10 (step S204, Yes), the automatic decelerator portion 61 performs the automatic deceleration. (step S205).

After performing the automatic deceleration, the automatic decelerator portion 61 refers to the first differential pressure $\Delta V1$, the second differential pressure $\Delta V2$, the third differential pressure $\Delta V3$, and the fourth differential pressure $\Delta V4$ (step S206).

The automatic decelerator portion 61 calculates the first differential pressure $\Delta V1$, the second differential pressure $\Delta V2$, the third differential pressure $\Delta V3$, and the fourth differential pressure $\Delta V4$ (step S207).

The automatic decelerator portion 61 judges whether all of the first differential pressure $\Delta V1$, the second differential pressure $\Delta V2$, the third differential pressure $\Delta V3$, and the fourth differential pressure $\Delta V4$ are equal to or less than the return threshold value Q11 (step S208).

When all of the first differential pressure $\Delta V1$, the second differential pressure $\Delta V2$, the third differential pressure $\Delta V3$, and the fourth differential pressure $\Delta V4$ are equal to or less than the return threshold value Q11 (step S208, Yes), the automatic decelerator portion 61 returns from the first speed to the second speed (step S209).

When the pair of traveling motors (the left traveling motor 36L and the right traveling motor 36R) are at the second speed, the automatic decelerator portion 61 performs the automatic deceleration when any one of a first differential pressure $\Delta V1$ that is a difference (V1-V2) between the first traveling pump pressure V1 and the second traveling pump pressure V2, a second differential pressure $\Delta V2$ that is a difference (V2-V1) between the second traveling pump pressure V2 and the first traveling pump pressure V1, a third differential pressure $\Delta V3$ that is a difference (V3-V4) between the third traveling pump pressure V3 and the fourth traveling pump pressure V4, and a fourth differential pressure $\Delta V4$ that is a difference (V4-V3) between the fourth traveling pump pressure V4 and the third traveling pump pressure V3 is equal to or more than a deceleration threshold value Q10.

After the automatic deceleration, when all of the first differential pressure $\Delta V1$, the second differential pressure $\Delta V2$, the third differential pressure $\Delta V3$, and the fourth differential pressure $\Delta V4$ are equal to or less than the return threshold value Q11, the automatic decelerator portion 61 returns from the first speed to the second speed.

According to that configuration, the traveling torque is generated on both port sides of the left traveling motor 36L and the right traveling motor 36R in the HST in which the left traveling pump 53L and the right traveling pump 53R respectively drive the left traveling motor 36L and the right traveling motor 36R. Thus, the traveling load can be accurately judged.

As the result, the automatic deceleration can be accurately performed with reference to the first differential pressure $\Delta V1$, the second differential pressure $\Delta V2$, the third differential pressure $\Delta V3$, and the fourth differential pressure $\Delta V4$. Similarly, with reference to the first differential pressure $\Delta V1$, the second differential pressure $\Delta V2$, the third differential pressure $\Delta V3$, and the fourth differential pressure $\Delta V4$, it is possible to accurately return from the second speed to the first speed.

Under the state where the pair of traveling motors (the left traveling motor 36L and the right traveling motor 36R) are at the second speed, the automatic decelerator portion 61 may perform the automatic deceleration when either one of a first absolute value (|V1−V2|, |V2−V1|) that is an absolute value between a value of the first traveling pump pressure V1 and a value of the second traveling pump pressure V2 and a second absolute value (|V3−V4|, |V4−V3|) that is an absolute value between a value of the third traveling pump pressure V3 and a value of the fourth traveling pump pressure V4 is equal to or more than the deceleration threshold value Q12.

In addition, when all of the first absolute values (|V1−V2|, |V2−V1|) and the second absolute values (|V3−V4|, |V4−V3|) are equal to or less than the return threshold value Q13 after the automatic deceleration, the automatic decelerator portion 61 may return from the first speed to the second speed.

Figure 21:
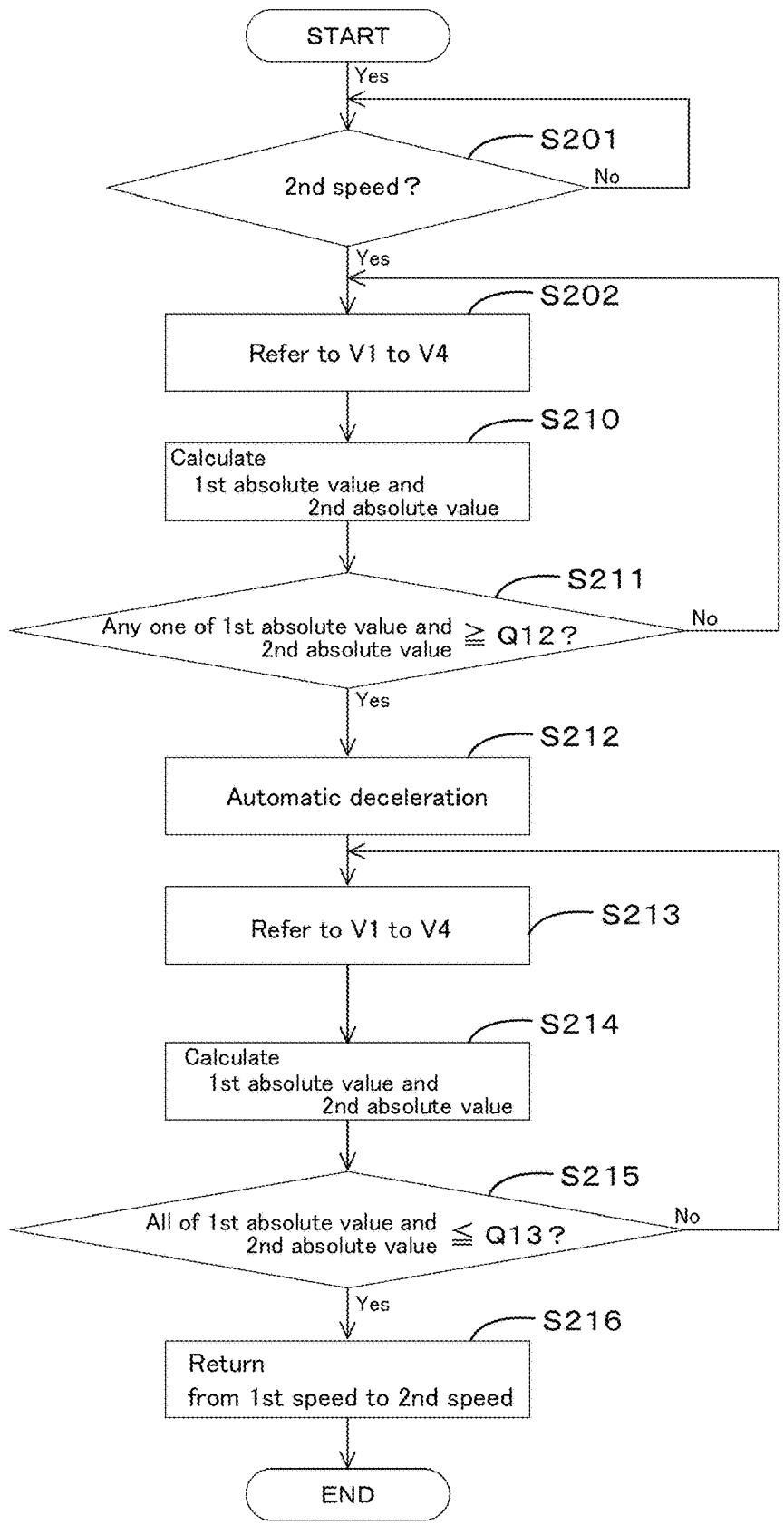
FIG. 21 is a view illustrating a second process in the automatic decelerator portion according to the embodiment.

FIG. 21 is a diagram summarizing the processing in the automatic decelerator portion 61.

As shown in FIG. 21, under the state where the automatic deceleration is valid and the traveling motor is at the second speed (step S201, Yes), the automatic decelerator portion 61 refers to the detected values (V1 to V4) of the traveling pump pressure detector device 80 (step S202).

The automatic decelerator portion 61 calculates the first absolute value and the second absolute value (step S210).

The automatic decelerator portion 61 judges whether either one of the first absolute value and the second absolute value is equal to or more than the deceleration threshold Q12 (step S211).

When either one of the first absolute value or the second absolute value is equal to or more than the deceleration threshold Q12 (step S211, Yes), the automatic decelerator portion 61 performs the automatic deceleration (step S212).

After performing the automatic deceleration, the automatic decelerator portion 61 refers to the detected values (V1 to V4) of the traveling pump pressure detector device 80 (step S213).

The automatic decelerator portion 61 calculates the first absolute value and the second absolute value (step S214).

The automatic decelerator portion 61 judges whether all of the first absolute value and the second absolute value are equal to or less than the return threshold value Q13 (step S215).

When all of the first absolute value and the second absolute value are equal to or less than the return threshold value Q13 (step S215, Yes), the automatic decelerator portion 61 returns from the first speed to the second speed (step S216).

In the HST, since the traveling torque is generated at both ports of the left traveling motor 36L and the right traveling motor 36R, the traveling load can be accurately determined. As the result, with reference to the first absolute value and the second absolute value, it is possible to accurately perform the automatic deceleration and to return the HST from the second speed to the first speed.

In the embodiment described above, the automatic decelerator portion 61 automatically decelerates from the second speed to the first speed under the state where both of the pair of traveling motors (the left traveling motor 36L and the right traveling motor 36R) are at the second speed. However, the automatic decelerator portion 61 may perform the automatic deceleration when any one of the pair of traveling motors (the left traveling motor 36L and the right traveling motor 36R) is at the second speed.

In addition, the automatic decelerator portion 61 may return from the first speed to the second speed after one of the pair of traveling motors (the left traveling motor 36L and the right traveling motor 36R) has automatically decelerated.

As described above, the second speed is only required to be higher than the first speed, so that the working machine is not limited to two shift speeds, and may employ the multiple shift speeds (a plurality of shift speeds).

In the embodiment described above, the left traveling motor 36L and the left traveling motor 36R are simultaneously switched to the first speed or to the second speed, and the automatic deceleration is performed simultaneously on the left traveling motor 36L and on the left traveling motor 36R. However, the automatic deceleration may be performed under the state where at least one of the left traveling motor 36L and the left traveling motor 36R is switched to the first speed or to the second speed and where at least one of the left traveling motor 36L and the left traveling motor 36R is at the second speed.

In addition, the traveling motors (the left traveling motor 36L and the right traveling motor 36R) may be the axial piston motors or the radial piston motors. Regardless of whether the traveling motor is the radial piston motor or the radial piston motor, it is possible to switch to the first speed due to the increasing of the motor displacement and to switch to the second speed due to the decreasing of the motor displacement.

The controller device 60 may change the deceleration threshold values Q10 and Q12 depending on the state of the working machine 1. In addition, the controller device 60 may change the return threshold values Q11 and Q13 depending on the state of the working machine 1.

As shown in FIG. 18, a revolving speed detector device 68, to a swash plate angle detector device 69, and a temperature detector device 70 are connected to the controller device 60. The revolving speed detector device 68 is constituted of a sensor or the like configured to detect the revolving speed, and detects the current revolving speed of the prime mover (the prime mover revolving speed) as the state of the working machine. The revolving speed detector device 68 may be a device configured to detect the prime mover revolving speed based on the operation extent of the accelerator 65.

As shown in FIG. 19, the controller device 60 decreases the deceleration threshold values Q10 and Q12 as the prime mover revolving speed detected by the revolving speed detector device 68 decreases, and increases the deceleration threshold values Q10 and Q12 as the prime mover revolving speed increases.

On the other hand, for example, the controller device 60 decreases the return threshold values Q11 and Q13 as the prime mover revolving speed detected by the revolving speed detector device 68 decreases, and increases the return threshold values Q11 and Q13 as the prime mover revolving speed increases.

The swash plate angle detector device 69 is a device configured to detect the swash plate angles of the traveling pumps (the left traveling pump 53L and the right traveling pump 53R).

The swash plate angle detector device 69 may be, for example, a sensor configured to detect the pressure of operation fluid (the pilot pressure) in the traveling fluid tube 45 and to convert the pilot pressure into the angle of swash plate angle (the swash plate angle), a sensor configured to detect an operation extent of the regulator of the traveling pump (the left traveling pump 53L and the right traveling pump 53R) to detect the angle of swash plate, a variable resistor or a potentiometer configured to obtain the angle of swash plate based on the operation extent of the operation lever 59, or other sensors or the like, and is not limited thereto.

As shown in FIG. 19, the controller device 60 decreases the deceleration threshold values Q10 and Q12 as the swash plate angle detected by the swash plate angle detector device 69 decreases, and increases the deceleration threshold values Q10 and Q12 as the swash plate angle increases. On the other hand, the controller device 60 decreases the return threshold values Q11 and Q13 as the swash plate angle decreases, and increases the return threshold values Q11 and Q13 as the swash plate angle increases, for example.

As shown in FIG. 18, the deceleration threshold values Q10 and Q12 and the return threshold values Q11 and Q13 may be changed based on the state of the working machine 1, that is, the state of the anti-stall valve 58. The anti-stall valve 58 is provided in the middle portion of the output fluid tube. The anti-stall valve 58 is a valve provided on the primary side of the operation valve 55 (the operation valve 55A, the operation valve 55B, the operation valve 55C, and the operation valve 55D) and configured to control the operation fluid to be supplied to the operation valve 55.

Figure 22:
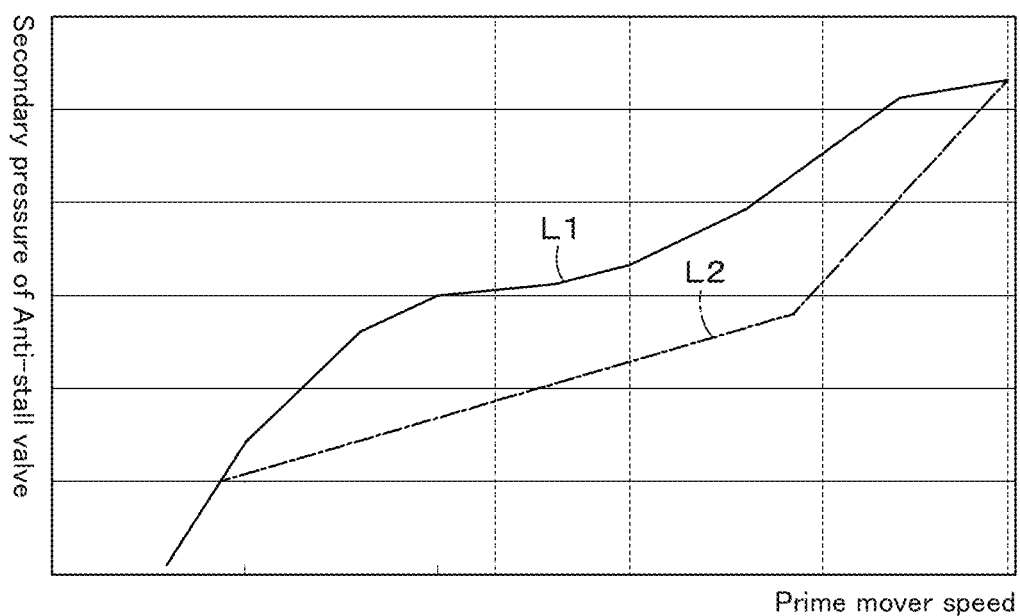
FIG. 22 is a view illustrating a relation between a prime-mover revolving speed, a secondary pilot pressure, and control lines L1 and L2 according to the embodiment.
Figure 23:
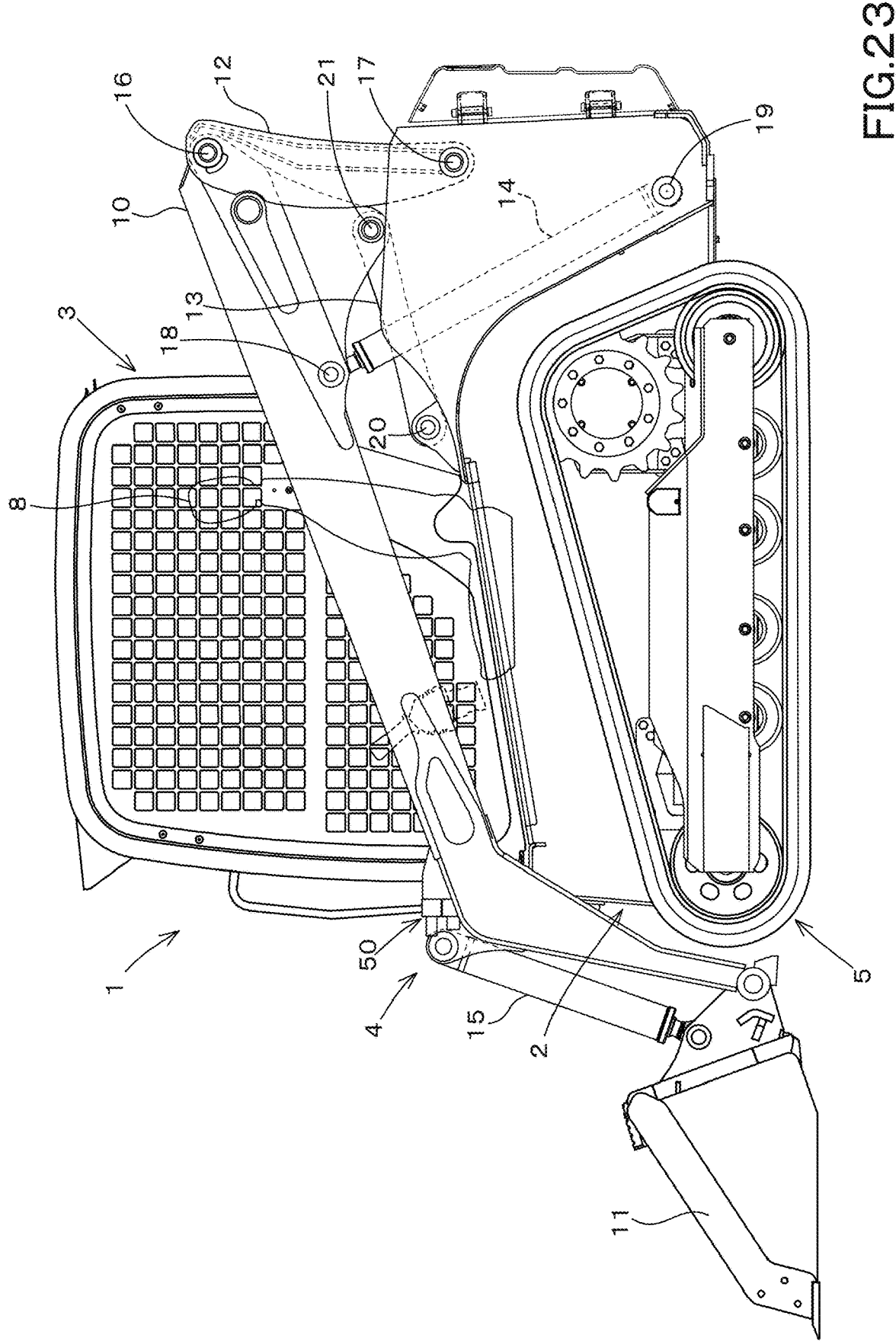
FIG. 23 is a side view illustrating a track loader that is an example of the working machine according to the embodiment.

The anti-stall valve 58 performs the control for preventing the engine stall (the anti-stall control). FIG. 22 shows the relation between the prime mover revolving speed, the secondary pilot pressure of the anti-stall valve 58, and the control lines L1 and L2.

The secondary pilot pressure is a pressure of the operation fluid (a secondary pressure) that is applied by the anti-stall valve 58, and is a pressure of the operation fluid in a section between the anti-stall valve 58 and the operation valves 55 (the operation valve 55a, the operation valve 55b, the operation valve 55c, and the operation valve 55d). That is, it is the primary pressure of the operation fluid that enters the operation valve 55 provided to the operation lever 59.

The control line L1 represents the relation between the prime mover revolving speed and the secondary pilot pressure under the state where the dropping amount is less than a predetermined value. The control line L2 represents the relation between the prime mover revolving speed and the secondary pilot pressure under the state where the dropping amount is equal to or more than the predetermined value.

When the dropping amount is less than the predetermined amount, the controller device 60 adjusts the opening aperture of the anti-stall valve 58 such that the relation between the actual revolving speed of the prime mover and the secondary pilot pressure matches the control line L1. In addition, when the dropping amount is equal to or more than the predetermined value, the controller device 60 adjusts the opening aperture of the anti-stall valve 58 such that the relation between the actual revolving speed of the prime mover and the secondary pilot pressure matches the control line L2.

As for the control line L2, the secondary pilot pressure for a predetermined prime mover revolving speed is lower than the secondary pilot pressure on the control line L1. That is, when paying attention to the same prime mover revolving speed, the secondary pilot pressure of the control line L2 is lower than the secondary pilot pressure of the control line L1.

Thus, the pressure (the pilot pressure) of the operation fluid entering the operation valve 55 is suppressed low under the controlling based on the control line L2. As the result, the swash plate angles of the traveling pumps (the left traveling pump 53L and the right traveling pump 53R) are adjusted, the load applied to the prime mover is reduced, and thereby the stall of the prime mover can be prevented.

Although FIG. 22 shows a single of control line L2, a plurality of control lines L2 may be employed. For example, the control line L2 may be set for each of the prime mover revolving speeds. In addition, the controller device 60 preferably has data representing the control lines L1 and L2 and control parameters such as functions.

As shown in FIG. 19, the controller device 60 decreases the deceleration threshold values Q10 and Q12 as the secondary pilot pressure of anti-stall valve 58 decreases, and increases the deceleration threshold values Q10 and Q12 as the secondary pilot pressure of the anti-stall valve 58.

On the other hand, the controller device 60 decreases the return threshold values Q11 and Q13 as the secondary pilot pressure of the anti-stall valve 58 decreases, and increases the return threshold values Q11 and Q13 as the secondary pilot pressure of the anti-stall valve 58, for example.

In addition, the temperature detector device 70 is a sensor or the like configured to detect the temperature of the operation fluid as the state of the working machine. For example, the controller device 60 increases the deceleration threshold values Q10 and Q12 as the temperature (the fluid temperature) detected by the temperature detector device 70 decreases, and decreases the deceleration threshold values Q10 and Q12 as the oil temperature increases.

In addition, the controller device 60 increases the return threshold values Q11 and Q13 as the temperature (the fluid temperature) detected by the temperature detector device 70 decreases, and decreases the deceleration threshold values Q10 and Q12 as the fluid temperature increases, for example.

A working machine comprises: a machine body; a prime mover; a pair of traveling devices, one of the traveling devices being arranged to a left side of the machine body, the other one of the traveling devices being arranged to a right side of the machine body; a pair of traveling motors having a first speed and a second speed higher than the first speed, one of the traveling motors being configured to provide power to the traveling device arranged to the left side, the other one of the traveling motors being configured to provide power to the traveling device arranged to the right side; a pair of traveling pumps to be driven by power of the prime mover and to supply operation fluid to the traveling motors; a connector fluid tube including: a first tube connecting the one of the traveling motors and the one of the traveling pumps; and a second tube connecting the other one of the traveling motors and the other one of the traveling pumps; a traveling-pump pressure detector to detect a traveling-pump pressure that is pressure generated in the connector fluid tube; and a controller having: an automatic decelerator portion to perform, when at least one of the traveling motors is at the second speed, an automatic deceleration process for reducing a speed of the traveling motor from the second speed to the first speed, wherein one of the traveling motors includes a first port connected to the connector fluid tube and a second port connected to the connector fluid tube, wherein the other one of the traveling motors includes a third port connected to the connector fluid tube and a fourth port connected to the connector fluid tube, wherein the traveling-pump pressure detector includes: a first pressure detector to detect a first traveling pump pressure corresponding to a pressure generated in the connector fluid tube on the first port side; a second pressure detector to detect a second traveling pump pressure corresponding to a pressure generated in the connector fluid tube on the second port side; a third pressure detector to detect a third traveling pump pressure corresponding to a pressure generated in the connector fluid tube on the third port side; and a fourth pressure detector to detect a fourth traveling pump pressure corresponding to a pressure generated in the connector fluid tube on the fourth port side, wherein the automatic decelerator portion performs the automatic deceleration process when any one of a first differential pressure that is a difference of the first traveling pump pressure from the second traveling pump pressure, a second differential pressure that is a difference of the second traveling pump pressure from the first traveling pump pressure, a third differential pressure that is a difference of the third traveling pump pressure from the fourth traveling pump pressure, and a fourth differential pressure that is a difference of the fourth traveling pump pressure from the third traveling pump pressure is equal to or higher than a decelerating threshold under a state where at least one of the traveling motors is at the second speed.

A working machine comprises: a machine body; a prime mover; a pair of traveling devices, one of the traveling devices being arranged to a left side of the machine body, the other one of the traveling devices being arranged to a right side of the machine body; a pair of traveling motors having a first speed and a second speed higher than the first speed, one of the traveling motors being configured to provide power to the traveling device arranged to the left side, the other one of the traveling motors being configured to provide power to the traveling device arranged to the right side; a pair of traveling pumps to be driven by power of the prime mover and to supply operation fluid to the traveling motors; a connector fluid tube including: a first tube connecting the one of the traveling motors and the one of the traveling pumps; and a second tube connecting the other one of the traveling motors and the other one of the traveling pumps; a traveling-pump pressure detector to detect a traveling-pump pressure that is pressure generated in the connector fluid tube; and a controller having: an automatic decelerator portion to perform, when at least one of the traveling motors is at the second speed, an automatic deceleration process for reducing a speed of the traveling motor from the second speed to the first speed, wherein one of the traveling motors includes a first port connected to the connector fluid tube and a second port connected to the connector fluid tube, wherein the other one of the traveling motors includes a third port connected to the connector fluid tube and a fourth port connected to the connector fluid tube, wherein the traveling-pump pressure detector includes: a first pressure detector to detect a first traveling pump pressure corresponding to a pressure generated in the connector fluid tube on the first port side; a second pressure detector to detect a second traveling pump pressure corresponding to a pressure generated in the connector fluid tube on the second port side; a third pressure detector to detect a third traveling pump pressure corresponding to a pressure generated in the connector fluid tube on the third port side; and a fourth pressure detector to detect a fourth traveling pump pressure corresponding to a pressure generated in the connector fluid tube on the fourth port side, wherein the automatic decelerator portion performs the automatic deceleration process when any one of a first absolute value that is an absolute value of difference between the first traveling pump pressure and the second traveling pump pressure and a second absolute value that is an absolute value of difference between the third traveling pump pressure and the fourth traveling pump pressure under a state where at least one of the traveling motors is at the second speed.

The automatic decelerator portion returns a speed of the traveling motor from the first speed to the second speed when all of the first differential pressure, the second differential pressure, the third differential pressure, and the fourth differential pressure are equal to or lower than a returning threshold after automatic deceleration process.

The automatic decelerator portion returns a speed of the traveling motor from the first speed to the second speed when all of the first absolute value and the second absolute value are equal to or lower than a returning threshold after automatic deceleration process.

The controller changes the decelerating threshold depending on a state of the working machine.

The controller changes the decelerating threshold depending on a state of the working machine.

The controller changes the returning threshold depending on a state of the working machine.

The controller changes the returning threshold depending on a state of the working machine.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
    a prime mover;
    a first traveling pump driven by power of the prime mover to supply operation fluid through a first connector fluid tube;
    a first traveling motor including first and second ports connected to the first connector fluid tube, the first traveling motor configured to provide the power to a first traveling device by the operation fluid supplied from the first traveling pump, and to be switched in a first speed and a second speed higher than the first speed;
    a first pressure detector to detect first traveling-pump pressure of the operation fluid in the first connector fluid tube near the first port;
    a second pressure detector to detect second traveling-pump pressure of the operation fluid in the first connector fluid tube near the second port; and
    a controller configured, with the first traveling motor switched in the second speed, to automatically shift down the first traveling motor from the second speed to the first speed, when a first differential pressure between the first traveling-pump pressure and the second traveling-pump pressure and/or a second differential pressure between the second traveling-pump pressure and the first traveling-pump pressure is equal to or more than a deceleration threshold, wherein
    the controller is configured, after the first traveling motor is shifted down from the second speed to the first speed, to automatically shift up the first traveling motor from the first speed to the second speed, when the first differential pressure and the second differential pressure are equal to or less than a return threshold which is less than the deceleration threshold.

2. The working machine according to claim 1, comprising:
    a second traveling pump driven by power of the prime mover to supply the operation fluid through a second connector fluid tube;
    a second traveling motor including third and fourth ports connected to the second connector fluid tube, the second traveling motor configured to provide the power to a second traveling device by the operation fluid supplied from the second traveling pump, and to be switched in the first speed and the second speed higher than the first speed;
    a third pressure detector to detect third traveling-pump pressure of the operation fluid in the second connector fluid tube near the third port; and
    a fourth pressure detector to detect fourth traveling-pump pressure of the operation fluid in the second connector fluid tube near the fourth port, wherein
    the controller is configured, with the second traveling motor switched in the second speed, to automatically shift down the second traveling motor from the second speed to the first speed, when a third differential pressure between the third traveling-pump pressure and the fourth traveling-pump pressure and/or a fourth differential pressure between the fourth traveling-pump pressure and the third traveling-pump pressure is equal to or more than a deceleration threshold.

3. The working machine according to claim 2, wherein
the controller is configured, after the second traveling motor is shifted down from the second speed to the first speed, to automatically shift up the second traveling motor from the first speed to the second speed, when the third differential pressure and the fourth differential pressure are equal to or less than a return threshold which is less than the deceleration threshold.

4. The working machine according to claim 1,
wherein the controller is configured to change the deceleration threshold depending on a state of the working machine.

5. The working machine according to claim 1, comprising:
a revolving speed detector connected to the controller and configured to detect revolving speed of the prime mover, wherein
the controller is configured to increase the deceleration threshold as the revolving speed of the prime mover increases.

6. The working machine according to claim 1, comprising:
a swash-plate angle detector connected to the controller and configured to detect the swash-plate angle of the first traveling pump, wherein
the controller is configured to increase the deceleration threshold as the swash-plate angle of the first traveling pump increases.

7. The working machine according to claim 1, comprising:
a thermal sensor connected to the controller and configured to detect temperature of the operation fluid, wherein
the controller is configured to increase the deceleration threshold as the temperature of the operation fluid decreases.

8. The working machine according to claim 1, comprising:
a mode switch connected to the controller and configured for an operator to select an ON position allowing the controller to automatically shift down the first traveling motor from the second speed to the first speed and an OFF position preventing the controller to automatically shift down the first traveling motor from the second speed to the first speed.

9. The working machine according to claim 1, comprising:
a display connected to the controller and configured to display whether the first traveling motor is switched to the first speed or the second speed.

10. The working machine according to claim 1, comprising:
a display connected to the controller and configured to display that the first traveling motor is automatically shifted down from the second speed to the first speed.

11. The working machine according to claim 10, wherein
the display has a lamp which blinks when the first traveling motor is automatically shifted down from the second speed to the first speed.

12. A working machine comprising:
a prime mover;
a first traveling pump driven by power of the prime mover to supply operation fluid through a first connector fluid tube;
a first traveling motor including first and second ports connected to the first connector fluid tube, the first traveling motor configured to provide the power to a first traveling device by the operation fluid supplied from the first traveling pump, and to be switched in a first speed and a second speed higher than the first speed;
a first pressure detector to detect first traveling-pump pressure of the operation fluid in the first connector fluid tube near the first port;
a second pressure detector to detect second traveling-pump pressure of the operation fluid in the first connector fluid tube near the second port; and
a controller configured, with the first traveling motor switched in the second speed, to automatically shift down the first traveling motor from the second speed to the first speed, when a first absolute value of a first differential pressure between the first traveling-pump pressure and the second traveling-pump pressure is equal to or more than a deceleration threshold, wherein
the controller is configured, after the first traveling motor is shifted down from the second speed to the first speed, to automatically shift up the first traveling motor from the first speed to the second speed, when the first absolute value is equal to or less than a return threshold which is less than the deceleration threshold.

13. The working machine according to claim 12, comprising:
a second traveling pump driven by power of the prime mover to supply the operation fluid through a second connector fluid tube;
a second traveling motor including third and fourth ports connected to the second connector fluid tube, the second traveling motor configured to provide the power to a second traveling device by the operation fluid supplied from the second traveling pump, and to be switched in the first speed and the second speed higher than the first speed;
a third pressure detector to detect third traveling-pump pressure of the operation fluid in the second connector fluid tube near the third port; and
a fourth pressure detector to detect fourth traveling-pump pressure of the operation fluid in the second connector fluid tube near the fourth port, wherein
the controller is configured, with the second traveling motor switched in the second speed, to automatically shift down the second traveling motor from the second speed to the first speed, when a second absolute value of a second differential pressure between the third traveling-pump pressure and the fourth traveling-pump pressure is equal to or more than a deceleration threshold.

14. The working machine according to claim 13, wherein
the controller is configured, after the second traveling motor is shifted down from the second speed to the first speed, to automatically shift up the second traveling motor from the first speed to the second speed, when the second absolute value is equal to or less than a return threshold which is less than the deceleration threshold.

15. The working machine according to claim 12, comprising:
a mode switch connected to the controller and configured for an operator to select an ON position allowing the controller to automatically shift down the first traveling motor from the second speed to the first speed and an OFF position preventing the controller to automatically shift down the first traveling motor from the second speed to the first speed.

16. The working machine according to claim 15, wherein the display has a lamp which lights on when the mode switch is in the ON position.

17. The working machine according to claim 12, comprising:
- a display connected to the controller and configured to display whether the first traveling motor is switched to the first speed or the second speed.

18. The working machine according to claim 1,
wherein the controller is configured to change the return threshold depending on a state of the working machine.

19. A working machine comprising:
- a prime mover;
- a first traveling pump driven by power of the prime mover to supply operation fluid through a first connector fluid tube;
- a first traveling motor including first and second ports connected to the first connector fluid tube, the first traveling motor configured to provide the power to a first traveling device by the operation fluid supplied from the first traveling pump, and to be switched in a first speed and a second speed higher than the first speed;
- a first pressure detector to detect first traveling-pump pressure of the operation fluid in the first connector fluid tube near the first port;
- a second pressure detector to detect second traveling-pump pressure of the operation fluid in the first connector fluid tube near the second port; and
- a controller configured, with the first traveling motor switched in the second speed, to automatically shift down the first traveling motor from the second speed to the first speed, when a first differential pressure between the first traveling-pump pressure and the second traveling-pump pressure and/or a second differential pressure between the second traveling-pump pressure and the first traveling-pump pressure is equal to or more than a deceleration threshold; and
- a display connected to the controller and configured to display that the first traveling motor is automatically shifted down from the second speed to the first speed.

* * * * *